US008487956B2

(12) United States Patent
Morita et al.

(10) Patent No.: US 8,487,956 B2
(45) Date of Patent: Jul. 16, 2013

(54) COMMUNICATION TERMINAL, SYSTEM AND DISPLAY METHOD TO ADAPTIVELY UPDATE A DISPLAYED IMAGE

(75) Inventors: Kugo Morita, Kanagawa (JP); Katsuhiko Shimizu, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1204 days.

(21) Appl. No.: 12/095,489

(22) PCT Filed: Nov. 29, 2006

(86) PCT No.: PCT/JP2006/323857
§ 371 (c)(1),
(2), (4) Date: Jan. 8, 2009

(87) PCT Pub. No.: WO2007/063922
PCT Pub. Date: Jun. 7, 2007

(65) Prior Publication Data
US 2009/0309897 A1  Dec. 17, 2009

(30) Foreign Application Priority Data

Nov. 29, 2005 (JP) ................. 2005-344296
Nov. 29, 2005 (JP) ................. 2005-344752
Nov. 29, 2005 (JP) ................. 2005-344753
Nov. 29, 2005 (JP) ................. 2005-344754
Nov. 29, 2005 (JP) ................. 2005-344755
Nov. 29, 2005 (JP) ................. 2005-344756
Dec. 27, 2005 (JP) ................. 2005-374049

(51) Int. Cl.
*G09G 5/00* (2006.01)
(52) U.S. Cl.
USPC ....................................... 345/619
(58) Field of Classification Search
None
See application file for complete search history.

(56) References Cited

U.S. PATENT DOCUMENTS 5,907,604 A * 5/1999 Hsu ................ 379/142.06
5,953,050 A * 9/1999 Kamata et al. ........... 348/14.09
(Continued)

FOREIGN PATENT DOCUMENTS

| JP | 02067890 A | 3/1990 |
| JP | 04237288 A | 8/1992 |

(Continued)

OTHER PUBLICATIONS

Japanese language office action dated Jan. 17, 2012 and its English language translation issued in corresponding Japanese application 2005344753.

(Continued)

*Primary Examiner* — Daniel Hajnik
*Assistant Examiner* — Anh-Tuan V Nguyen
(74) *Attorney, Agent, or Firm* — DLA Piper LLP (US)

(57) ABSTRACT

A communication terminal and a communication system able to adaptively update sizes and positions of screens in accordance with the situation without operation by a user, and a display method of the communication terminal, which perform processing of individual packets in a linked manner under the control of a display image control portion 306 based on an address of a transmitting side. Based on a sound pressure (volume) of audio information (VoIP) from the same transmitting side address, the terminal etc. calculate the screen sizes for mapping of packets of the video information from the same transmitting side address and corrects the top/bottom of the same screen or displays an instructed animated character based on top/bottom information, instruction information, etc. described in the packets of the control information from the same transmitting side address.

26 Claims, 71 Drawing Sheets

U.S. PATENT DOCUMENTS

| | | | |
|---|---|---|---|
| 6,353,456 B1 * | 3/2002 | Sato | 348/14.08 |
| 6,369,846 B1 * | 4/2002 | Katsumi | 348/14.01 |
| 6,744,927 B1 * | 6/2004 | Kato | 382/239 |
| 6,963,353 B1 * | 11/2005 | Firestone | 348/14.09 |
| 7,013,267 B1 * | 3/2006 | Huart et al. | 704/207 |
| 7,409,232 B2 | 8/2008 | Daita | |
| 8,098,281 B1 * | 1/2012 | Croak et al. | 348/143 |
| 8,225,224 B1 * | 7/2012 | Robertson et al. | 715/767 |
| 2003/0147113 A1 * | 8/2003 | Hamada et al. | 359/238 |
| 2003/0186648 A1 * | 10/2003 | Hasegawa et al. | 455/3.05 |
| 2004/0085259 A1 * | 5/2004 | Tarlton et al. | 345/2.3 |
| 2004/0110561 A1 * | 6/2004 | Kawamura | 463/35 |
| 2004/0113933 A1 * | 6/2004 | Guler | 345/716 |
| 2005/0135583 A1 * | 6/2005 | Kardos | 379/142.01 |
| 2005/0188326 A1 * | 8/2005 | Ikeda | 715/788 |
| 2006/0215759 A1 * | 9/2006 | Mori | 375/240.16 |

FOREIGN PATENT DOCUMENTS

| | | |
|---|---|---|
| JP | 05-103324 | 4/1993 |
| JP | 06-141310 | 5/1994 |
| JP | 06-141311 | 5/1994 |
| JP | 06165164 A | 6/1994 |
| JP | 07-015538 | 1/1995 |
| JP | 07200472 A | 8/1995 |
| JP | 07-336660 | 12/1995 |
| JP | 08263699 A | 10/1996 |
| JP | 09233446 A | 9/1997 |
| JP | 09247638 A | 9/1997 |
| JP | 10-150648 | 6/1998 |
| JP | 11177952 A | 7/1999 |
| JP | 2000156849 A | 6/2000 |
| JP | 2000-333150 | 11/2000 |
| JP | 2002149311 A | 5/2002 |
| JP | 2002218424 A | 8/2002 |
| JP | 2002281506 A | 9/2002 |
| JP | 2003099778 A | 4/2003 |
| JP | 2003241738 A | 8/2003 |
| JP | 2003299051 A | 10/2003 |
| JP | 2004128614 A | 4/2004 |
| JP | 2004260657 A | 9/2004 |
| JP | 2005064592 A | 3/2005 |
| JP | 2005086677 A | 3/2005 |
| JP | 2005-303736 | 10/2005 |
| JP | 2005328484 A | 11/2005 |

OTHER PUBLICATIONS

Japanese language office action dated Jan. 17, 2012 and its English language translation issued in corresponding Japanese application 2005344754.

Japanese language office action dated Jan. 17, 2012 and its English language translation issued in corresponding Japanese application 2005344756.

Japanese language office action dated May 24, 2011 and its English language translation for corresponding Japanese application 2005344754.

Japanese language office action dated May 24, 2011 and its English language translation for corresponding Japanese application 2005344755.

Japanese language office action dated May 24, 2011 and its English language translation for corresponding Japanese application 2005344756.

Japanese language office action dated Dec. 13, 2011 and its English language translation issued in corresponding Japanese application 2005344296.

Japanese language office action dated Aug. 30, 2011 and its English language translation for corresponding Japanese application 2005344755.

Japanese language office action dated Aug. 30, 2011 and its English language translation for corresponding Japanese application 2005344754.

Japanese language office action dated Aug. 30, 2011 and its English language translation for corresponding Japanese application 2005344753.

Japanese language office action dated Sep. 6, 2011 and its English language translation for corresponding Japanese application 2005344756.

Japanese language office action dated May 15, 2012 and its English language translation issued in corresponding Japanese application 2009231147.

Japanese language office action (interrogatory) dated Nov. 6, 2012 and its English language translation issued in corresponding Japanese application 2009231147.

Japanese language office action dated May 28, 2013 and its English language translation issued in corresponding Japanese application 2009231147.

* cited by examiner

◆DISPLAY SCREEN BOUNDARY
BETWEEN DISPLAY SCREEN AS TARGET AND DISPLAY SCREEN BOUNDARY, FOR LINE SEGMENT VERTICALLY DROPPED TO THE DISPLAY SCREEN BOUNDARY, DISPLAY MAGNIFICATION (R) IS CALCULATED AS VOLUME RATIO (V=0), Lm=0 AT DISPLAY SCREEN BOUNDARY.

V(0):V(1) = 1:1

V(0):V(1) = 2:1

V(0):V(1) = 3:1

NUMBER OF SCREENS = 2

NUMBER OF SCREENS = 3

NUMBER OF SCREENS = 4

VOLUME RATIO
V(0):V(1) = 2:1

VOLUME RATIO
V(0):V(1):V(2) = 2:1:1

VOLUME RATIO
V(0):V(1):V(2):V(3) = 2:1:1:1

VOLUME RATIO
V(0):V(1) = 2:1

VOLUME RATIO
V(0):V(1):V(2) = 2:1:2

VOLUME RATIO
V(0):V(1):V(2):V(3) = 2:1:2:2

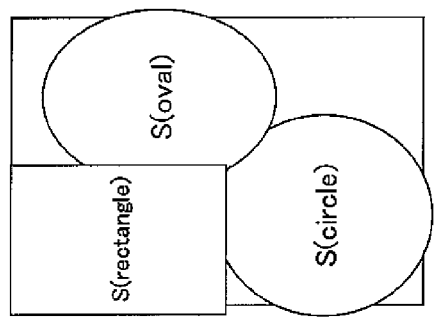
FIG. 25A  FIG. 25B
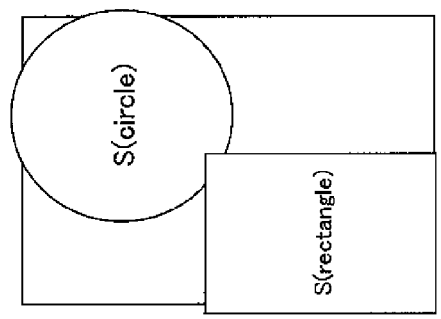
FIG. 25C  FIG. 25D
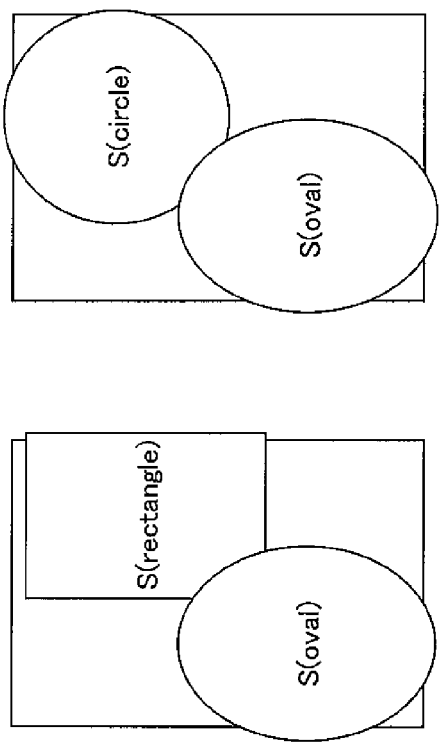

VOLUME RATIO
V(0):V(1) = 2:1

VOLUME RATIO
V(0):V(1):V(2) = 2:1:1

VOLUME RATIO
V(0):V(1):V(2):V(3) = 2:1:1:1

◆VIBRATION STATE

STOPPED STATE
(R(t)=0.961712)

VIBRATION STATE
(R(t)=0.961712)

VIBRATION STATE
(R(t)=0.961712)

◆LOCALLY STABLE STATE

STOPPED STATE
(R(t)=0.961712)

LOCALLY STABLE STATE
(R(t)=0.721003)

LOCALLY STABLE STATE
(R(t)=0.551646)

V(S0):V(S1):V(S2):V(S3)= 6:5:4:3
R=0.923115

V(S0):V(S1):V(S2):V(S3)= 6:5:4:3
R=0.770971

BASIC PATTERN
V(S0) ≧ V(S1) ≧ V(S2) ≧ V(S3)

CONVERSION GRAPH OF RECEIVED VOLUME ($V_{RECEIVE}$) – REPRODUCTION VOLUME ($V_{OUTPUT}$)

CONVERSION GRAPH OF RECEIVED VOLUME ($V_{RECEIVE}$) –
DISPLAY MAGNIFICATION CALCULATION USE VOLUME VALUE ($V_{DISPLAY}$)

◆VOLUME RATIO OF RECEPTION (V(S0):V(S1)=$V_0$:$V_1$)

◆VOLUME RATIO OF RECEPTION (V(S0):V(S1)=$V_1$:$V_1$)

DISPLAY SCREEN

KEY ALIGNMENT

DIAGRAM SUPERIMPOSING
DISPLAY SCREEN AND
KEY ARRAY

FIG. 78

| | | SCREEN OF UA | SCREEN OF UB | SCREEN OF UC | RECEPTION BAND | TRANSMISSION BAND |
|---|---|---|---|---|---|---|
| (1) | ONE UA IS SPEAKING | UB, UC, UA | UA, UC, UB | UA, UB, UC | UA ← UB/UC; UB ← UA/UC; UC ← UA/UB | UA → UB,UC; UB → UA/UC; UC → UA/UB |
| (2) | UA AND UB ARE SIMULTANEOUSLY SPEAKING | UB, UC, UA | UA, UC, UB | UA, UB, UC | UA ← UB/UC; UB ← UA/UC; UC ← UA/UB | UA → UB,UC; UB → UA,UC; UC → UA,UB |
| (3) | UA AND UB ARE SIMULTANEOUSLY SPEAKING WITH VOICE RATIO OF 2:1 | UB, UC, UA | UA, UC, UB | UA, UB, UC | UA ← UB/UC; UB ← UA/UC; UC ← UA/UB | UA → UB,UC; UB → UA/UC; UC → UA,UB |

S(0) : S(1) : S(2) : S(3) = 2 : 1 : 1 : 1
V(0) : V(1) : V(2) : V(3) = 2 : 1 : 2 : 1

COMMUNICATION TERMINAL, SYSTEM AND DISPLAY METHOD TO ADAPTIVELY UPDATE A DISPLAYED IMAGE

TECHNICAL FIELD

The present invention relates to a mobile phone or other communication terminal and communication system and a display method of a communication terminal, more particularly relates to a communication terminal and communication system capable of performing multi-point communications and a display method of a communication terminal.

BACKGROUND ART

As a representative type of multi-point communications, there is a television (video) conference system. In a television conference system, a plurality of terminals is connected via an MCU (Multi-point Control Unit). The MCU combines image data sent from a large number of terminals on one multi-screen display and transmits the same together with audio data to the individual terminals to thereby realize a television conference connecting multiple points.

Basically, the cases of combining images of different points into one multi-screen image include:

(1) the case of equally splitting one image (for example splitting into four or splitting into nine) and (2) the case of obtaining one large image region and equally splitting the remaining region (for example splitting into six).

In the case of (1), images from points connected by the MCU are combined using the same surface areas.

In the case of (2), the speaking point is assigned a large surface area and the images from the remaining points are assigned to the remaining equally split regions.

In each case, the television conference system is conducted by using a large screen monitor. Therefore, even when combining images of a plurality of points into one multi-screen image, the sizes of the images showing the individual points are sufficiently large, so recognition of the face of a person does not become difficult so far as showing just one person. A television conference system is disclosed in for example Patent Documents 1, 2, etc.

FIG. 1A to FIG. 1E are diagrams showing examples of a display screen of a terminal of a personal computer (PC) or the like at the time of multi-point communications in a general television conference system.

In the examples of FIG. 1A to FIG. 1E, a display screen 1 is split into windows of previously determined frames (rectangles).

For example, the display screen 1 is formed from one large window (rectangle) 2 and a plurality of small windows (rectangles) 3-1 to 3-5. A speaker is displayed in the large window 2.

In this case, the sizes of the windows and a number of splitting are fixed and the captured images are displayed as they are. Therefore, the sizes of the faces fluctuate in accordance with the state of capture.

In the case of window control of a general PC, it is possible to use a mouse to drag on a window to freely change the size of the window and select the window.

In this regard, mobile phones and other mobile communication terminals are becoming increasingly sophisticated in function with each passing year and offer not only audio conversation, but also e-mail, web access, games, cameras, video calls, media players, radios, television, and so on.

At the present time, for a video call at a mobile communication terminal, one selects connection by a video call at the time of making the call.

However, due to the progress in handling packet communications, audio information (VoIP) in which the audio conversation itself is compatible with packet communications is being used. The main methods of use are to activate the camera during conversation and switch to conversation by audio and video and conversely stop the camera and select only audio conversation. Further, it becomes possible to send a document (for example, e-mail), address data, image (still image or moving picture image), audio, etc. stored in a terminal to another party in the conversation so that for example this is automatically reproduced by the other party in the conversation and simultaneously viewed or a web site is simultaneously viewed.

In this way, when mobile communication terminals are converted to the IP format due to the increased sophistication of functions, it will become possible to simultaneously communicate with a plurality of other parties (including a server).

In this case, it is necessary for one terminal to handle a plurality of screens. As the method of handling a plurality of screens, there is the method of handling in a page flipping manner (by PDA etc.).

Patent Document 1: Japanese Patent Publication (A) No. 06-141310

Patent Document 2: Japanese Patent Publication (A) No. 06-141311

DISCLOSURE OF THE INVENTION

Problem to be Solved by the Invention

As one of the modes of utilization of mobile communication terminals envisioned from now, there is the sharing of web sites, files, moving picture images, and music while engaged in a TV conversation with a plurality of parties.

However, the display screen of a mobile communication terminal is very small, so this mode cannot be realized by the page flipping handling method explained before.

The display screen of a television conference system must be set in advance. For this reason, when the number of screens handled exceeds an envisioned number, it becomes impossible to display these.

In contrast to the case of the display screen of a personal computer (PC), at a mobile communication terminal, there is a limit to the number of operation keys. Even if operation by several keys is possible, it is difficult to actually optimally move a screen on the display screen or change its size.

Further, with for example a mobile IP-TV phone, the size of the display screen is small, so when several persons engaged in a conversation using video, the sizes of the faces of the individual persons become small.

It is difficult for a user to move a window or change its size like with a window of a PC due to the limitations on the display screen size and operation keys.

Further, the display screen cannot handle a case where several persons speak to the same extent.

An object of the present invention is to provide a communication terminal and a communication system able to adaptively and optimally update the sizes and positions of screens in accordance with the situation without operation by the user and a display method of such a communication terminal.

Means for Solving the Problem

A first aspect of the present invention is a communication terminal reproducing received image data and audio data including a control portion extracting a specific area from image data and controlling the size of the extracted image based on a magnitude of the audio data and a display portion displaying the image.

Preferably, the control portion is able to form a plurality of display areas for displaying a plurality of images to be displayed by extraction of specific areas on the display portion, calculates display magnifications of the display areas based on at least line segments connecting centers of display areas of the images, thicknesses of standard shapes, and a magnitude of audio, controls movement and new generation of display areas based on the display magnifications, and forms the plurality of display areas on the display screen of the display portion.

Preferably, the communication terminal reproduces received captured image data and audio data transmitted from transmitting side terminals, the control portion is able to form a plurality of display areas for displaying images to be displayed by extraction of specific areas on the display portion, and the control portion includes an attention worthiness estimating portion estimating the attention worthiness of a received image, a display magnification coefficient combining portion calculating a display magnification coefficient of a display area based on the estimated attention worthiness and a received volume, and a display magnification calculating portion calculating a display magnification of a display area based on the calculated display magnification coefficient.

Preferably, the control portion is able to form a plurality of display areas for displaying images to be displayed by extraction of specific areas on the display portion and discriminates array positions of display areas based on an order of judgment results of the volume order.

Preferably, the communication terminal is able to transmit/receive image data and audio data and can reproduce received image data and audio data, and the control portion is able to form a plurality of display areas for displaying images to be displayed by extraction of specific areas on the display portion, adds, as communication information, another session from the same terminal as lower information of the same terminal, judges, as a display area size for displaying the image, a display area for the information positioned the lowest as the display area to be noted, and controls it to a corresponding display area.

A second aspect of the present invention is a communication terminal reproducing received image data and audio data, having a display portion displaying images and a control portion which is able to form a plurality of display areas for displaying images to be displayed by extraction of specific areas on the display portion, calculates display magnifications of the display areas based on predetermined information, controls movement and new generation of the display areas based on the display magnifications, and forms a plurality of display areas on the display screen of the display portion, wherein the control portion has at least one function among a first function of judging whether or not one or more display areas are in a state of continuously movement in a local region and fixing display areas when judging they are in a vibrating state, a second function of judging whether or not the display areas are in a stable state, a function of judging whether or not one or more display areas are in a state of continuously movement in a local region and fixing display areas when judging they are in a vibrating state, and a third function of judging whether or not the display area is in the stable state.

A third aspect of the present invention is a communication system able to transmit/receive image data and audio data, and performing communications among a plurality of communication terminals able to reproduce received image data and audio data, wherein the communication terminal has a display portion displaying images and a control portion which is able to form a plurality of display areas for displaying images to be displayed by extraction of specific areas on the display portion and controls the sizes of images to be displayed based on received volumes, and the control portion adds, as communication information, another session from the same terminal as lower information of the same terminal, judges, as the display area size for displaying an image, a display area for information positioned the lowest as the display area to be noted, and controls it to a corresponding display area.

A fourth aspect of the present invention is a communication terminal for reproducing reception image data and audio data transmitted from a plurality of transmitting side terminals, having a display portion displaying images, an upper limit setting portion setting an upper limit value of luminance of each region based on a size of a region occupied by each image on the display portion, and a control portion controlling the luminance of each region within a range not exceeding the upper limit value.

A fifth aspect of the present invention is a display method of a communication terminal reproducing received image data and audio data, having a step of extracting a specific area from image data, a step of controlling the size of the extracted image based on a magnitude of the audio data, and a step of displaying the image.

A sixth aspect of the present invention is a display method of a communication terminal reproducing received image data and audio data, having a step of calculating display magnifications of display areas based on line segments connecting centers of display areas of a plurality of images to be displayed by extraction of specific areas, thicknesses of standard shapes, and a magnitude of audio, a step of controlling movement and new generation of display areas based on the display magnifications and forming a plurality of display areas on the display screen, and a step of displaying a plurality of display areas including images to be displayed.

A seventh aspect of the present invention is a display method of a communication terminal reproducing received image data and audio data, having a step of calculating display magnifications of display areas of a plurality of images to be displayed by extraction of specific areas, a step of controlling movement and new generation of display areas based on the display magnifications and forming a plurality of display areas on the display screen, a step of displaying a plurality of display areas including images to be displayed, and a step of judging whether or not one or more display areas are in a state where they continuously move in a local region and fixing the display area when judging they are in a vibrating state.

An eighth aspect of the present invention is a display method of a communication terminal reproducing received image data and audio data, having a step of calculating display magnifications of display areas of a plurality of images to be displayed by extraction of specific areas, a step of controlling movement and new generation of display areas based on the display magnifications and forming a plurality of display areas on the display screen, a display step of displaying a plurality of display areas including images to be displayed, and a step of judging whether or not the display areas are in a stable state and performing stirring processing for promoting rearrangement of positional arrays of display areas when judging they are stable.

A ninth aspect of the present invention is a display method of a communication terminal reproducing received captured image data and audio data transmitted from a transmitting side terminal, having a step of estimating an attention worthiness of the received image, a step of calculating a display magnification coefficient of a display area based on the estimated attention worthiness and a received volume, a step of calculating a display magnification of the display area based on the calculated display magnification coefficient, and a step of displaying the display area including the image to be displayed according to the display magnification.

A 10th aspect of the present invention is a display method of a communication terminal reproducing received image data and audio data, having a step of forming a plurality of display areas for displaying images to be displayed by extraction of specific areas, a step of controlling the sizes of the images to be displayed based on received volumes, a step of judging a volume order of display areas, a step of discriminating array positions of the display areas based on the order of the judgment result, and a step of displaying the plurality of display areas including images to be displayed at positions in accordance with the discrimination results.

An 11th aspect of the present invention is a display method of a communication terminal capable of transmitting and/or receiving image data and audio data and capable of reproducing received image data and audio data, having a step of forming a plurality of display areas for displaying images to be displayed on the display portion by extraction of specific areas and a step of controlling the sizes of the images to be displayed based on received volumes, wherein, as communication information, a different session from the same terminal is added as lower information of the same terminal, and as the display area size for displaying the image, a display area for information positioned the lowest is judged as the display area to be noted and controlled to the corresponding display area.

A 12th aspect of the present invention is a display method of a communication terminal reproducing reception image data and audio data transmitted from a plurality of transmitting side terminals, having a step of setting the upper limit value of the luminance of each region based on the size of the region occupied by each image on the display portion and a step of controlling the luminance of each region within a range not exceeding the upper limit value.

Effects of the Invention

According to the present invention, the sizes and positions of screens can be adaptively and optimally updated in accordance with the situation without any operation by the user.

Further, according to the present invention, the sizes and positions of the display image areas (screens) can be adaptively and optimally updated in accordance with the magnitudes of the volumes, the number of display image areas (screens) to be displayed, and other situations without any operation by the user. In addition, even if rearrangement (movement) of the display image areas becomes continuous and the shapes are different, it becomes possible to arrange areas with the optimal sizes.

Further, by stopping the vibration, it becomes possible to eliminate trouble.

Further, a locally stable state can be eliminated.

Further, by eliminating the locally stable state, it is possible to enlarge a screen. Further, it is not necessary to perform unnecessary stirring processing in order to judge whether or not the state is stable.

Further, when a sender captures an image that he wants to show, it becomes possible to immediately show that image enlarged (in screen size) on the receiving side without adding any new operation by the sender (and without the sender saying anything).

Further, it becomes possible to set the size large with a high priority with respect to a specific display area.

Further, it becomes possible to reduce the number of times of key operation for selecting a display area.

Further, when a sender transmits an image file that he wants to show, it becomes possible to immediately show that image enlarged (in screen size) on the receiving side without adding any new operation by the sender and without the sender saying anything.

Further, by transmitting information of a reproduction start time together with a file, it becomes possible to reproduce the information at the same timing on the transmitting side and receiving side.

In a case of two persons to three persons, authentication keys are issued from a terminal connected to all to all persons, so it becomes possible to quickly connect terminals based on this.

Further, according to the present invention, when displaying images of a plurality of persons on one display screen and reproducing the audio together with this, since the luminance of a specific area extracted from each image can be controlled, for example, by making the luminance of a speaker relatively higher than the luminance of a listener, it becomes easy to identify the speaker. When raising the luminance, by preventing the luminance from exceeding an upper limit value set based on the size of the region, waste of electric power due to further brighter lightening of a region which has been displayed large and acquired sufficient attention can be prevented.

BRIEF DESCRIPTION OF THE DRAWINGS

FIG. 25A to FIG. 25D are diagrams showing examples of a case where standard shape of ovals (S(oval)), circles (S(circle)), and rectangles (S(rectangle)) are mixed (magnitudes of audio are equal).

FIG. 78 is a diagram showing an example of the communication processing for controlling an encoding ratio of a transmitted image based on previous time screen size information on the receiving side.

Figure 1:
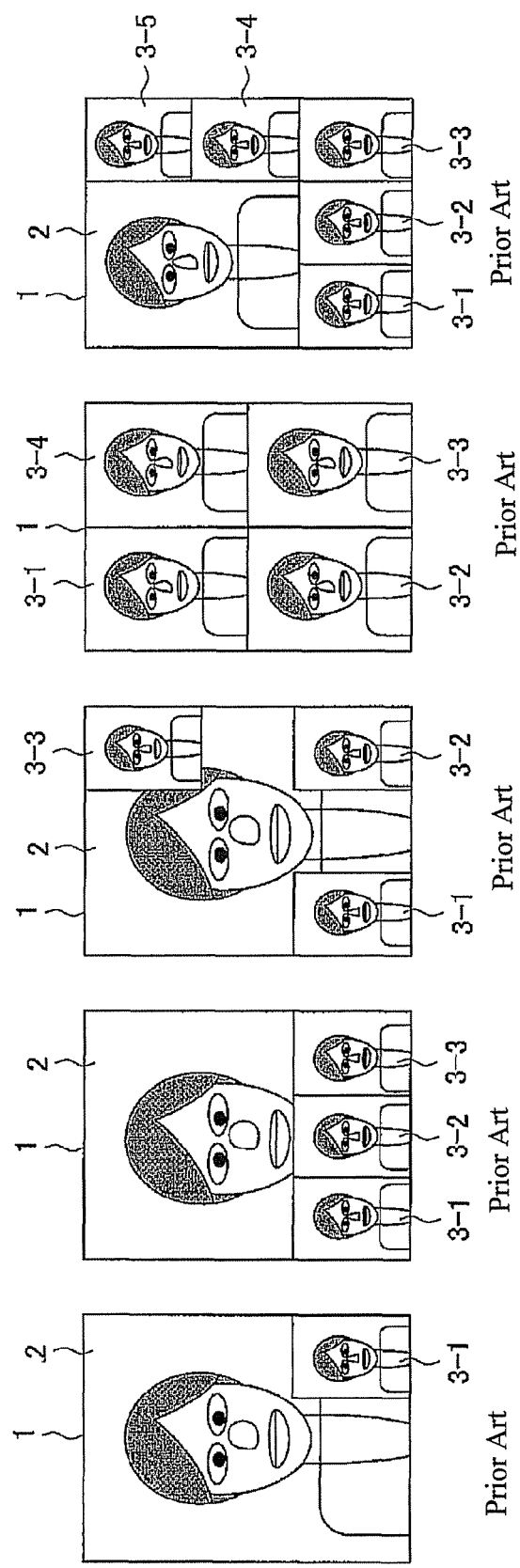
FIG. 1A to FIG. 1E are diagrams showing examples of a display screen of a personal computer (PC) or other terminal at the time of multi-point communications in a general television conference system.

DESCRIPTION OF NOTATIONS 10, 10G . . . mobile communication terminals, 20 . . . encoder, 201 . . . audio input portion, 202 . . . image input portion, 203 . . . operation portion, 204 . . . audio encoding portion, 205 . . . image encoding portion, 206 . . . terminal control portion, 207 . . . storage portion, 208 . . . control information generating portion, 209 . . . transmission packet generating portion, 210 . . . network interface (I/F), 30, 30G . . . decoders, 301 . . . network interface (I/F), 302 . . . operation portion, 303 . . . received packet analyzing portion, 304 . . . audio decoding portion, 305 . . . video decoding portion, 306 . . . display image control portion, 307 . . . volume correcting portion, 308 . . . audio output portion, 309 . . . image correcting portion, 310 . . . display portion (image output portion), 311 . . . own terminal control portion, 3061 . . . top/bottom correcting portion, 3062 . . . face area detecting portion, 3063 . . . screen judging portion, 3064 . . . cutting portion, 3065 . . . size calculating portion, 3066 . . . reducing/enlarging portion, 3067 . . . display position calculating portion, 3068 . . . mapping portion, 10A . . . mobile communication terminal, 40 . . . encoder, 401 . . . audio input portion, 402 . . . image input portion, 403 . . . operation portion, 404 . . . audio encoding portion, 405 . . . image encoding portion, 406 . . . top/bottom correcting portion, 407 . . . face area detecting portion, 408 . . . screen judging portion, 409 . . . cutting portion, 410 . . . input volume measuring portion, 411 . . . terminal control portion, 412 . . . control information generating portion, 413 . . . storage portion, 414 . . . transmission packet generating portion, 415 . . . network interface (I/F), 50 . . . decoder, 501 . . . network interface (I/F), 502 . . . operation portion, 503 . . . received packet analyzing portion, 504 . . . audio decoding portion, 505 . . . video decoding portion, 506 . . . display image control portion, 507 . . . volume correcting portion, 508 . . . audio output portion, 509 . . . image correcting portion, 510 . . . display portion (image output portion), 511 . . . own terminal control portion, 5061 . . . control information analyzing portion, 5062 . . . masking portion, 5063 . . . display magnification calculating portion, 5063B . . . display magnification calculation and judging portion, 5064 . . . reducing/enlarging portion, 5065 . . . display position calculating portion, 5066 . . . mapping portion, 60 . . . decoder, 601 . . . network interface (I/F)), 602 . . . received packet analyzing portion, 603 . . . audio decoding portion, 604 . . . video decoding portion, 605 . . . image storage portion, 606 . . . scene change judging portion, 607 . . . panning judging portion, 608 . . . rotation judging portion, 609 . . . focus judging portion, 610 . . . attention worthiness estimating portion, 611 . . . display magnification coefficient combining portion, 612 . . . display magnification calculating portion, 613 . . . multi-screen combining portion, 614 . . . display portion (image output portion), 615 . . . audio output portion, 70 . . . encoder, 701 . . . audio input portion, 702 . . . image input portion, 703 . . . operation portion, 704 . . . audio encoding portion, 705 . . . image encoding portion, 706 . . . top/bottom correcting portion, 707 . . . face detecting portion, 708 . . . screen judging portion, 709 . . . cutting portion, 710 . . . hand detecting portion, 711 . . . behavior judging portion, 712 . . . behavior information storage portion, 713 . . . terminal control portion, 714 . . . control information generating portion, 715 . . . storage portion, 716 . . . transmission packet generating portion, 717 . . . network interface (I/F), 80 . . . decoder, 801 . . . network interface (I/F), 802 . . . operation portion, 803 . . . received packet analyzing portion, 804 . . . audio decoding portion, 805 . . . video decoding portion, 806 . . . display image control portion, 807 . . . volume correcting portion, 808 . . . audio output portion, 809 . . . image correcting portion, 810 . . . display portion (image output portion), 811 . . . own terminal control portion, 8061 . . . control information analyzing portion, 8062 . . . masking portion, 8063 . . . display magnification coefficient combining portion, 8064 . . . reducing/enlarging portion, 8065 . . . display position calculating portion, and 8066 . . . mapping portion.

BEST MODE FOR CARRYING OUT THE INVENTION

Below, embodiments of the present invention will be explained with reference to the drawings.

First Embodiment

Figure 2:
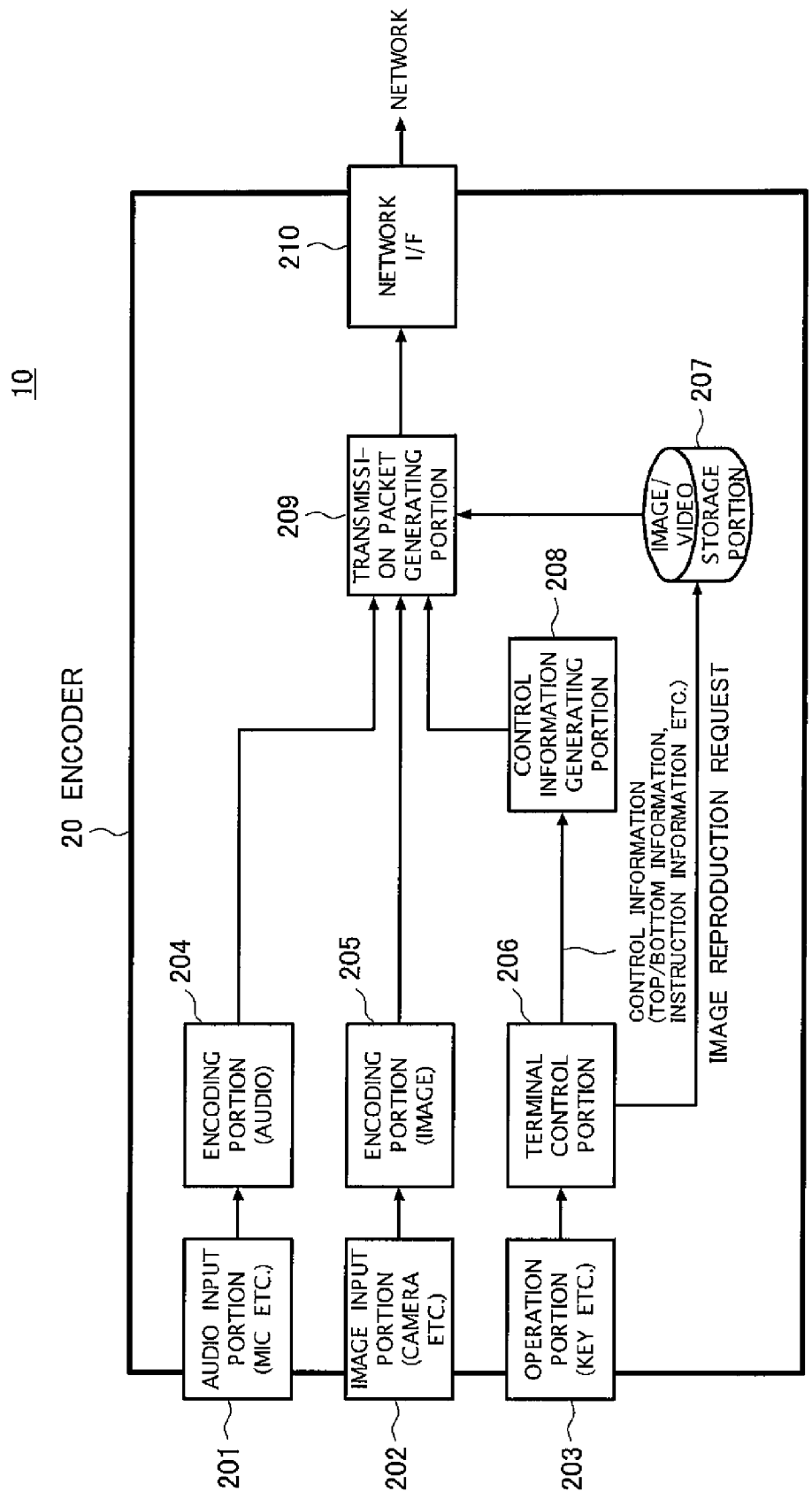
FIG. 2 is a diagram showing an example of the configuration of a mobile communication terminal according to a first embodiment of the present invention and a block diagram showing an encoder.
Figure 3:
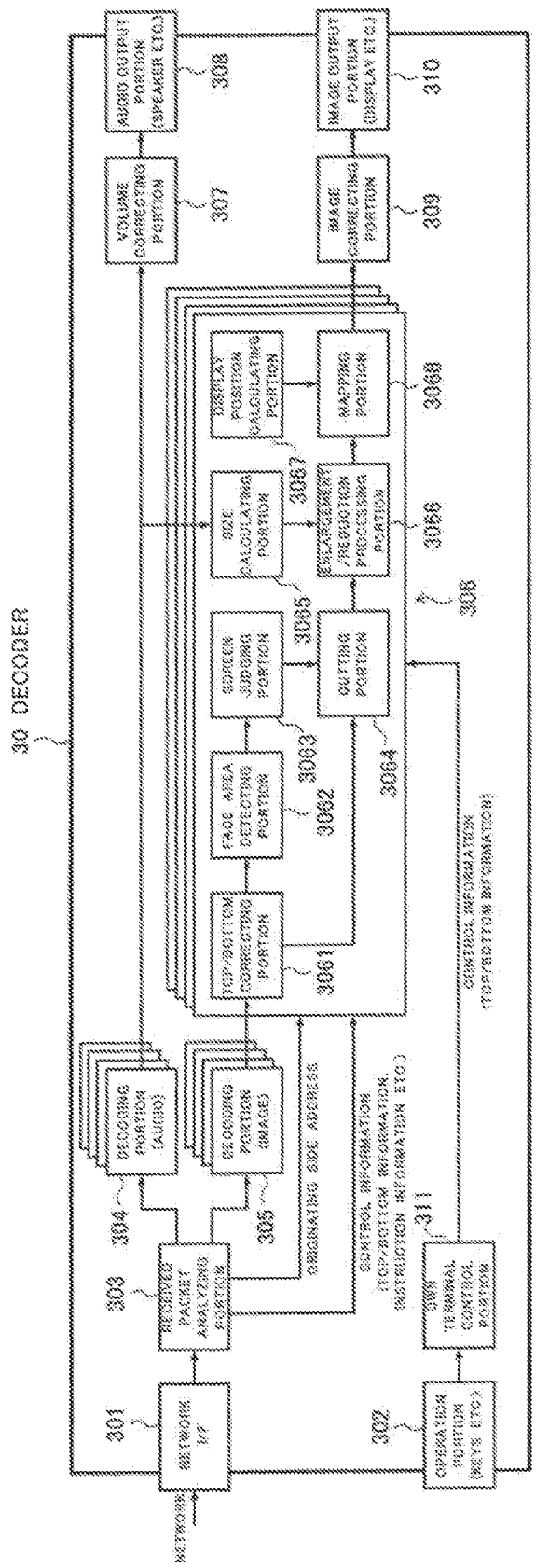
FIG. 3 is a diagram showing an example of the configuration of the mobile communication terminal according to the first embodiment of the present invention and a block diagram showing a decoder.

FIG. 2 and FIG. 3 are diagrams showing an example of the configuration of a mobile communication terminal according to a first embodiment of the present invention, in which FIG. 2 is a block diagram showing an encoder, and FIG. 3 is a block diagram showing a decoder.

The present mobile communication terminal 10 has an encoder 20 serving as a transmitting side and a decoder 30 serving as a receiving side and is configured so that multi-point communications are possible.

The encoder 20 has a function of transmitting encoded audio data and image data to a network with instruction information for the receiving side terminals and top/bottom information of the images etc. added to form packets.

The instruction information of the transmitting side added to the audio data and image data includes information for identifying the transmitting side of the instructed image (for example, the IP address and MAC address) and position information indicating a position on the received image.

The encoder 20 serving as the transmitting side has the function of generating corresponding instruction information and transmitting this to the other parties during communications when there is a screen (screen will be explained in detail later) at the instructed position on the display screen.

The encoder 20 of FIG. 2 has a microphone or other audio input portion 201, a digital camera or other image input portion 202, an operation portion 203 enabling key input etc., an audio encoding portion 204 for encoding audio data input by the audio input portion 201, an image encoding portion 205 for encoding image data input from the image input portion 202, a terminal control portion 206 for controlling the terminal based on the input information of the operation portion 203, a storage portion 207 for storing images and/or video, a control information generating portion 208 for generating instruction information, top/bottom information, and other control information based on the instructions of the terminal control portion 206, a transmission packet generating portion 209 for generating transmission packets from the encoded audio data and image data, control information, and image and video data read out from the storage portion 207 based on instructions of the terminal control portion 206, and network interface (I/F) 210 able to wirelessly communicate with the network and transmitting the generated transmission packets via the network to the terminals of the other parties of communications or a server.

The decoder 30 has a function of reproducing the audio data and image data transmitted from the encoders 20 of other parties of communications (transmitting sides) and received via the network.

The decoder 30 has a function of extracting (detecting) specific areas of received images, that is, faces, when for example performing multi-point communications, selecting screens (display areas controlled in size) to be used based on the extracted face areas, and displaying the same.

The decoder 30 has a function of splitting screens into circular (concept including oval) windows eliminating any dead zones when displaying the same.

The decoder is configured to split screens into circular (oval) windows for the following reason.

In general, a display screen has been split into rectangles. Human faces are basically oval, so the four corners of such rectangles become dead zones. These dead zones consequently make the areas for displaying the faces narrower (smaller).

Accordingly, in the present embodiment, the decoder is configured to split screens into circular (oval) windows eliminating any dead zones. The concrete processing will be explained in detail later with reference to the drawings.

The decoder 30 processes packets linked together based on the addresses of the transmitting sides. The decoder 30 calculates screen sizes for mapping of packets of video information from the transmitting side addresses based on the sound pressures (volumes) of the audio information (VoIP) from the transmitting side addresses. Further, the decoder 30 has a function of correcting the top/bottom of the screens and displaying an instructed animated character based on the top/bottom information, instruction information, etc. described in the packets of the control information from the transmitting side addresses.

The decoder 30 calculates the display positions of the screens and arranges the screens on a virtual display screen based on the received images, screen information (shapes), and size information. When the rectangle including all arranged screens has a surface area exceeding the surface area of the display screen, it is transformed by similarity transformation so that the surface area of the provisional array becomes equivalent to the surface area of the display screen.

The transformation rate when performing the similarity transformation is used for the size correction the next time.

Further, the decoder 30 has a function of compressing and making the vertical and horizontal lengths of the provisional array equal to the vertical and horizontal lengths of the display screen when the surface area of the provisional array is less than the surface area of the display screen and the lengths of the provisional array are longer than them.

Note that, in the present embodiment, when outer pressure is applied to the arranged individual screens, the individual screens move depending upon the magnitude of the outer pressure.

The decoder 30 of FIG. 3 has a network interface (I/F) 301 able to perform wireless communications with the network and receiving packets including audio data, image (video) data, control information, and instruction information transmitted from the transmitting sides, an operation portion 302 able to perform key input etc., a received packet analyzing portion 303 for analyzing packets received at the network interface 301 and extracting the audio data, image data, transmitting side addresses, and control information (top/bottom information and instruction information), an audio decoding portion 304 for decoding the audio data extracted by the received packet analyzing portion 303, a video decoding portion 305 for decoding the video data extracted by the received packet analyzing portion 303, a display image control portion 306 for controlling the size and display mode of the screens to be displayed (display windows)) based on the video data, transmitting side addresses, and control information decoded by the video decoding portion 305 and/or audio data decoded by the audio decoding portion 304, a volume correcting portion 307 for correcting the volume of the audio decoded by the audio decoding portion 304, a speaker or other audio output portion 308 for generating sound with a volume corrected by the volume correcting portion 307, an image correcting portion 309 for correcting the image controlled in size and display mode by the display image control portion 306, an LCD, organic EL display using self light emitting organic EL (electroluminescence) elements, or another display portion (image output portion) 310 for displaying an image via the image correcting portion 309, and an own terminal control portion 311 for giving control information (top/bottom information) to the display image control portion 306 based on the input information from the operation portion 302.

Note that the encoder 20 and decoder 30 can share the operation portions 203 and 302, network interfaces 210 and 301, terminal control portion 206, and own terminal control portion 311.

Below, the more concrete configuration and functions of the display image control portion 306 characterizing the present embodiment and concrete examples of the display modes of the screens will be explained in sequence.

The display image control portion 306 basically has an extraction function (detection function) of extracting (detecting) a specific (face) area from image data and a control function of controlling the size of the extracted image based on the magnitude (volume) information of the audio data sent from the same transmitting side as the image data.

The control functions includes a function of controlling the array of images to be displayed based on a degree of superimposition of the display range of the display portion 310 and the image to be displayed.

Further, the control functions include a function of controlling the array of images to be displayed based on the degree of superimposition of images to be displayed on each other where there are a plurality of images to be displayed.

The display image control portion 306 of FIG. 3 has a top/bottom correcting portion 3061 for correcting the top/bottom of a received image so as to match with top/bottom of the display screen (terminal screen) of the display portion 310 based on the top/bottom information linked with the received image, a face area detecting portion 3062 for detecting and extracting the area of a face from the received image, a screen judging portion 3063 for judging the screen to be used based on the face area detected at the face area detecting portion 3062, a cutting portion 3064 for cutting a corresponding area from the received image based on the judgment of the screen judging portion 3063, a size calculating portion 3065 for calculating the size of the screen in accordance with the volume of the received audio sent from the same transmitting side as the received image, a reducing/enlarging portion 3066 for reducing/enlarging the image cut by the cutting portion 3064 based on the calculation result of the size calculating portion 3065, a display position calculating portion 3067 for calculating the display position, and a mapping portion 3068 for mapping the image obtained by the reducing/enlarging portion 3066 at the position on the display portion 310 obtained by the display position calculating portion 3067.

The screen judging portion 3063 selects as the screen shape a circle (oval) encompassing the face (specific) area and minimizing the portions other than the face area when the face area detecting portion 3062 detects a specific (face) area.

The screen judging portion 3063 judges the image as scenery and selects as the screen shape a shape other than a circle, for example, a rectangle, when the face area detecting portion 3062 does not detect a face (specific) area.

Further, the screen judging portion 3063 judges the image as scenery and selects as the screen shape a shape other than a circle, for example, a rectangle, when the number of face (specific) areas extracted by the face area detecting portion 3062 is a constant value or more.

The screen judging portion 3063 selects a screen matching with the face area having the largest surface area of the face areas when the number of face (specific) areas extracted at the face area detecting portion 3062 is a constant value or less.

The screen judging portion 3063 judges the image as scenery and selects as the screen shape a shape other than a circle, for example, a rectangle, when the surface area of the face area extracted at the face area detecting portion 3062 is a constant value or less with respect to the estimated surface area of the face area.

Further, the screen judging portion 3063 selects the shape of the display screen in accordance with a requested shape from the same transmitting side as the received image.

Further, the screen judging portion 3063 has a function of selecting the screen shape in accordance with request information (control information) from the operation portion 302 given by the own terminal control portion 311.

The size calculating portion 3065 calculates the size of a screen based on the volume of audio presently received from the same transmitting side and volumes of audio received in the past.

The mapping portion 3068 maps the animated character linked with the transmitting side in place of the received image when the mapped area becomes a constant size or less.

The image correcting portion 309 has a function of standardizing the size of a group of screens to become the display screen size or less in a case where the size of the rectangle including the group of screens formed on the same image at the mapping portion 3068 exceeds the display screen size of the display portion 310 as the image output portion.

Further, the image correcting portion 309 has a function of compressing the frame of the rectangle of the group of screens to match with the display screen and performing processing for rearranging the positions of the group of screens by collision when the vertical and horizontal sizes of the rectangle including the group of screens formed on the same image by the mapping by the mapping portion 3068 exceed the vertical and horizontal sizes of the display screen of the display portion 310 as the image output portion.

Next, a screen controlled in size and display mode by the display image control portion 306 according to the present embodiment will be explained more concretely.

Basically, a screen in the present embodiment has an allowable superimposition area having an area allowing superimposition with another screen and allowing superimposition of a screen having a small size on a screen having a large size up to the allowable area.

Further, a screen is controlled to receive a force in accordance with the size of the collided screen so as to be changed in the movement direction when moving on the display screen of the display portion 310 and colliding with another display screen.

Further, a screen is controlled to receive a force in accordance with the size of the screen so as to be changed in the movement direction when moving on the display screen of the display portion 310 and colliding with the display screen frame.

The screens controlled in size and display mode by the display image control portion 306 of the present embodiment are displayed as a multi-screen image displaying a plurality of screens on one display screen.

The screens independently move on the display screen. When judged that they will be superimposed on other screens or judged that they will be superimposed on the display screen frame, they are controlled to be changed in the movement direction and movement speed so as to avoid the superimposition. Further, the screens are controlled so as to be changed in the sizes of the screens in accordance with the situation of the transmitting side of the display contents and the reception situation.

Each screen has a representative position of the screen, movement speed, real size, requested size, and shrinkage rate. When there is no updating of the requested size from the source of information of the screen display, control is performed so that the requested size shrinks in accordance with the shrinkage speed.

Further, where the sum of the requested sizes of the screens exceeds the size of the display screen, control is performed so that all screens are contained in the display screen by standardizing the requested sizes by the size of the display screen.

More concretely, each of screens has information of representative position coordinates (P), movement speed (V), real size (R), and requested size (r).

The screen moves on the display screen for a fine time $\Delta T$ at a movement speed (V). The representative position coordinates P are given by the following equation:

$$P(T+\Delta T)=P(T)+V(T)$$

The display image control portion 306 changes the movement direction of a screen when the display screen is a finite space and it is judged that the screen is superimposed on a border line of the display screen. The movement speed V is given by the following equation:

$$V(T+\Delta T)=V(T) \times H (\text{mirror surface reflection})$$

This is a vector in a direction vertical to the movement direction and border line of the display screen and inside the display screen.

The display image display portion 306 changes the movement speed in accordance with the movement velocities (V) and requested sizes (r) when judging that a screen will be superimposed on another screen. The changing movement velocities are given by the following equation:

$$V0(T+\Delta T)=V0(T)+(V1(T)\Delta r1(T)+V0(T)\Delta r0(T))/r0(T)$$

A screen is changed in size to the requested size in a fine time $\Delta T$ according to the following equation:

$$R(T+\Delta T)=r(T)$$

Note that the display image control portion 306 changes to the largest size with no superimposition when the screen would be superimposed with the border line of the display screen if changed in size.

Further, the portion changes to the largest size with no superimposition when the screen would be superimposed on another screen.

In the present embodiment, the requested size of the screen is made the maximum when newly generating a screen on the display screen along with the activation of the application, connection in a video (TV) call, and start of reproduction etc. of a download file from a web site etc.

Each application (including TV calls, reproduction of a download file from a web site etc., and the like as well) has a shrinkage rate of the size of the screen (S(<1)). When there is no updating of the requested size from a source providing information, application, or user, the screen size is shrunk in accordance with the duration (D) with no such updating as in the following equation:

$$R'(T)=R(T) \times S \times D$$

For example, when unchanged video and audio are being transmitted from another party of conversation by a TV call, a shrinkage rate (S) of an extent that the size is halved in 5 minutes is set. On the other hand, when receiving streaming of a movie etc from a web site, a shrinkage rate of an extent that the size is halved in a longer time, for example 30 minutes, is set.

An example of updating the requested size from the source providing information and application will be shown below.

In the case of a TV (video) call, the requested size is calculated in accordance with the volume of the audio of the transmitting side.

In the case of an application classified as a text editor, the requested size is made a constant size.

In the case of an application classified as music recording and reproduction, the requested size is made a constant size (minimum).

In the case of an application classified as reproduction of a movie etc., the requested size is made a constant size (maximum).

When the sum of the requested sizes of all screens exceeds the display screen size (A), the requested sizes are standardized by the display screen size based on the following equation:

$$r(T)=r(T) \times A/\Sigma(r(T))$$

When the requested sizes of a plurality of screens become the maximum and the screens would collide, the movement computation and shrinkage computation are repeated with ΔT as the fine time, whereby the screens becomes the maximum size on the display screen in accordance with the requested sizes. At the same time, the screens move while repeatedly colliding so that all screens fit on the display screen by the above sizes, whereby they become optimally arranged.

Further, the screens are updated in sizes and rearranged automatically and adaptively in accordance with the importance of the contents displayed on the screens without superpoimsition of the screens and the displayed contents of the screens being concealed.

Further, the sizes of the displayed screens themselves are changed, therefore it becomes possible to easily judge what screens were enlarged.

Next, screen display control at the display portion 310 controlled in size and display mode as explained above will be explained with reference to FIG. 4 to FIG. 16.

Figure 4:
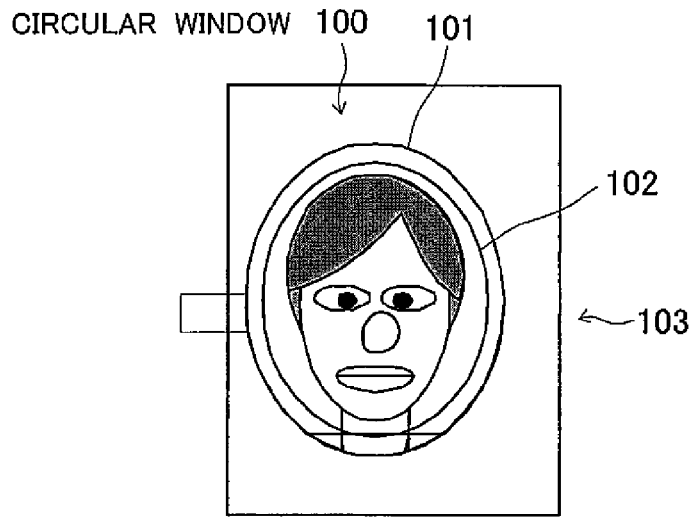
FIG. 4 is a diagram for explaining screen display control and an explanatory diagram of a circular window.
Figure 5:
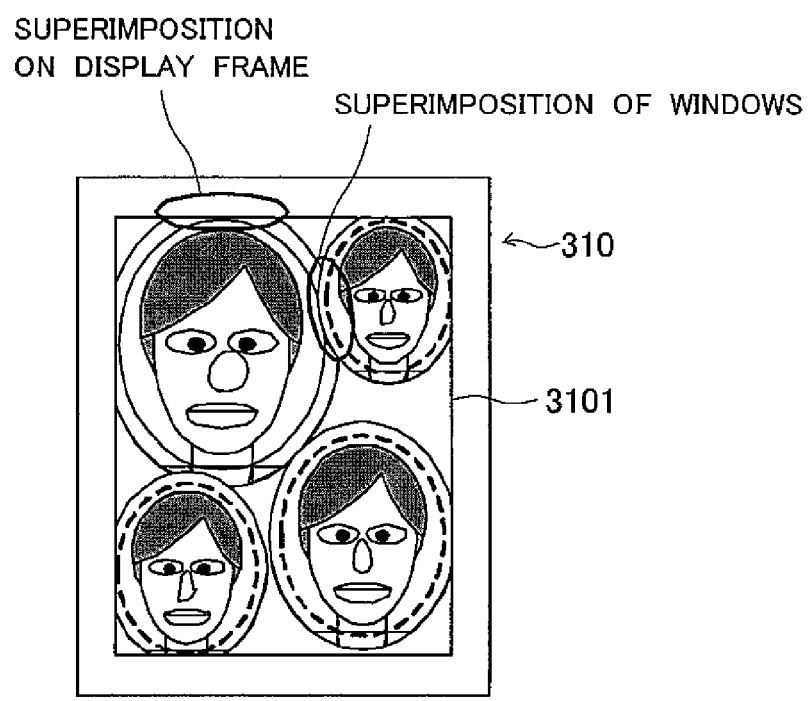
FIG. 5 is a diagram for explaining screen display control and an explanatory diagram of processing for handling superimposition of a circular window on a display frame and superimposition of windows on each other.
Figure 6:
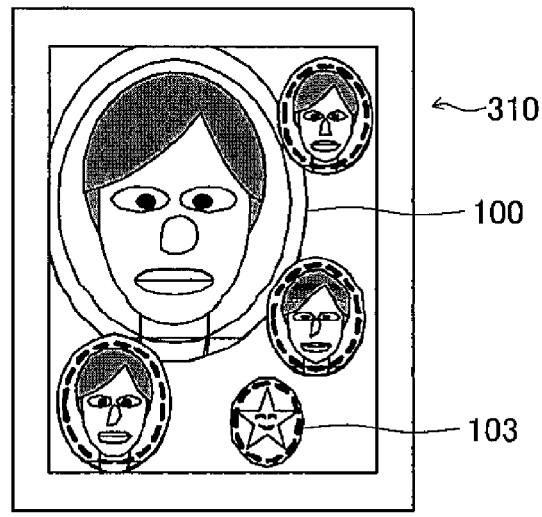
FIG. 6 is a diagram for explaining screen display control and an explanatory diagram of processing for displaying an animated character in the case where the size of a circular window is a constant size or less.
Figure 7:
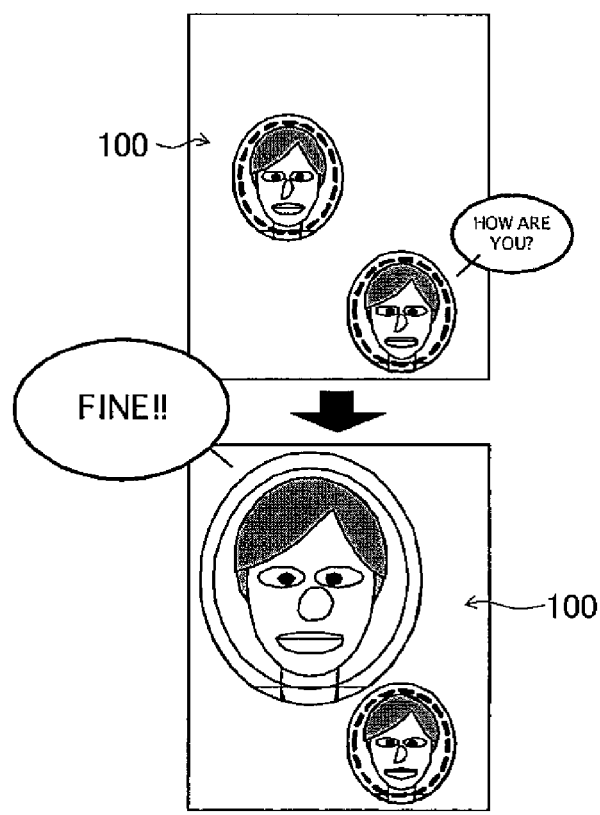
FIG. 7 is a diagram for explaining screen display control and an explanatory diagram in a case where the size of a circular window is changed in accordance with a sound pressure or conversation time.
Figure 8:
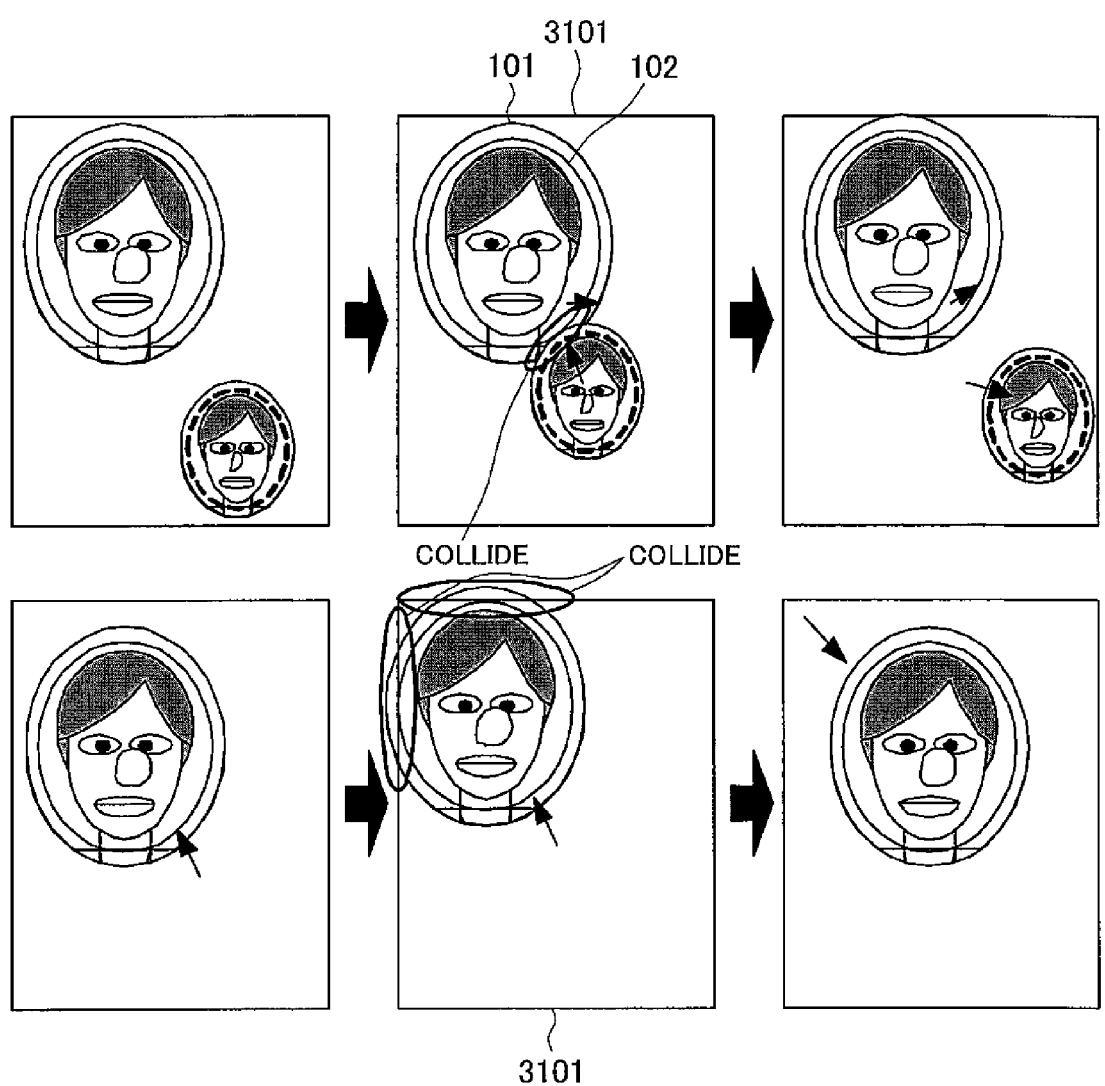
FIG. 8 is a diagram for explaining screen display control and an explanatory diagram of processing in a case where circular windows collide.
Figure 9:
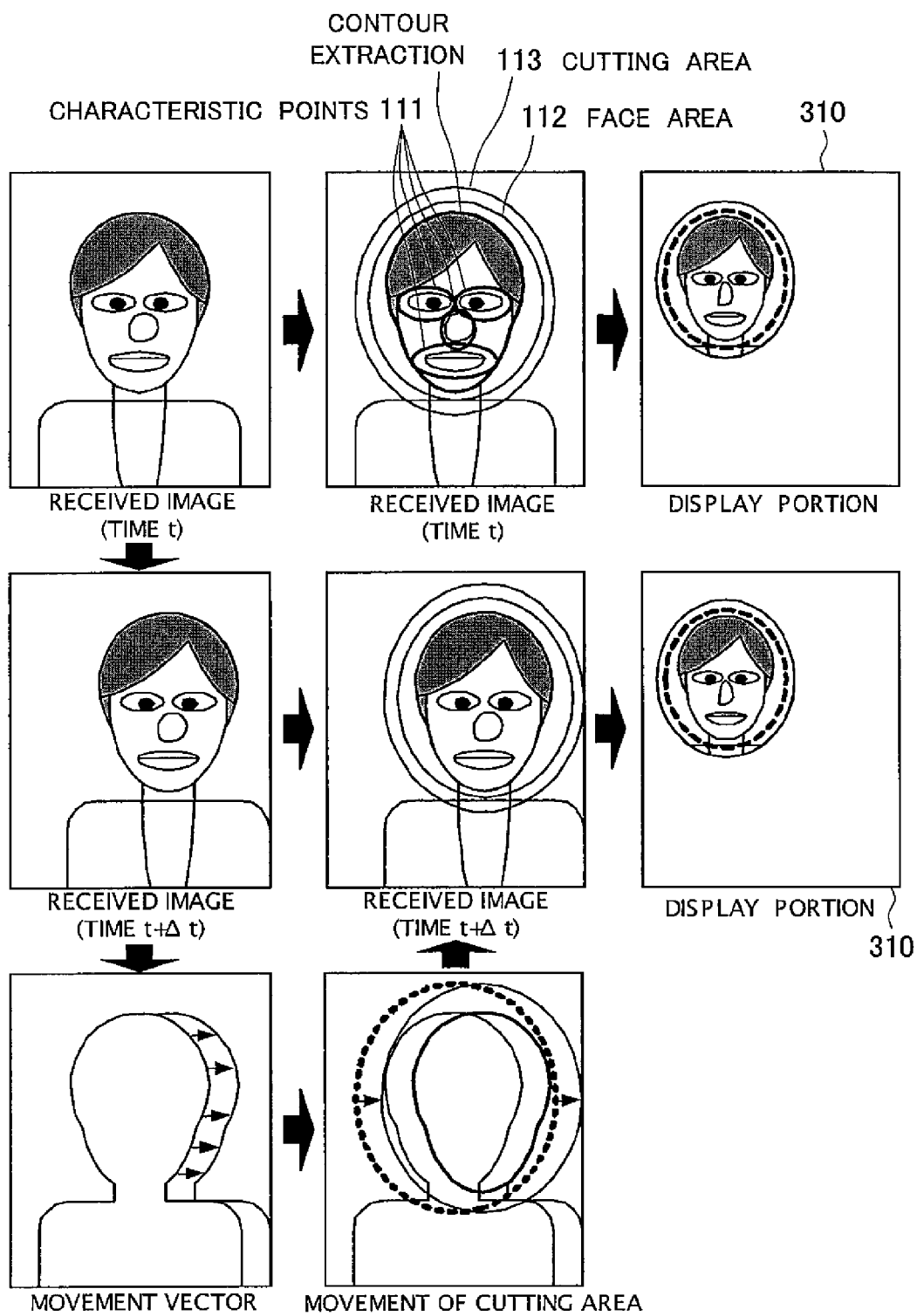
FIG. 9 is a diagram for explaining screen display control in the first embodiment and an explanatory diagram of processing for extraction of face areas from received images.
Figure 10:
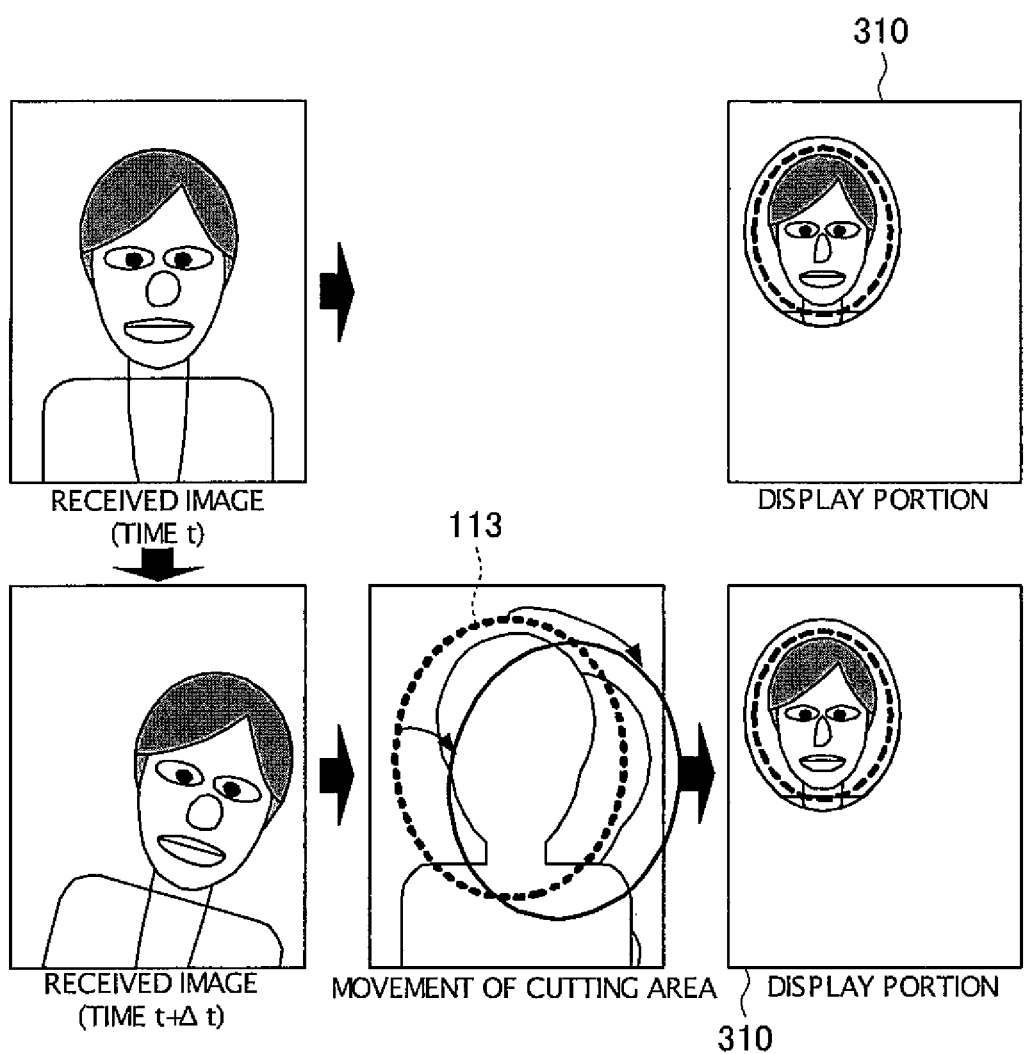
FIG. 10 is a diagram for explaining screen display control in the first embodiment and an explanatory diagram of cutting processing after the processing for extraction of face areas from received images.
Figure 11:
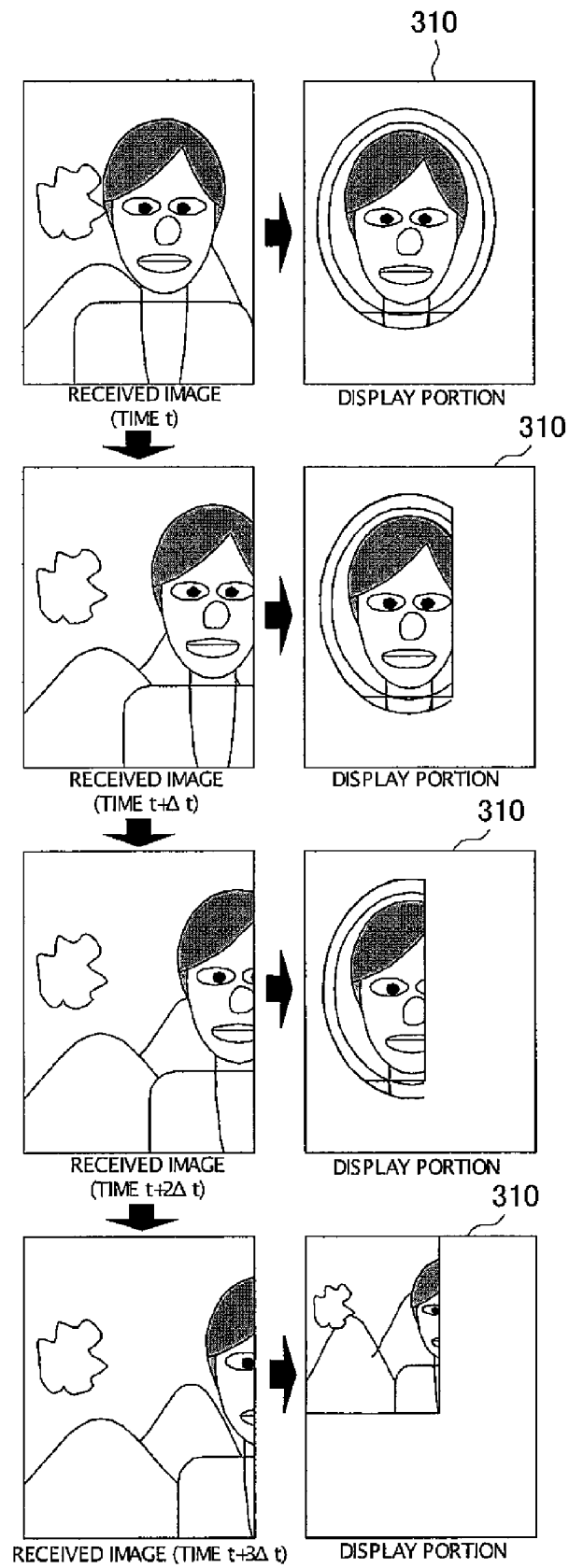
FIG. 11 is a diagram for explaining screen display control in the first embodiment and an explanatory diagram of processing for handling a case where a cut out area sticks out from the received image.
Figure 12:
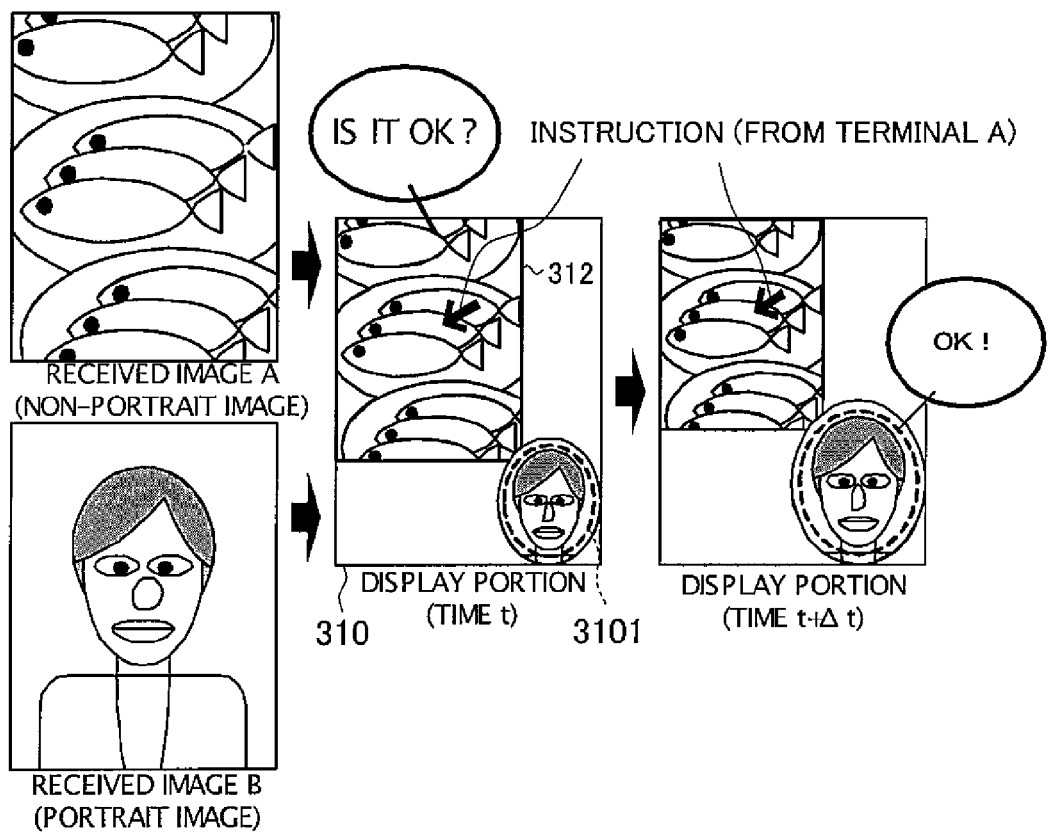
FIG. 12 is a diagram for explaining screen display control in the first embodiment and an explanatory diagram of processing in accordance with a surface area of a face area.
Figure 13:
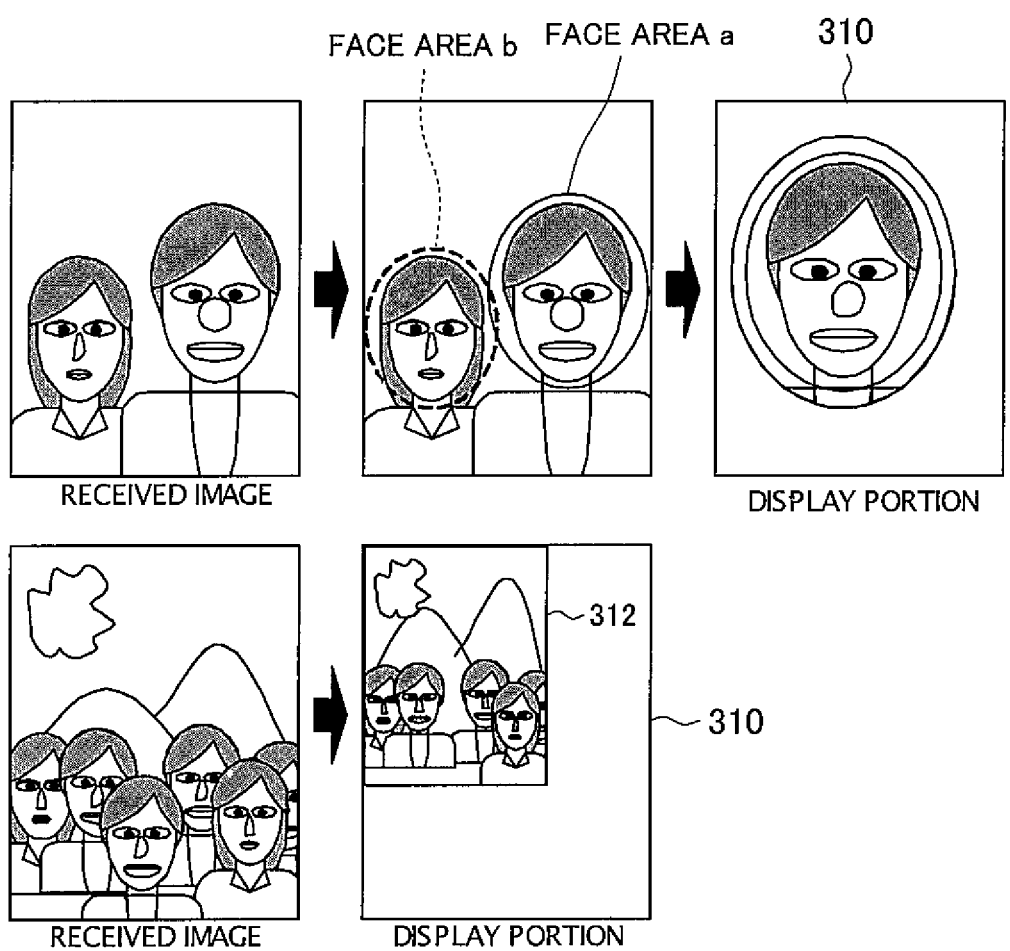
FIG. 13 is a diagram for explaining screen display control in the first embodiment and an explanatory diagram of processing for handling a case where there are a plurality of face-judged areas.
Figure 14:
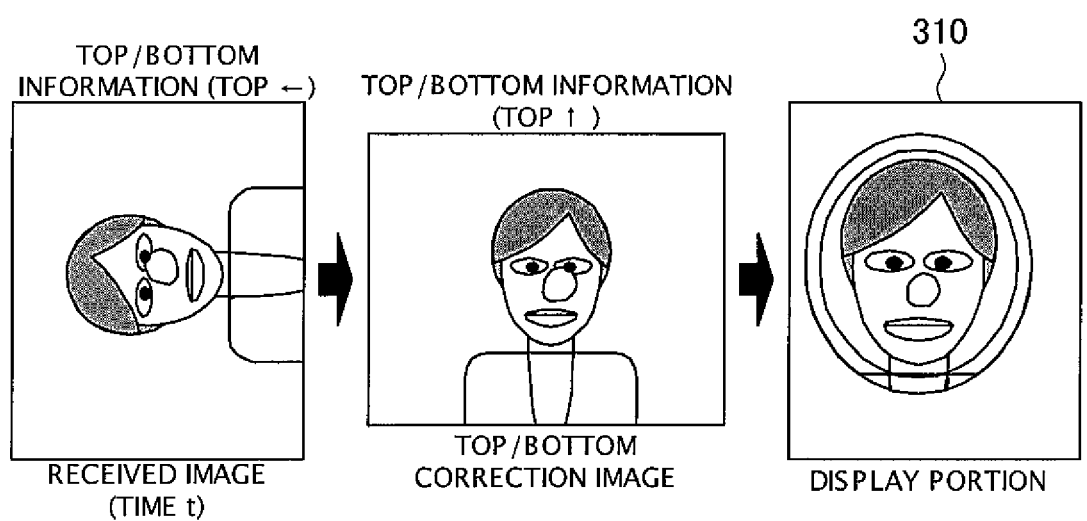
FIG. 14 is a diagram for explaining screen display control in the first embodiment and an explanatory diagram of processing for handling a case where the other party of communications is horizontal.
Figure 15:
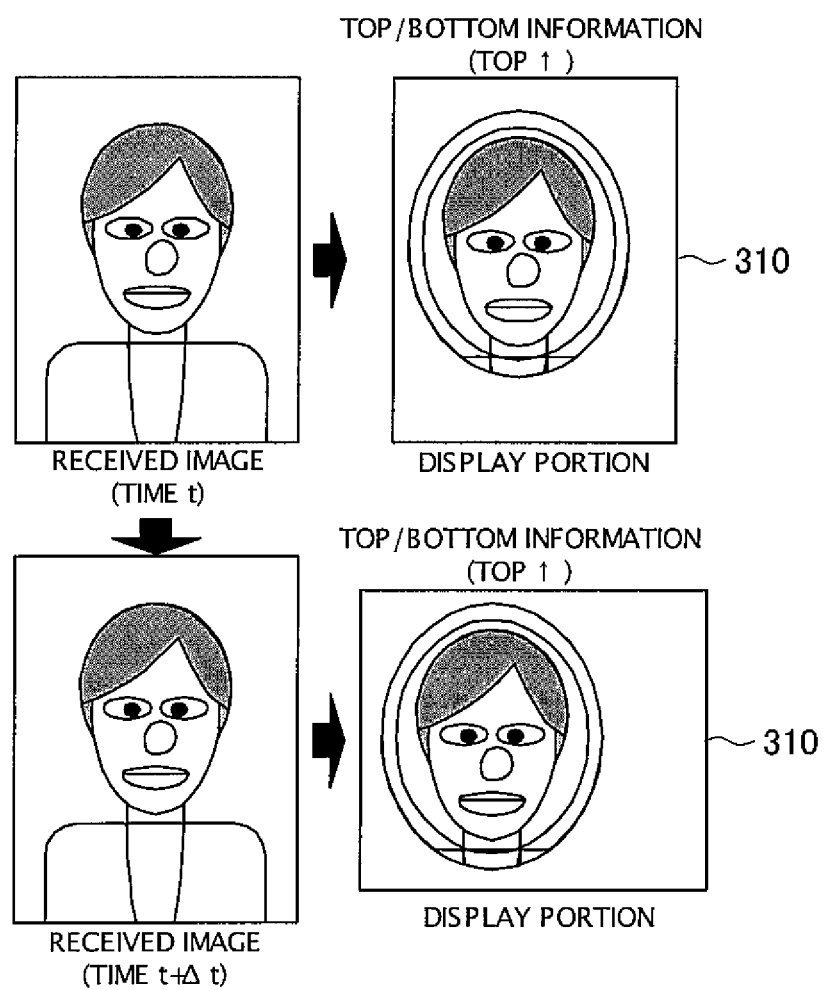
FIG. 15 is a diagram for explaining screen display control in the first embodiment and an explanatory diagram of processing for handling a case where one's own terminal is horizontal.
Figure 16:
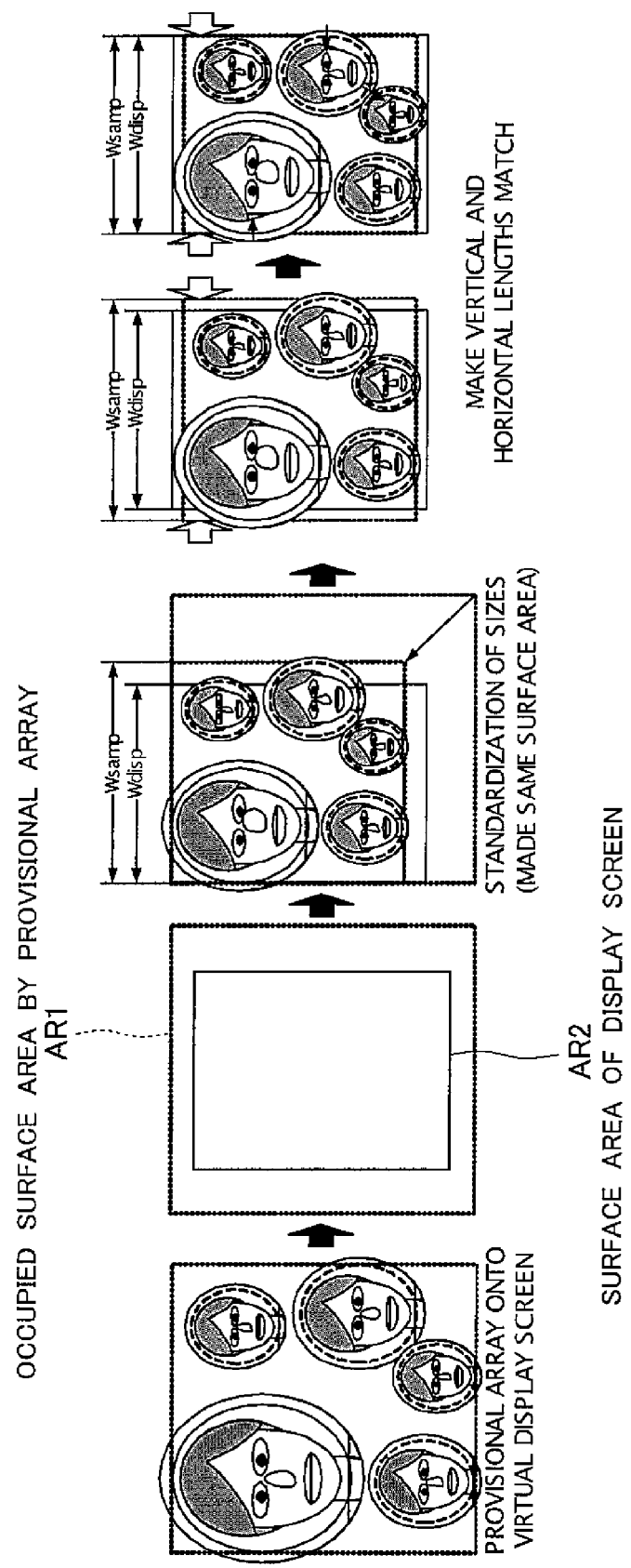
FIG. 16 is a diagram for explaining screen display control in the first embodiment and an explanatory diagram of processing for provisional array on a virtual image.

FIG. 4 to FIG. 16 are diagrams for explaining screen display control, in which FIG. 4 is an explanatory diagram of a circular window, FIG. 5 is an explanatory diagram of processing for handling superimposition of windows on each other, FIG. 6 is an explanatory diagram of processing for displaying an animated character in a case where the size of the circular window is a constant size or less, FIG. 7 are explanatory diagrams in a case where the size of the circular window is changed in accordance with a sound pressure or conversation time, FIG. 8 is an explanatory diagram of the processing when circular windows collide, FIG. 9 is an explanatory diagram of the extraction processing of face areas from received images, FIG. 10 is an explanatory diagram of the cutting processing after the extraction processing of face areas from received images, FIG. 11 is an explanatory diagram of processing for handling a case where cut areas stick out from the received images, FIG. 12 is an explanatory diagram of processing in accordance with the surface area of the face area, FIG. 13 is an explanatory diagram of processing for handling a case where there are a plurality of face judged areas, FIG. 14 is an explanatory diagram of processing for handling a case where the other party in communications becomes horizontal, FIG. 15 is an explanatory diagram of the processing for handling a case where the own terminal becomes horizontal, and FIG. 16 is an explanatory diagram of processing for provisional array onto a virtual image.

In the present embodiment, as explained above, a screen is split into a circular (oval) window eliminating dead zones.

A circular window 100, as shown in FIG. 4, has a slightly narrower circular area 102 inside an outer circle 101. A face area is extracted from the received image and enlarged/reduced and mapped as a whole so as to fit in the narrower circular area 101 (in superimposing border line).

In the present embodiment, as shown in FIG. 5, a circular window having the same size or less can be superimposed between the outer circle 101 of the circular window 100 and the allowable superimposition line (allowable superimposition area).

The allowable superimposition area can stick out from the outside of a display frame 3101 of the display portion 310.

Further, as shown in FIG. 6, when the size of the circular window 100 is a constant size determined in advance or less, an animated character corresponding to the person of that window, a telephone book, or another stored image etc. may be displayed instead of a face.

As shown in FIG. 7, the size of the circular window may be changed as well in accordance with the sound pressure of the speaker and/or speaking time according to the following equation:

$$V(t) = f(v(t)) + \beta \cdot v(t-1)$$

where, $V(t)$ indicates the size of a window at a time t, $v(t)$ indicates a sound pressure at the time t, $f(*)$ indicates a function for calculating the size from the sound pressure, and $\beta$ indicates a coefficient ($<1$).

As shown in FIG. 8, when a window collides with the outer line 101 of the circular window 100 or the allowable superimposition line, the window pushes or is pushed with a force in accordance with the size thereof and moves.

When the allowable line collides with a display screen frame line 3101, it is pushed back with a force in accordance with the size.

As shown in FIG. 9 and FIG. 10, characteristic points 111 of the face are retrieved from the received image, and the contours are extracted to extract the face. Then, when the face area 112 is once extracted, the face area is followed along and cut out in accordance with the motion vector.

As shown in FIG. 11r when a face is outside of (sticks out from) the received image, the area which can be cut is estimated from the motion vector and the cutting area 113 becomes just the part visible from the circular display screen (window).

When the ratio of the face image remaining on the display screen with respect to the size of the estimated face area becomes a constant value or less, that face is judged out of bounds.

As shown in FIG. 12, when the surface area of the face area is a constant value or more, the received image is judged as a "portrait image". When the surface area of the face area is less than the constant value, the received image is judged as a "non-portrait image".

When it is judged as a "portrait image", it is made a circular screen 3101. When it is judged as a "non-portrait image", it is made a rectangular screen 312. Even in the case of a "non-portrait image", the display size changes in accordance with the sound pressure from the same transmitting side.

As shown in FIG. 13, when there are a plurality of areas judged as faces, priority is given to the larger surface areas when the number is a constant value or less. When the number is a constant value or more, the screen is displayed by a rectangular display screen 312 in the same way as a non-portrait image.

As shown in FIG. 14, in a case where the terminal of the other party in communications becomes horizontal, the image is rotated based on the top/bottom information from the terminal of the other party and the face area is cut and mapped.

As shown in FIG. 15, when the own terminal is horizontal, the image is rotated based on the top/bottom information from the own terminal and the face area is cut and mapped.

The display position of each screen is calculated and the screens are arranged on a virtual display screen based on the received images, screen information (shapes), and size information as shown in FIG. 16. When a surface area AR1 of a rectangle including all arranged screens exceeds a surface area AR2 of the display screen, similarity transformation is carried out so that the surface area of the provisional array becomes equivalent to the surface area of the display screen.

The transformation rate when performing the similarity transformation is used for the size correction the next time.

Further, in a case when the surface area of the provisional array is equivalent to the surface area of the display screen or less and the vertical and horizontal lengths of the provisional array are larger than the vertical and horizontal lengths of the display screen, the lengths of the provisional array are compressed to become equivalent. Note that when outer pressure is applied to the arranged individual screens, the screens move depending upon the magnitude of the outer pressure.

As explained above, according to the present first embodiment, packets are processed linked together under the control of the display image control portion 306 based on the address of the transmitting side. It is possible to calculate the screen size for mapping of packets of the video information from the transmitting side address based on the sound pressure (volume) of the audio information (VoIP) from the transmitting side address. Further, it is possible to correct the top/bottom of the same screens or display an instructed animated character, so it is possible to optimally update the sizes and positions of the screens adaptively in accordance with the situation without operation by the user.

As a result, even at the time of connection of a plurality of terminals, the other party in conversation can be easily confirmed and control is performed so that the images (screens) are not superimposed, therefore the states of all members in conversations can be confirmed at a glance. Further, a new participant can be easily handled as well.

Second Embodiment

Figure 17:
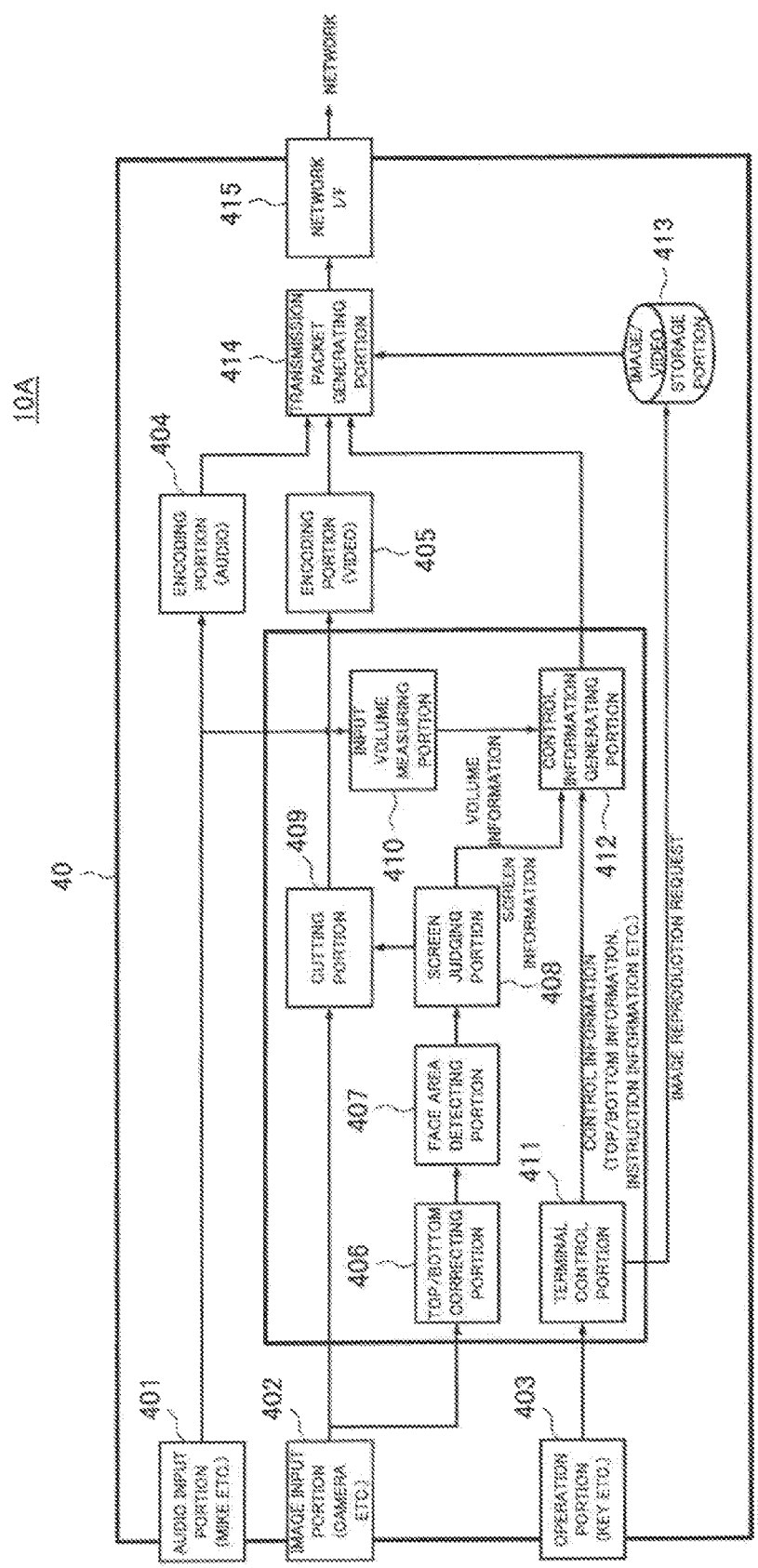
FIG. 17 is a diagram showing an example of the configuration of a mobile communication terminal according to a second embodiment of the present invention and a block diagram showing an encoder.
Figure 18:
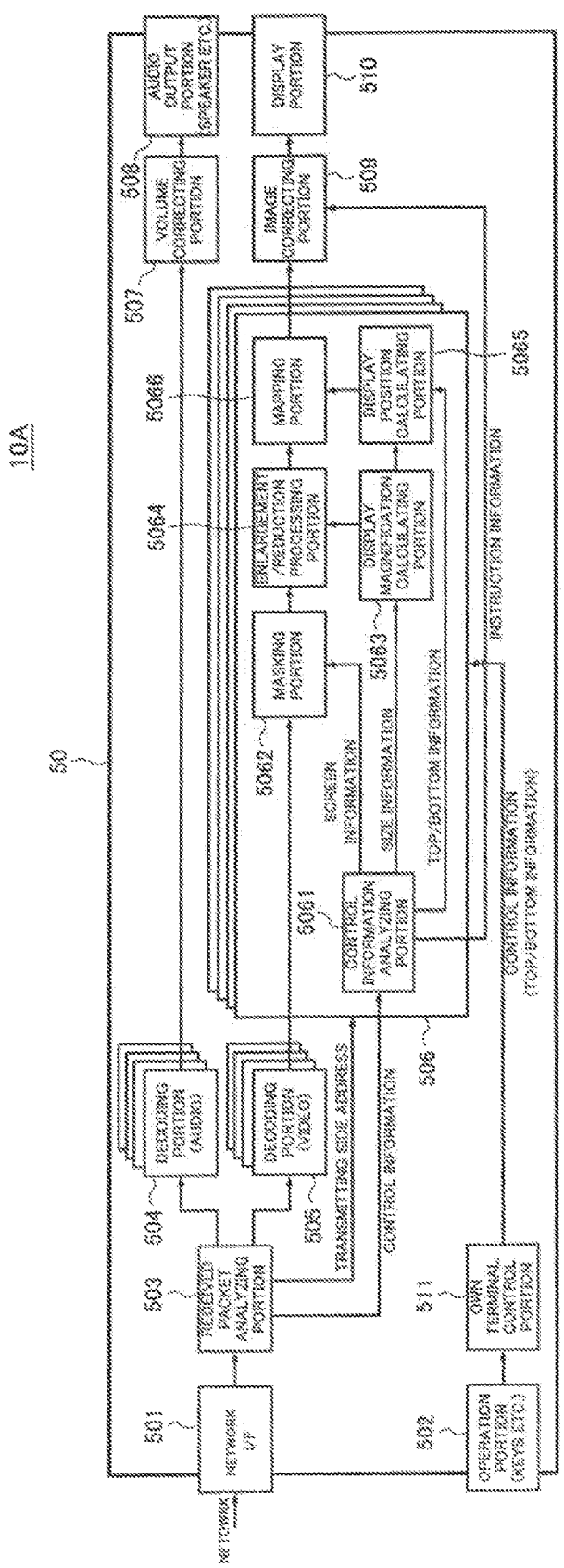
FIG. 18 is a diagram showing an example of the configuration of a mobile communication terminal according to a second embodiment of the present invention and a block diagram showing a decoder.
Figure 19:
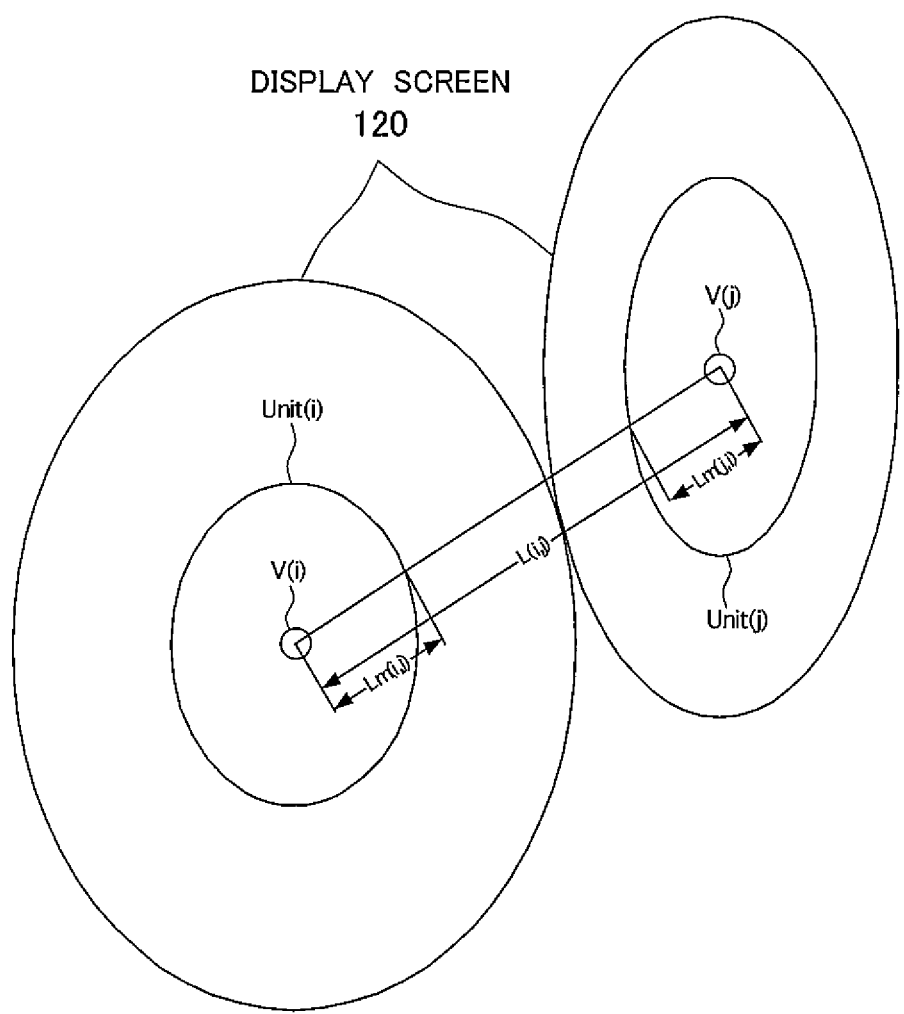
FIG. 19 is a diagram for explaining processing for calculation of a display magnification.

FIG. 17 and FIG. 18 are diagrams showing an example of the configuration of a mobile communication terminal according to a second embodiment of the present invention, in which FIG. 17 is a block diagram showing an encoder, and FIG. 18 is a block diagram showing a decoder.

As explained before, in the first embodiment, the sizes and positions of the screens can be adaptively and optimally updated in accordance with the situation without operation by the user.

However, if the user sets the screen sizes in accordance with the volumes, wasted space is liable to be increased or all screens might not be able to be displayed on the display screen.

Specifically, where the volumes of all of the screens are small, small screens will float on the display screen. On the other hand, when all screens have the maximum volume, the total surface area of the screens will sometimes exceed the surface area of the display screen.

Contrary to this, by locally standardizing the total surface area to the display screen area, it is possible to fit all screens in the display screen, but the rearrangement (movement) of screen positions the next time is liable to become discontinuous.

Therefore, in the present second embodiment, a mobile communication terminal enabling the sizes and positions of the display image areas (screens) to be adaptively and optimally updated in accordance with the magnitudes of volumes, number of display image areas (screens) to be displayed, or other situations without operation by the user, having continuous rearrangement (movement) of display image areas, and enabling rearrangement by the optimum sizes even with different shapes while maintaining the characteristics of the first embodiment.

Below, although there are portions overlapping the first embodiment, the concrete configuration and functions of a mobile communication terminal 10A according to the second embodiment will be explained.

The present mobile communication terminal 10A has an encoder 40 serving as the transmitting side and a decoder 50 as the receiving side and is configured so that multi-point communications are possible.

The encoder 40 has a function of transmitting encoded audio data and image data to a network with instruction information for the receiving side terminals and top/bottom information of the images etc. added to form packets.

The instruction information of the transmitting side added to the audio data and image data includes information for identifying the transmitting side of the instructed image (for example IP address and MAC address), and position information indicating the position on the received image.

The encoder 40 serving as the transmitting side has a function of generating corresponding instruction information, screen information, and volume information and transmitting the same to the other party during the communications when there is a screen at the instructed point on the display screen.

The encoder 40 of FIG. 17 has a microphone or other audio input portion 401, a digital camera or other image input portion 402, an operation portion 403 enabling key input etc., an audio encoding portion 404 for encoding the audio data input by the audio input portion 401, an image encoding portion 405 for encoding the image data input from the image input portion 402 and cut to a predetermined area, a top/bottom correcting portion 406 for correcting the top/bottom of the captured image so as to match with the top/bottom of the screen (terminal screen) of the display portion on the receiving side based on the top/bottom information linked with the captured image, a face area detecting portion 407 for detecting and extracting the area of the face from the top/bottom corrected captured image, a screen judging portion 408 for judging the used screen (display image area to be displayed) based on the face area detected at the face area detecting portion 407 and generating screen information, a cutting portion 409 for cutting the corresponding area from the received image based on the judgment of the screen judging portion 408, an input volume measuring portion 410 for measuring the input volume by the audio input portion 401 and generating volume information, a terminal control portion 411 for controlling a terminal based on the input information of the operation portion 403, a control information generating portion 412 for generating control information including the instruction information, top/bottom information, screen information, volume information, etc. based on the instruction of the terminal control portion 211, a storage portion 413 for storing image and/or video, a transmission packet generating portion 414 for generating the encoded audio data and image data, control information, and image/video data read out from the storage portion 413 based on the instruction of the terminal control portion 411 as transmission packets, and a network interface (I/F) 415 able to wirelessly communicate with the network and transmitting the generated transmission packets via the network to the terminals of the other parties of communications or server.

The decoder 50 has a function of reproducing the audio data and image data transmitted from an encoder 50 as the other party of communications (transmitting side) and received via the network.

The decoder 50 has a function of displaying an image including a face as a specific area by selecting a screen (display area controlled in size) to be used and generating audio based on the control information of the received image when performing for example multi-point communications.

The decoder 50 has a function of splitting screens into circular (concept including oval) windows eliminating any dead zones when displaying the same.

While explained in the first embodiment, the decoder is configured to split screens into circular (oval) windows for the following reason.

In general, a display screen has been split into rectangles. Human faces are basically oval, so the four corners of such rectangles become dead zones. These dead zones consequently make the areas for displaying the faces narrower (smaller).

Therefore in the present second embodiment, it is configured that the display screen is split into the circular (oval) windows eliminating dead zones.

Further, the decoder 50 has a function of displaying a multi-screen image and has a function of calculating the display magnifications of screens based on the line segments connecting centers of screens, the thicknesses of standard shapes, and the magnitudes of audio and controlling the movement and new generation of screens based on these display magnifications to thereby optimally form a plurality of screens on the display screen.

The concrete processing will be explained in detail later with reference to the drawings.

The decoder 50 of FIG. 18 has a network interface (I/F) 501 able to perform wireless communications with the network and receiving packets including audio data, image (video) data, control information and instruction information, screen information, volume information etc. transmitted from the transmitting side, an operation portion 502 enabling key input etc., a received packet analyzing portion 503 for analyzing packets received at the network interface 501 and extracting the audio data, image data, transmitting side address, and control information (top/bottom information and instruction information etc.), an audio decoding portion 504 for decoding the audio data extracted by the received packet analyzing portion 503, a video decoding portion 505 for decoding the video data extracted by the received packet analyzing portion 503, a display image control portion 506 for controlling the sizes and display modes of the screens to be displayed (display window) based on the image data, transmitting side address, control information, screen information, size information, and top/bottom information decoded by the video decoding portion 505, a volume correcting portion 507 for correcting the volume of the audio decoded by the audio decoding portion 504, a speaker or other audio output portion 508 for generating sound with a volume corrected by the volume correcting portion 507, an image correcting portion 509 for correcting an image controlled in size and display mode by the display image control portion 506, an LCD or other display portion (image output portion) 510 for displaying an image via the image correcting portion 509, and an own terminal control portion 511 for giving control information (top/bottom information) to the display image control portion 506 based on the input information from the operation portion 502.

Note that, the encoder 40 and decoder 50 can share the operation portions 403 and 502, network interfaces 410 and 501, terminal control portion 411, and own terminal control portion 511.

Below, the more concrete configuration and functions of the display image control portion 506 characterizing the present second embodiment and concrete examples of the display modes of the screens will be explained in sequence.

The display image control portion 506 of FIG. 18 has a control information analyzing portion 5061 for extracting the screen information, size information, top/bottom information, and instruction information based on the control information supplied from the received packet analyzing portion 503, a masking portion 5062 for masking the video decoded at the video decoding portion 505 based on the screen information, a display magnification calculating portion 5063 for calculating display magnifications of screens to be displayed (display image areas) based on the size information, a reducing/enlarging portion 5064 for reducing/enlarging images after the masking according to display magnifications calculated at the display magnification calculating portion 5063, a display position calculating portion 5065 for calculating display positions according to display magnifications calculated at the display magnification calculating portion 5063 and the top/bottom information, and a mapping portion 5066 for mapping images obtained at the reducing/enlarging portion 5064 at positions on the display portion 510 obtained at the display position calculating portion 5065.

The screens controlled in sizes and display modes by the display image control portion 506 of the present second embodiment are displayed as a multi-screen image for displaying a plurality of screens on one display screen.

In the display magnification calculating portion 5063 of the present embodiment, a screen has center point coordinates (P(i)) indicating the display position of the screen, a standard shape (Unit(i)) indicating the shape of the screen, a magnitude (V(i)) of the audio linked with the screen, and a display magnification (R(i)) when displaying the screen on the display screen. The display magnification (R(i)) takes the smallest value among the line segments (L(i,j)) connecting with center point coordinates (P(j)) of the surrounding screens, the thickness (Lm(i,j),Lm(j,i)) of the standard shape on that line segment, and the magnitude (V(i) V(j)) of the audio.

The display magnification calculating portion 5063 sets the magnitude (V(k)=0) of the audio and the thickness (Lm(k,i)=0) at a point vertically contacting the display screen boundary from the screen center and calculates the display magnification (R(i,k)).

Further, the screen moves to a position that makes the display magnification (R(i)) the largest.

Further, the screen generates the center of a new screen at the position where the display magnification (R(k)) is the largest Further, the standard shape is given an equal surface area.

Further, separation lines are drawn between screens formed with the standard shapes. Areas separated by these separation lines are defined as new screens.

Next, the calculation of the display magnification of a screen controlled in size and display mode, calculation of the position of generation of a new screen, calculation of the position of movement of a screen by the display screen, and so on by the display image control portion 506 according to the present second embodiment will be explained more concretely.

As shown in FIG. 4, each screen 120 has a standard shape (Unit). The screen 120 on the display screen of the display portion 310 is displayed enlarged or reduced in standard shape (Unit) according to the display magnification (R).

Calculation of Display Magnification (R)

The display magnification calculating portion 5063 calculates the distance (L(i,j)) between the centers of the screen i and screen j and the thicknesses (Lm(i,j)) and Lm(j,i)) in the standard shapes (Unit) from the centers of the screens to the above directions and calculates the display magnification (R(i,j)) calculated in the screen i from the screen j in the following way based on the magnitude (V(i),V(j)) of the received audio in the contents displayed on the screens:

[Equation 1]

$$R(i, j) = \left(L(i, j) \times \frac{V(i) \times Lm(i, j)}{V(i) \times Lm(i, j) + V(j) \times Lm(j, i)}\right) + Lm(i, j)$$

The portion calculates the display magnifications among screens present at the surroundings and makes the smallest value among those display magnifications the actual display magnification (R(i)) as in the following equation:

[Equation 2]

$$R(i) = \min_{j=all}(R(i, j))$$

Calculation of Position of Generation of New Screen

The display magnification calculating portion 5063 arranges provisional centers on the display screen and calculates the display magnification (Rmin) at each center. It makes the position at which the largest value is obtained among the display magnifications (R) the center point of generation of a new screen.

[Equation 3]

$$R\min(k') = \min_{i=all}(R(k', j))$$

[Equation 4]

$$R(k) = \max_{k'=all}(R\min(k'))$$

The portion makes the center (P(k)) satisfying this condition the center point of the new screen.

Calculation of Movement Position of Screen

The portion calculates the display magnification (R) at each position within a constant distance (set I) from the position at the present (t) in each screen and makes the point at which the largest value is obtained among the display magnifications the center point the next time (t+Δt).

[Equation 5]

$$R\min(i + \Delta i) = \max_{j=all}(R(i + \Delta i, j))$$

[Equation 6]

$$R'(i) = \max_{\Delta i = I}(R\min(i + \Delta i))$$

The screen moves to the center (P(t+Δt)) satisfying this condition.

The position of the screen moves on the display screen along with the elapse of time. For this reason, in the generation of a new screen, it is not necessary to perform the computation for all of empty positions on the display screen. That is, even when judging the new generation positions for several points on the display screen and arranging the position by the result of that, along with the elapse of time, the screen moves to the position with the largest display magnification. Due to this, it becomes possible to reduce the computation load in the generation.

Positional relationships of the screens change all the time, therefore the thickness (Lm(*)) of the standard shape in the calculation of the display magnification (R(*)) must be calculated for the direction at that time.

Concerning the calculation of the thickness, it may be calculated by drawing a digital straight line from the center (with respect to a complex shape) to the target direction. However, this leads to an increase of the computation load. As opposed to this, for each standard shape, it becomes possible to reduce the computation load at the time of the computation of the display magnification by referring to a table calculating the thickness with respect to each angle in advance.

Processing of Four Walls of Display Screen

In each screen 120, the display magnification (R) is calculated according to the following computation rule with the four walls.

Figure 20:
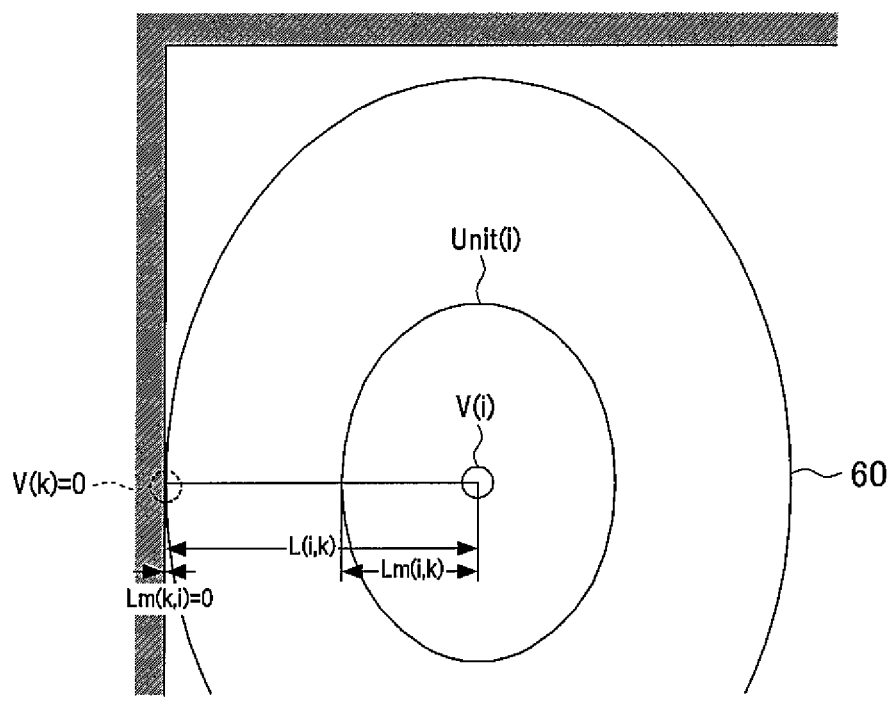
FIG. 20 is a diagram for explaining wall processing of the four sides of a display screen.

As shown in FIG. 20, a point vertically dropped to the wall from the center of the display screen is made the center of the wall in the calculation. The line segment (L(i,k)) between the centers, thicknesses (Lm(i,k),Lm(k,i)) in the standard shape (Unit), and magnitudes (V(i,),V(k)) of the received audio of the screen are calculated. At this time, the magnitude of audio at the wall is defined as (V(k)=0) and the thickness of the standard shape is defined as (Lm(k,i)=0). The calculation is carried out in the same way as the calculation of the display magnification (R) explained before.

In each screen 120, when calculating the display magnification (R(i)), the display magnifications (R(i,k)) with walls are calculated in the same way as the display magnifications (R(i,j)) of the surrounding screens. Among these, the smallest value is determined as the display magnification (R(i)) when actually displaying the screen.

Figure 21A:
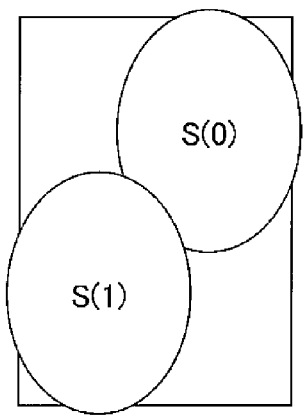
FIG. 21A to FIG. 21C are diagrams showing examples changing a ratio of magnitudes of audio (V(0),V(1)) in screens (S(0),S(1)) having oval standard shapes.
Figure 21B:
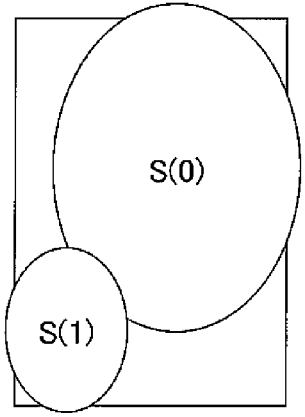
Figure 21C:
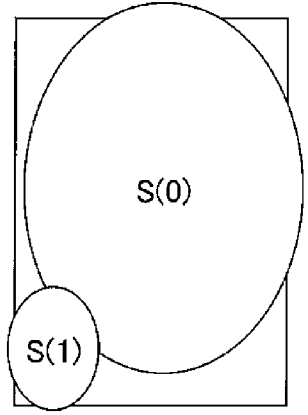

Examples of changing the ratio of magnitudes (V(0),V(1)) of the audio on the screens (S(0),S(1)) with oval standard shapes will be shown in FIG. 21A to FIG. 21C. In FIG. 21A to FIG. 21C, cases where the ratios (V(0):V(1)) of the magnitudes of the audio are 1:1, 2:1, and 3:1 are shown from the left. In this way, it becomes possible to adaptively change the screen sizes in accordance with the magnitude of the volume.

Figure 22A:
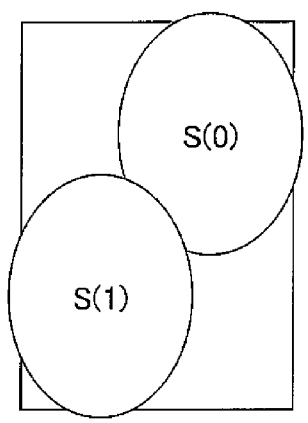
FIG. 22A to FIG. 22C are diagrams showing examples of increasing or decreasing a number of screens to be formed on a display screen among screens (S(0), S(1), S(2), and S(3)) having oval standard shapes.
Figure 22B:
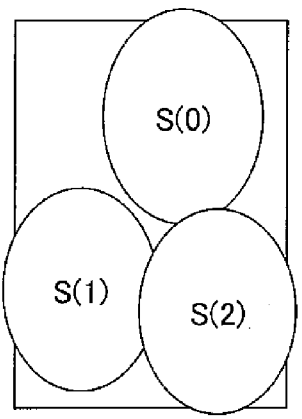
Figure 22C:
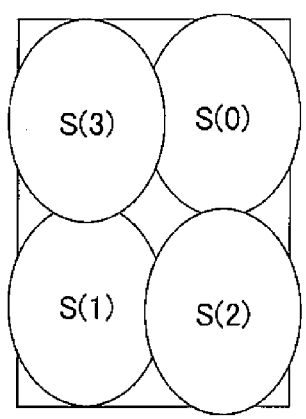

Examples of increasing or decreasing the number of screens formed on the display screen in the screens (S(0), S(1), S(2), and S(3)) with oval standard shapes are shown in FIG. 22A to FIG. 22C.

In FIG. 22A to FIG. 22C, cases where the numbers of screens=2, 3, 4 are shown from the left.

In this way, it becomes possible to adaptively change the screen sizes in accordance with the number of the screens and form all screens on the display screen.

Figure 23A:
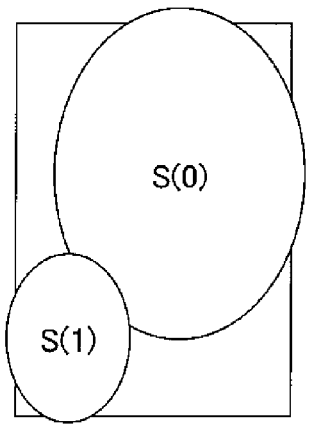
FIG. 23A to FIG. 23C are diagrams showing examples of increasing or decreasing the number of screens to be formed on a display screen in the screens (S(0), S(1), S(2), and S(3)) having oval standard shapes and making the magnitude of audio of one screen among them twice the magnitude of audio of the other screens.
Figure 23B:
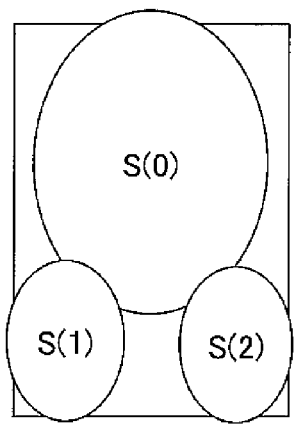
Figure 23C:
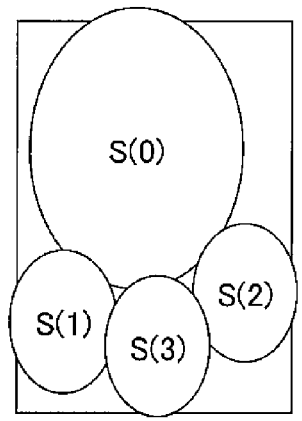

Examples of increasing or decreasing the number of screens to be formed on the display screen in the screens (S(0),S(1),S(2),S(3)) with oval standard shapes and doubling the magnitude of audio of one screen among them from the magnitude of audio of the other screens are shown in FIG. 23A to FIG. 23C.

In FIG. 23A to FIG. 23C, from the left, cases where the numbers of screens=2, 3, 4 are shown. A case where the ratio (V(0):V(1)) of magnitudes of audio is 2:1, a case where the ratio (V(0):V(1):V(2)) is 2:1:1, and a case where the ratio (V(0):V(1):V(2):V(3)) is 2:1:1:1 are shown.

In this way, it becomes possible to adaptively change the screen sizes in accordance with the number of screens and form all screens on the display screen. This is an example where the person shown in the screen (S(0)) is speaking. In this way, when one person is speaking, just the screen of that person can be adaptively enlarged and/or reduced in screen size in accordance with its size.

Figure 24A:
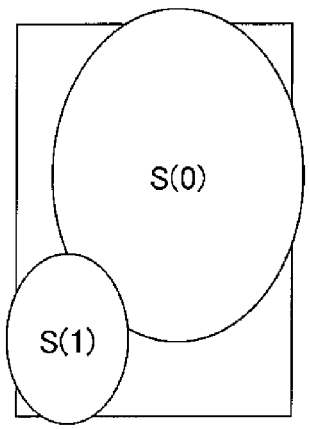
FIG. 24A to FIG. 24C are diagrams showing examples of increasing or decreasing the number of screens to be formed on a display screen in the screens (S(0), S(1), S(2), and S(3)) having oval standard shapes and making the magnitude of audio of one screen among them a half of the magnitude of audio of the other screens.
Figure 24B:
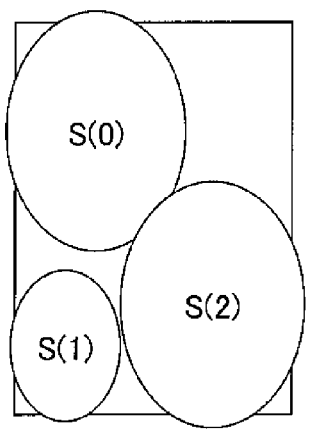
Figure 24C:
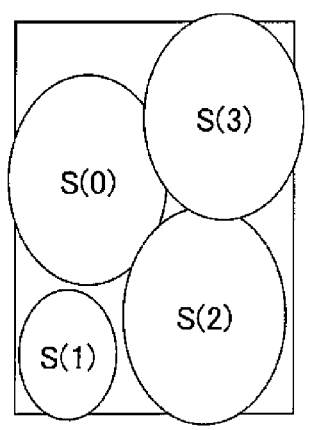

Examples of increasing or decreasing the number of screens to be formed on the display screen in the screens (S(0), S(1), S(2), S(3)) with oval standard shapes and halving the magnitude of audio of one screen among the screens from the magnitude of audio of the other screens are shown in FIG. 24A to FIG. 24C.

In FIG. 24A to FIG. 24C, from the left, cases where numbers of screens=2, 3, 4 are shown. A case where the ratio (V(0):V(1)) of magnitudes of audio is 2:1, a case where a ratio (V(0):V(1):V(2)) is 2:1:2, and a case where a ratio (V(0):V(1):V(2):V(3)) is 2:1:2:2 are shown.

In this way, it becomes possible to adaptively change the screen size in accordance with the number of screens and form all screens on the display screen. This is an example where a person other than the person shown on the screen (S(0)) is speaking. In this way, even when a plurality of persons is speaking, it becomes possible to adaptively enlarge and/or reduce the screen size in accordance with the situation.

Examples of cases where the standard shapes of ovals (S(oval), circles (S(circle)), and rectangles (S(rectangle)) are mixed (magnitudes of audio are equal) are shown in FIG. 25A to FIG. 25D.

In FIG. 25A to FIG. 25D, from the left, the case of a rectangle and an oval, the case of a circle and an oval, the case of a circle and a rectangle, and the case of a circle at the bottom and an oval and rectangle are shown.

Even when the standard shapes are different, by setting surface areas of the standard shapes equal, the screens can be adaptively adjusted in screen sizes. When the magnitudes of audio are equal, it becomes possible to visually display the screen sizes equal.

Figure 26A:
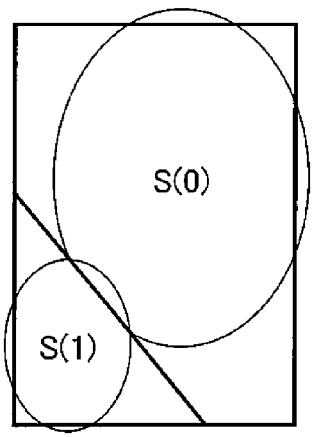
FIG. 26A to FIG. 26C are diagrams showing examples where separation lines (bold lines) of areas are formed between screens, and areas based on the separation lines are defined as display areas of the screens.
Figure 26B:
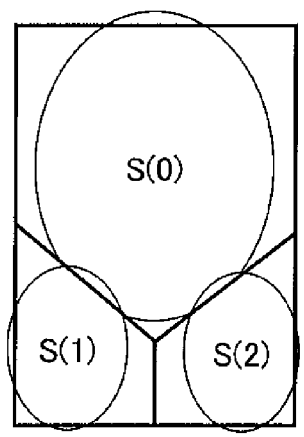
Figure 26C:
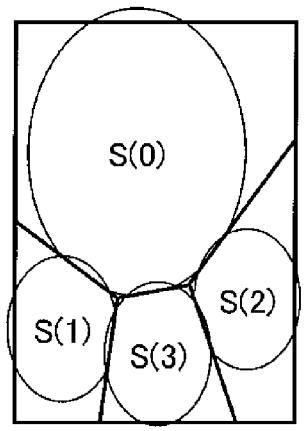

Further, in the present embodiment, dead zones outside the screens are reduced. Therefore, as shown in FIG. 26A to FIG. 26C, separation lines (bold lines) of areas are formed between the screens, and areas based on the separation lines are made the display areas of screens. Due to this, it becomes possible to split the display screen and use it to the maximum limit while adapting to an increasing or decreasing in the number of screens and an increasing or decreasing in magnitude of audio of the screens.

The examples of FIG. 26A to FIG. 26C show a case where the ratio (V(0):V(1)) of magnitudes of audio is 2:1, a case where the ratio (V(0):V(1):V(2)) is 2:1:1, and a case where the ratio (V(0):V(1):V(2):V(3)) is 2:1:1:1.

Next, screen display control at the display portion 510 in which the size and display mode are controlled as explained above will be explained with reference to FIG. 27 to FIG. 31.

In the present second embodiment, as explained before, the display screen is split into the circular (oval) windows eliminating dead zones.

Figure 27:
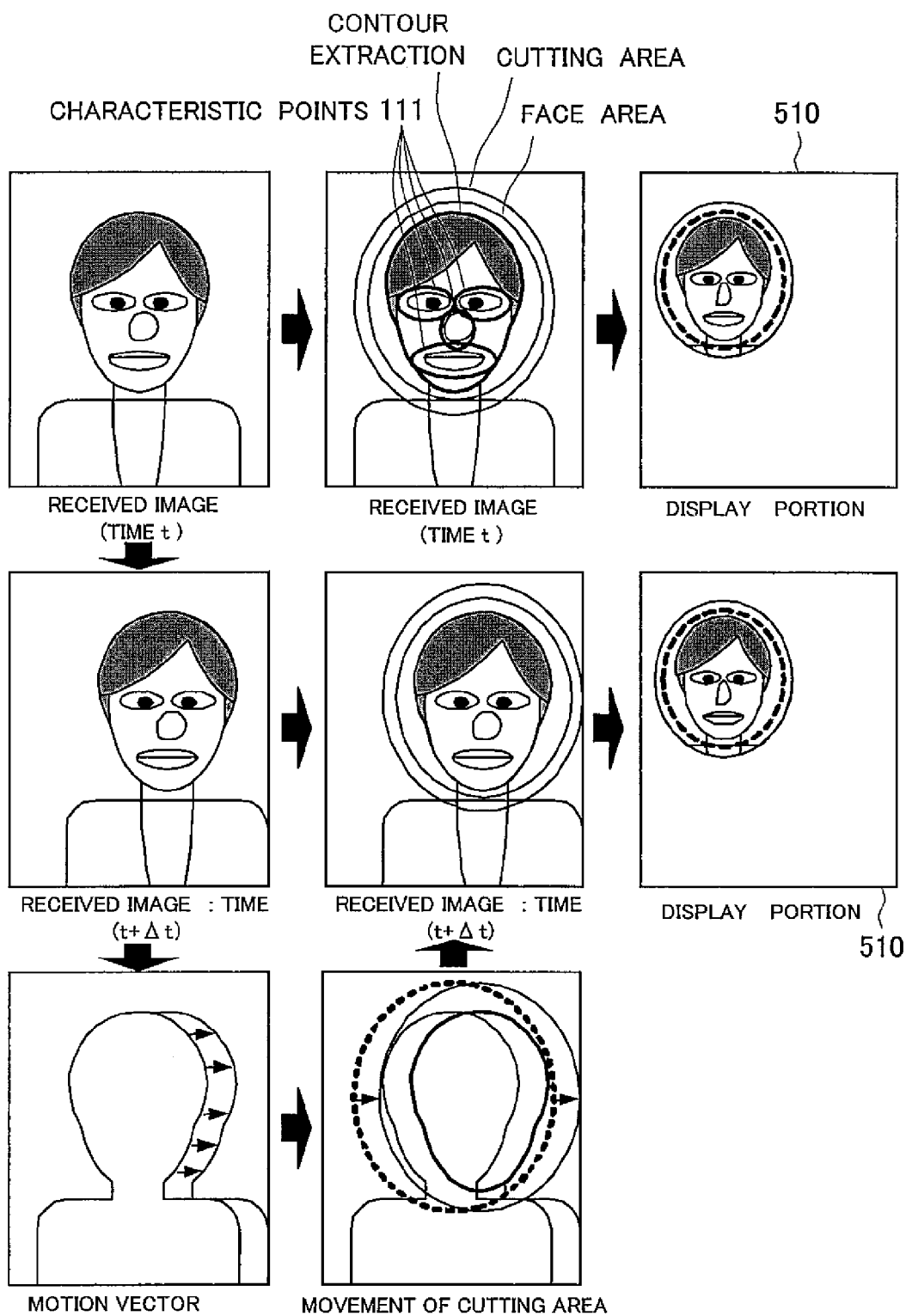
FIG. 27 is a diagram for explaining screen display control in the second embodiment and an explanatory diagram of processing for extraction of face areas from received images.
Figure 28:
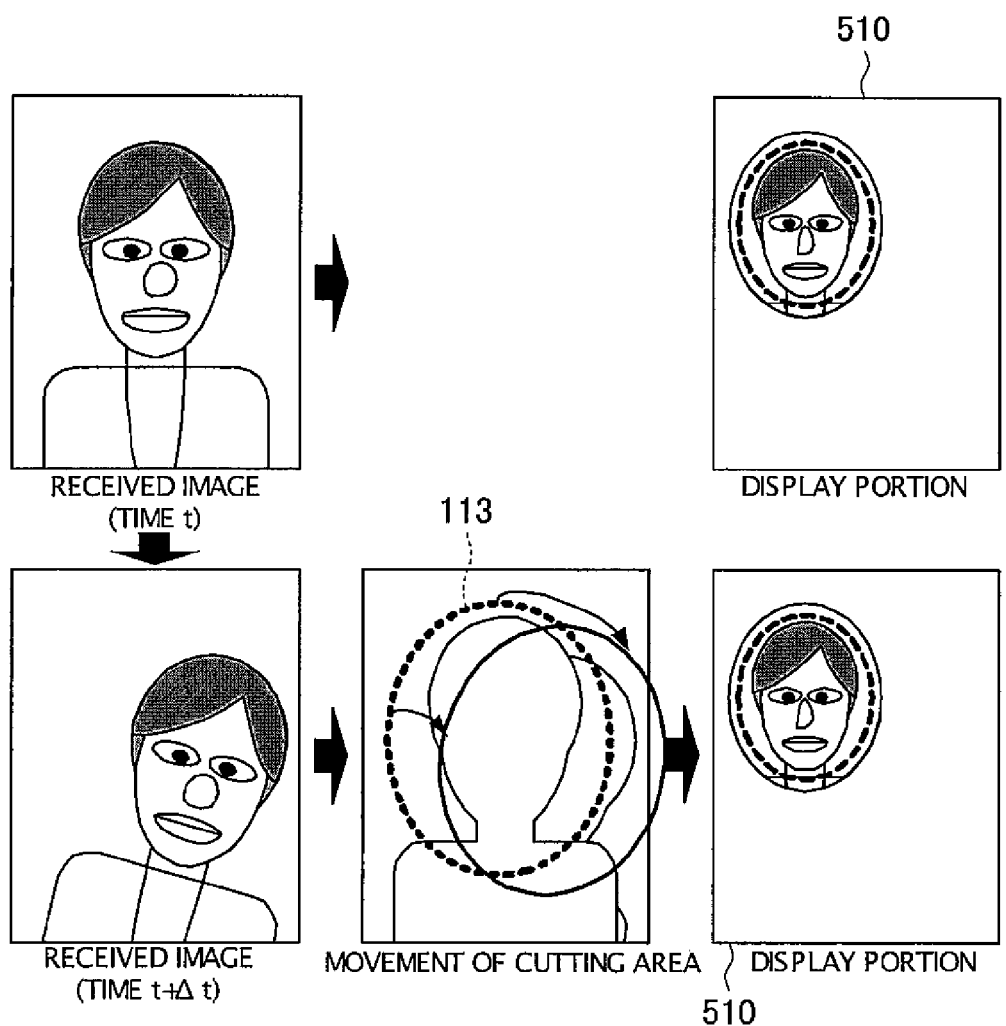
FIG. 28 is a diagram for explaining screen display control in the second embodiment and an explanatory diagram of cutting processing after processing for extraction of face areas from received images.

As shown in FIG. 27 and FIG. 28, in the image displayed on the display screen, characteristic points of a face are extracted from the face on the transmitting side (encoder side) or receiving side (decoder side), and the face area is calculated based on this. The image is cut so that this face area is included by the screen and is mapped on the screen.

As shown in FIG. 27 and FIG. 28, the characteristic points 111 are retrieved from the received image, and the contours are extracted to extract the face. Then, when the face area is once extracted, the face area is traced and cut out in accordance with the motion vector.

Figure 29:
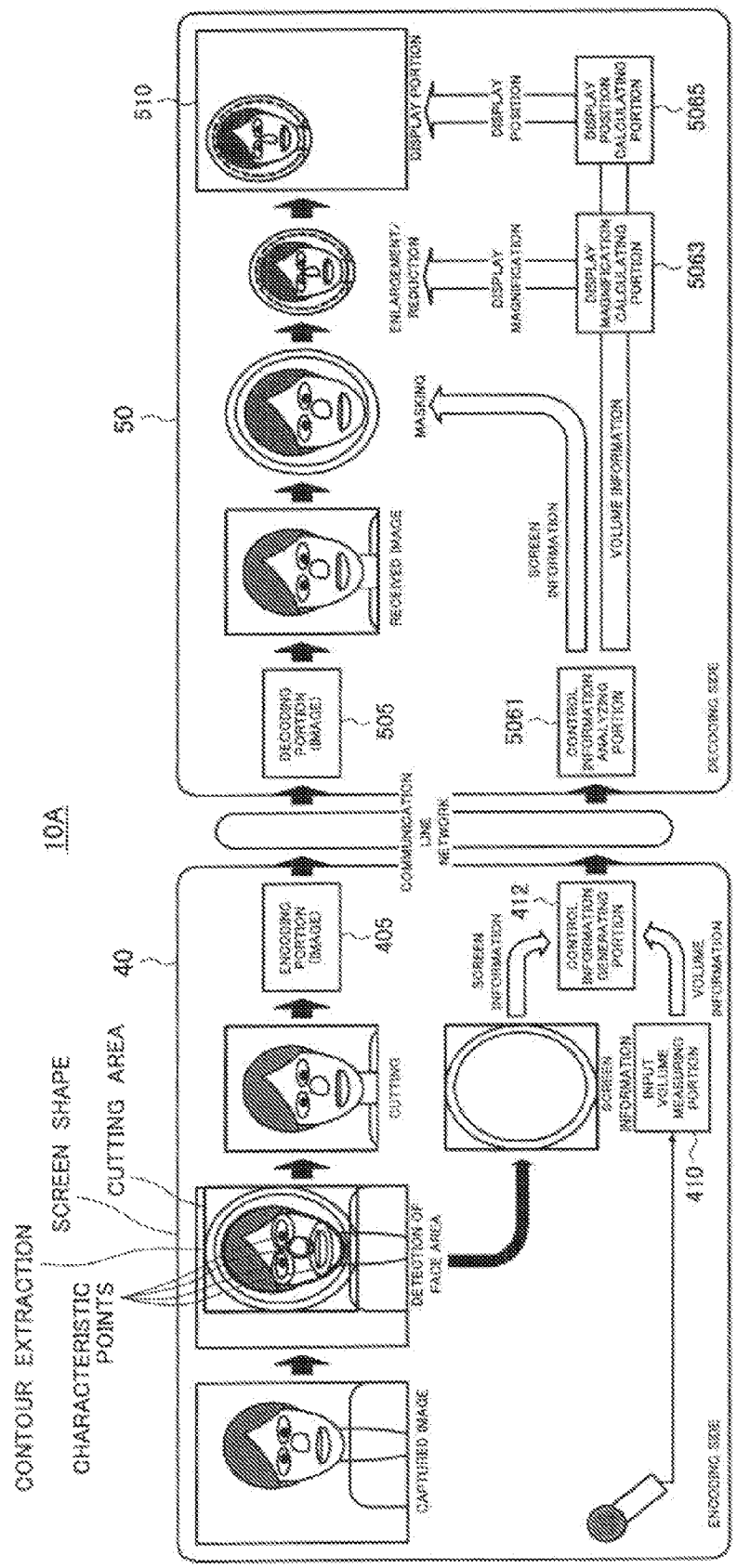
FIG. 29 is a diagram schematically showing an operation of the second embodiment.

In the second embodiment, as shown in FIG. 29 linked with FIG. 17 and FIG. 18, the encoder 40 side (encoding side) detects the face area and selects a circular screen so as to encompass the detected face area and so that the area other than the face becomes the smallest. The rectangular area including the circular screen is cut as the transmitted image. This is encoded and transmitted as packets together with the screen information and the volume information of the input audio of a microphone etc.

Figure 30:
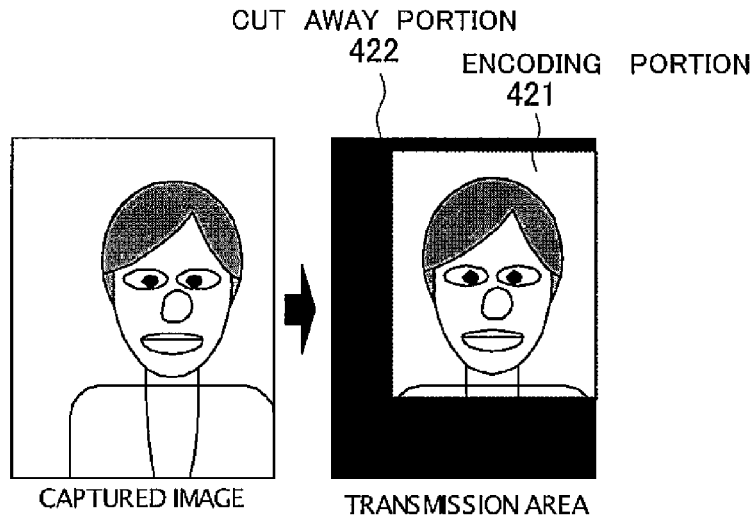
FIG. 30 is a diagram for explaining the operation of the second embodiment and a diagram showing an example of a transmission area of a captured image on the transmitting side.

The encoder 40, as shown in FIG. 30, encodes the part 421 of the captured image. The hatching part is the cut away part 422 which is omitted from the encoding. The size of the image data to be transmitted is reduced as a result.

Figure 31:
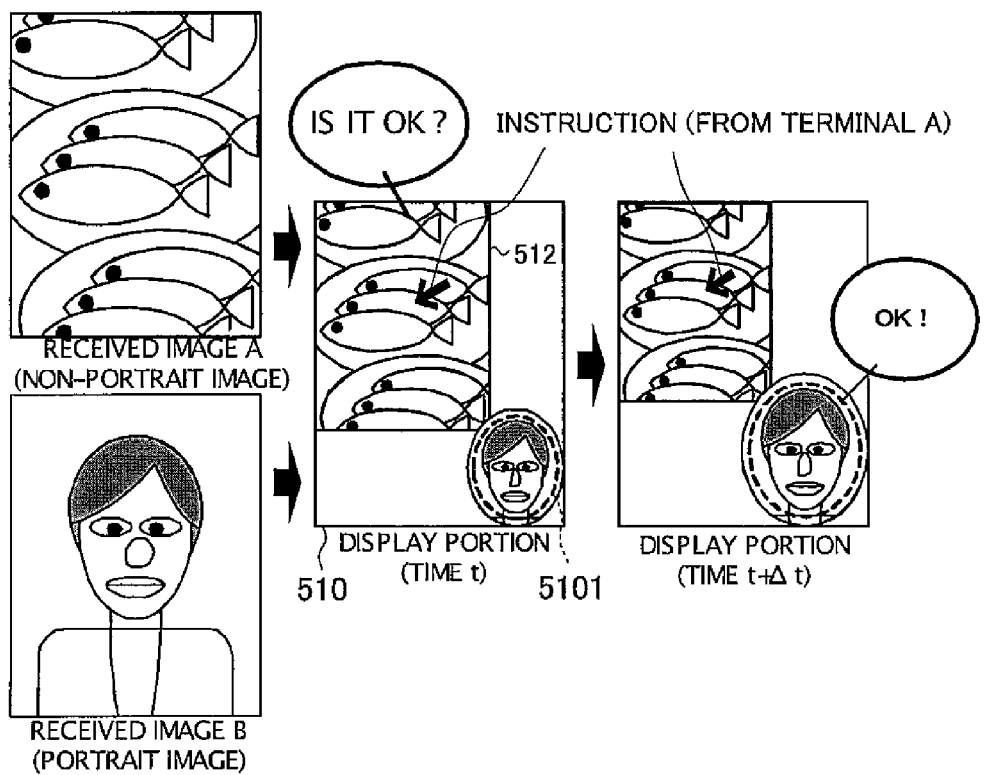
FIG. 31 is a diagram for explaining screen display control in the second embodiment and an explanatory diagram of processing in accordance with the surface area of a face area.

Further, as shown in FIG. 31, the invention can be applied to a case of analyzing the captured content and changing the screen shape in accordance with the captured content.

In the example of FIG. 31, the screen shape is made oval in a case where it is judged that a person is captured. The screen shape is made rectangular in cases other than this.

In the example of FIG. 31, in the same way as the case of FIG. 12, when the surface area of the face area is a constant value or more, the received image is judged to be a "portrait image". When the surface area of the face area is less than the constant value, the received image is judged to be a "non-portrait image".

When judged to be a "portrait image", a circular screen is used. When judged to be a "non-portrait image", a rectangular screen is used. Even in the case of a "non-portrait image", the display size is changed in accordance with the sound pressure from the transmitting side.

Then, as shown in FIG. 29, the decoder 50 masks the received image decoded at the video decoding portion 505 from the received data based on the screen information extracted at the control information analyzing portion 5061.

Further, the display magnification calculating portion 5063 calculates the display magnification based on the size information and reduces/enlarges the masked image according to the magnification calculated at the reducing/enlarging portion 5064. On the other hand, the display position calculating portion 5065 calculates the display position according to the calculated display magnification and displays a screen including the image reduced or enlarged at the calculated display position on the display portion 510.

The load in processing in the case of multi-point communications where the terminal equipment is configured as shown in FIG. 17 and FIG. 18 will be considered.

The processing in the case where the number of terminal equipment is increased to N on the decoder 30 side becomes as follows.

$$O_{new} = N \times (\text{masking processing} + \text{reduction/enlargement processing} + \text{mapping processing} + \text{display magnification calculation} + \text{display position calculation})$$

Contrary to this, the processing on the decoder side in a case of performing the processing of the transmitting side (encoder side) of the present embodiment on the decoder side becomes as follows.

$$O_{old} = N \times (\text{top/bottom correction processing} + \text{face area detection} + \text{screen judgment} + \text{cutting processing} + \text{size calculation} + \text{reduction/enlargement processing} + \text{display magnification calculation} + \text{display position calculation} + \text{mapping processing})$$

When viewing the difference of processing, the load is reduced in the configuration shown in FIG. 17 and FIG. 18 by the amount shown next:

$$O_{sub} = O_{old} - O_{new} = N \times (\text{top/bottom correction processing} + \text{face area detection} + \text{screen judgment} + \text{cutting processing} + \text{size calculation} - \text{masking processing})$$

In this, most of the processing load becomes "face area detection".

On the transmitting side (encoder side), the load increases by exactly the amount shown next:

$$E_{new} = \text{top/bottom correction processing} + \text{face area detection} + \text{screen judgment} + \text{cutting processing} + \text{size calculation}$$

However, this load does not depend on the number connected to.

As explained above, according to the present second embodiment, the encoder 40 serving as the transmitting side has the function that the transmitting side generates the corresponding instruction information, screen information, and volume information and transmitting the same to the other party in the communication in the case where there is a screen at the instructed point. The decoder 50 has the function of displaying a multi-screen image and has the function of optimally forming a plurality of screens on a display screen by calculating the display magnifications of the screens based on the line segments connecting screen centers, the thicknesses of standard shapes, and magnitudes of audio and controlling the movement and new generation of screens based on these display magnifications. Therefore, sizes of screens can be adaptively changed in accordance with magnitudes of volumes and the number of screens.

Further, there are the advantages that the movement of the screens becomes continuous and it becomes possible to arrange screens with optimum sizes even when they have different shapes.

As a result, even at the time of the connection of a plurality of terminals, it is easy to confirm the other parties in conversation. Control is performed so that images (screens) are not superimposed, therefore the states of all members in the conversations can be confirmed at a glance. Further, it is possible to easily cope with new participants as well.

Third Embodiment

Figure 32:
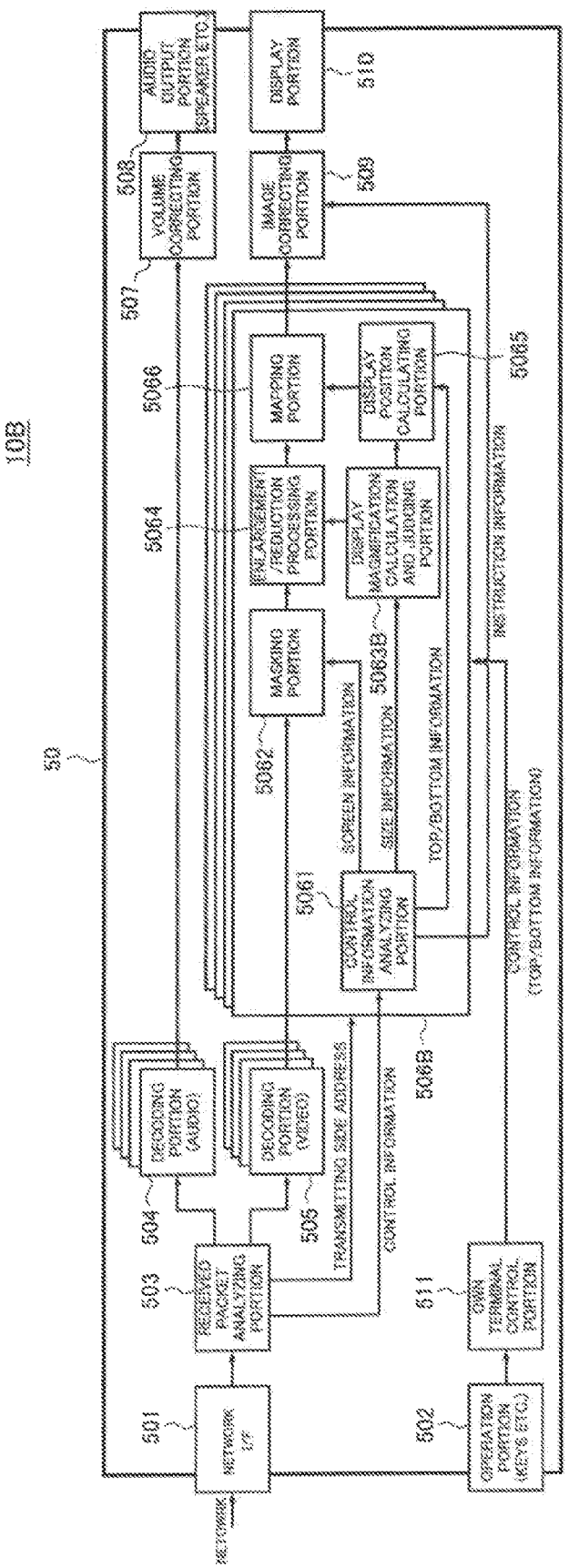
FIG. 32 is a diagram showing an example of the configuration of a decoder in a mobile communication terminal according to a third embodiment of the present invention.

FIG. 32 is a diagram showing an example of the configuration of a decoder in a mobile communication terminal according to a third embodiment of the present invention.

An encoder in a mobile communication terminal 10B according to the present third embodiment has the same configuration as the configuration of FIG. 17 explained in the second embodiment, therefore illustration thereof is omitted here. Further, the basic block configuration of a decoder 50B is the same as the configuration of FIG. 18 explained in the second embodiment, but the processing of a display image control portion 506B is different.

As explained above, in a case where the calculation of position and calculation of the screen size are performed based on the interaction with the surrounding screens, the position and size do not always converge to the expected state.

Sometimes a screen will not stop, but will continue to vibrate without interruption (vibrating state) or will stop with the rate of area occupied small as it is (locally stable state). In the case of the vibrating state, the screen continues to vibrate without interruption, therefore the movement sometimes is irritating.

On the other hand, in the case of the locally stable state, the screen remains small as it is, therefore the displayed content becomes small as well.

Figure 33A:
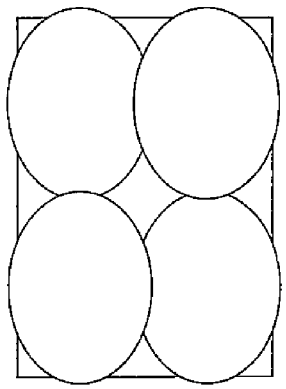
FIG. 33A to FIG. 33C are diagrams for explaining the problem of a vibrating state of multi-screen images.
Figure 33B:
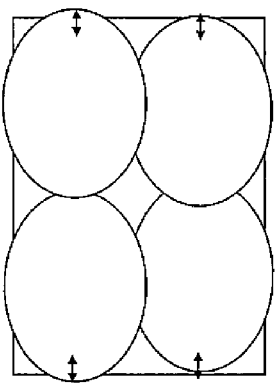
Figure 33C:
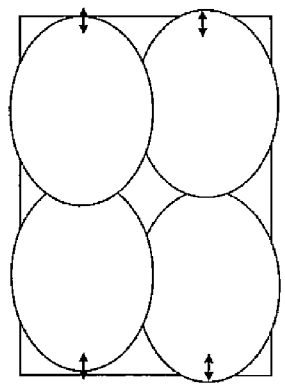

FIG. 33A to FIG. 33C show vibrating states. They show cases where there are four screens having equal magnitudes of audio.

The squares sum ratios of the display magnifications of the screens are equal. However, in the display screen view of FIG. 33A, the screens stop, while in display screen views of FIG. 33B and FIG. 33C, the screens vertically vibrate constantly. Since the screens vibrate constantly, it becomes very irritating to the user.

Figure 34A:
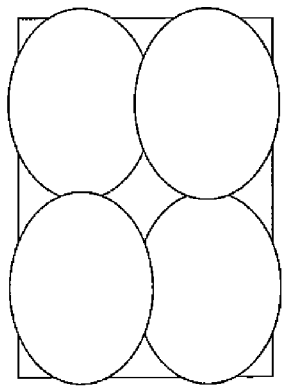
FIG. 34A to FIG. 34C are diagrams for explaining the problem in a locally stable state of multi-screen images.
Figure 34B:
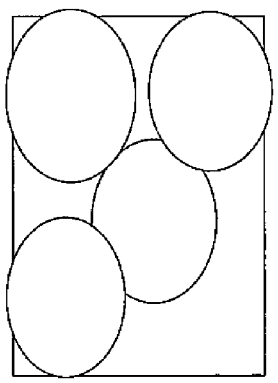
Figure 34C:
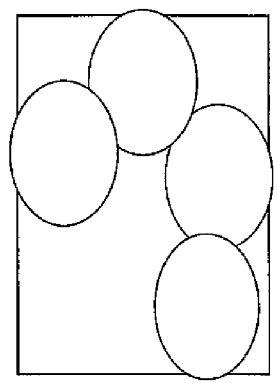

Further, FIG. 34A to FIG. 34C show locally stable states. They show cases where there are four screens having equal magnitudes of audio. On each display screen, the screens are stopped or vibrating.

Squares sum ratios of display magnifications of display screens are R(t)=0.961712, 0.721003, and 0.551646 from the display screen view of FIG. 34A. The ratio is the highest in the display screen view of FIG. 34A and becomes smaller toward FIG. 34B and FIG. 34C.

These values have the same meanings as the ratios of the screens occupying the display screen. From these diagrams as well, it is seen that sizes of the screens in FIG. 34B and FIG. 34C become smaller in comparison with the display screen of FIG. 34A. Useless regions (dead zones) which are not used for the screens on the display screens become larger. As a result, the displayed images become smaller.

Therefore, in the present third embodiment, a mobile communication terminal able to adaptively and optimally update the sizes and positions of the display image areas (screens) in accordance with the magnitudes of volume, number of display image areas (screen) to be displayed, or other situations without any operation by the user and in addition in which the rearrangement (movement) of display image areas becomes continuous, screens can be arranged with optimum sizes even when different in shapes, irritation can be eliminated by stopping the vibration, and the locally stable state can be eliminated is realized.

The decoder SOB of FIG. 32, basically, in the same way as the configuration of FIG. 18, has a network interface (I/F) 501 able to perform wireless communications with the network and receiving packets including audio data, image (video) data, control information and instruction information, screen information, volume information, etc. transmitted from the transmitting side, an operation portion 502 enabling key input etc., a received packet analyzing portion 503 for analyzing packets received at the network interface 501 and extracting the audio data, image data, transmitting side address, and control information (top/bottom information, instruction information, etc.), an audio decoding portion 504 for decoding the audio data extracted by the received packet analyzing portion 503, a video decoding portion 505 for decoding the image data extracted by the received packet analyzing portion 503, a display image control portion 506B for controlling the sizes and display modes of the screens to be displayed (display window) based on the video data decoded by the video decoding portion 505, transmitting side address, control information, screen information, size information, and top/bottom information, a volume correcting portion 507 for correcting the volume of the audio decoded by the audio decoding portion 504, a speaker or other audio output portion 508 for generating sound with a volume corrected by the volume correcting portion 507, an image correcting portion 509 for correcting the image controlled in the size and display mode by the display image control portion 506B, an LCD or other display portion (image output portion) 510 for displaying the image via the image correcting portion 509, and an own terminal control portion 511 for giving the control information (top/bottom information) to the display image control portion 506B based on the input information from the operation portion 502.

Below, a more concrete configuration and functions of the display image control portion 506B characterizing the third embodiment and concrete examples of the display modes of the screens will be explained in sequence.

The display image control portion 506B of FIG. 32 basically has a control information analyzing portion 5061 for extracting the screen information, size information, top/bottom information, and instruction information based on the control information supplied from the received packet analyzing portion 503, a masking portion 5062 for masking the image decoded at the video decoding portion 505 based on the screen information, a display magnification calculation and judging portion 5063B having a function of calculating display magnifications of screens to be displayed (display image areas) based on the size information, judging the vibrating state or stable state of the screens, and performing stirring processing for promoting the rearrangement of positions of the screens, a reducing/enlarging portion 5064 for reducing/enlarging images after the masking processing according to the display magnifications calculated at the display magnification calculation and judging portion 5063B, a display position calculating portion 5065 for calculating display positions according to display magnifications calculated at the display magnification calculating portion 5063B and the top/bottom information, and a mapping portion 5066 for mapping images obtained at the reducing/enlarging portion 5064 at points on the display portion 510 obtained at the display position calculating portion 5065.

The display image control portion 506B of the present third embodiment has a vibrating state judgment function of judging whether or not one or more screens are in the continuously moving state in local regions.

This vibrating state judgment function judges that the screens are in a vibrating state in a case where, in a constant period (n), there is no change in the number of screens, there is no change of magnitude of audio of the screens, and further there is a change of the positions of the screens, the change is a threshold value (Pthresh0) or less, and the change of the display magnification of the screens is a threshold value (Rthresh0) or less, and fixes, in the vibrating state, the screens at an array where the squares sum value (R) of display magnifications during the above period is the largest.

Further, the display image control portion 506B of the present third embodiment has a stable state judgment function of judging whether or not the screens are in the stable state.

This stable state judgment function judges that the screens are in the stable state in a case where, in a constant period (m), there is no change in the number of screens, there is no change of magnitude of audio of the screens, and further the change of the positions of the screens is a threshold value (Pthresh1) or less and the change of the display magnifications of the screens is a threshold value (Rthresh1) or less.

Further, the stable state judgment function judges that the screens are in the locally stable state in a case where, in the constant period, there is no change of the number of screens, no change of magnitude of audio of the screens, and further the change of the positions of the screens is a threshold value (Pthresh1) or less and the change of the squares sum ratio of the display magnifications of the screens is a threshold value (Rthresh2) or less.

Further, the display image control portion 506B of the present third embodiment has a stirring processing function of promoting the rearrangement of the positions of the screens in the case where the screens are judged stable by the stable state judgment function.

This stirring processing function perform stirring by arranging provisional centers on the display screen, setting the position giving the smallest value, not selected previously, of the display magnifications at the centers as the center of the screen for stirring, and generating, updating, and erasing the screen for stirring over the constant period for stirring.

When a number of times (S) of execution of the stirring processing exceeds a threshold value (Sthresh), it is judged that the screens are in the stable state, and the stirring processing is stopped.

The screens controlled in size and display mode by the display image control portion 506B of the present third embodiment are displayed as a multi-screen image displaying a plurality of screens on one display screen. The display control of a multi-screen making mainly the processing of the display magnification calculation and judging portion 5063B and display position calculating portion 5065 of the display image control portion 506B of the present third embodiment is similar to the display control explained in connection with FIG. 19 to FIG. 26 etc. in the second embodiment, therefore an explanation thereof is omitted here.

Next, the vibrating state judgment processing, stable state judgment processing, and stirring processing in the present third embodiment will be explained with reference to FIG. 35, FIG. 36, FIG. 37, and FIG. 38A to FIG. 38E.

Figure 35:
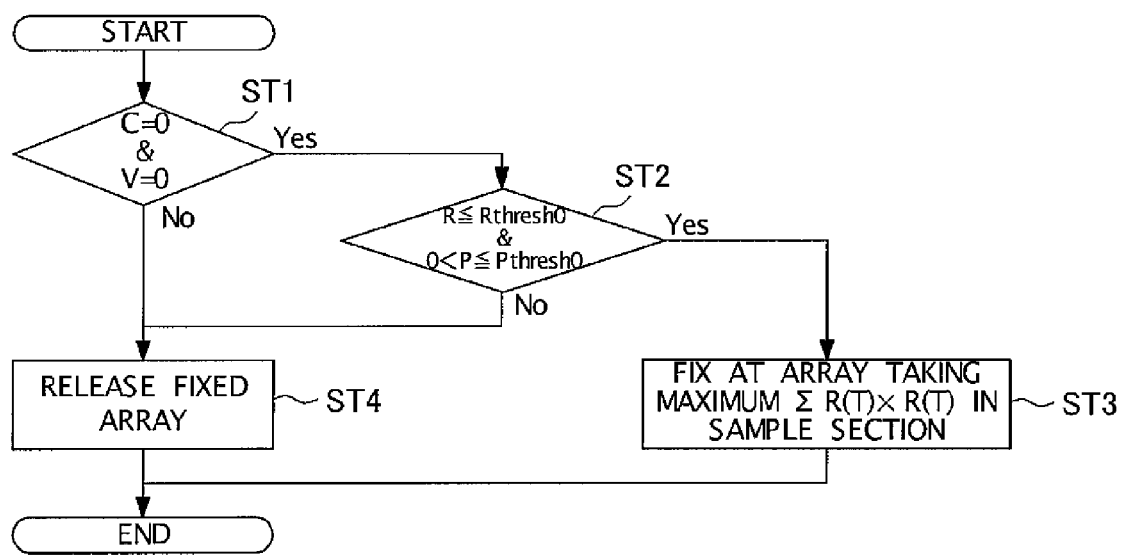
FIG. 35 is a flow chart for explaining basic processing for avoiding the vibration.

FIG. 35 is a flow chart for explaining the basic processing for avoiding vibration.

In the following processing, C indicates a change of the number of screens, V indicates a change value of the magnitude of audio, P indicates a change value of the positions, R indicates a change value of the display magnification, and Rthresh0 and Pthresh0 indicate threshold values.

In a case where there is no change in the number of screens (C=0) and no change in the magnitude of audio (V=0) (step ST1) and where the change R of the display magnification is the threshold value Rthresh0 or less (R≦Rthresh0) and the change P of the screen position is changing and the change is the threshold value Pthresh0 or less (0<P≦Pthresh0) (ST2), the routine judges that the screen is vibrating constantly and fixes (rearranges) the screens to the screen array at the time when the sum of squares of the display magnifications in a judgment section becomes the maximum value (ST3).

Note that in a case where the number of screens changes (C≈0) or a case where the magnitude of audio changes (V≈0), the fixed array is released and the screens are rearranged based on the computation result (ST4).

Due to this, it becomes possible to avoid the irritating continuous vibration of the screens at local positions.

Note that the change C of the number of screens, change V of the magnitude of audio, change P of positions, and change R of display magnification are given by the following equations:

[Equation 7]

Change $C$ of number of screens $$C = \sum_{n=1}^{N} (C(t) - C(t - n\Delta t))^2$$

[Equation 8]

Change $V$ of magnitude of audio $$V = \sum_{n=1}^{N} \sum_{i}^{All} (Vi(t) - Vi(t - n\Delta t))^2$$

-continued

[Equation 9]

Change $P$ of positions Case where $C(t) > 1$ $$P = \sum_{n=1}^{N} \sum_{i}^{All} ((Pi(t) - P_0(t)) - (Pi(t - n\Delta t) - P_0(t - n\Delta t)))^2$$

Case where $C(t) = 1$ $$P = \sum_{n=1}^{N} (P_0(t) - P_0(t - n\Delta t))^2$$

[Equation 10]

Change $R$ of display magnifications $$R = \sum_{n=1}^{N} \sum_{i}^{All} \frac{(Ri(t) - Ri(t - n\Delta t))^2}{R\max^2}$$

Note that C(t) is defined as the number of screens at the time t, Vi(t) is defined as the magnitude of audio at the time t, Pi(t) is defined as the position of a screen i at the time t, and Ri(t) is defined as the display magnification of a screen i at the time t. Rmax is defined as the display magnification in a case where the entire display is covered by one screen.

Figure 36:
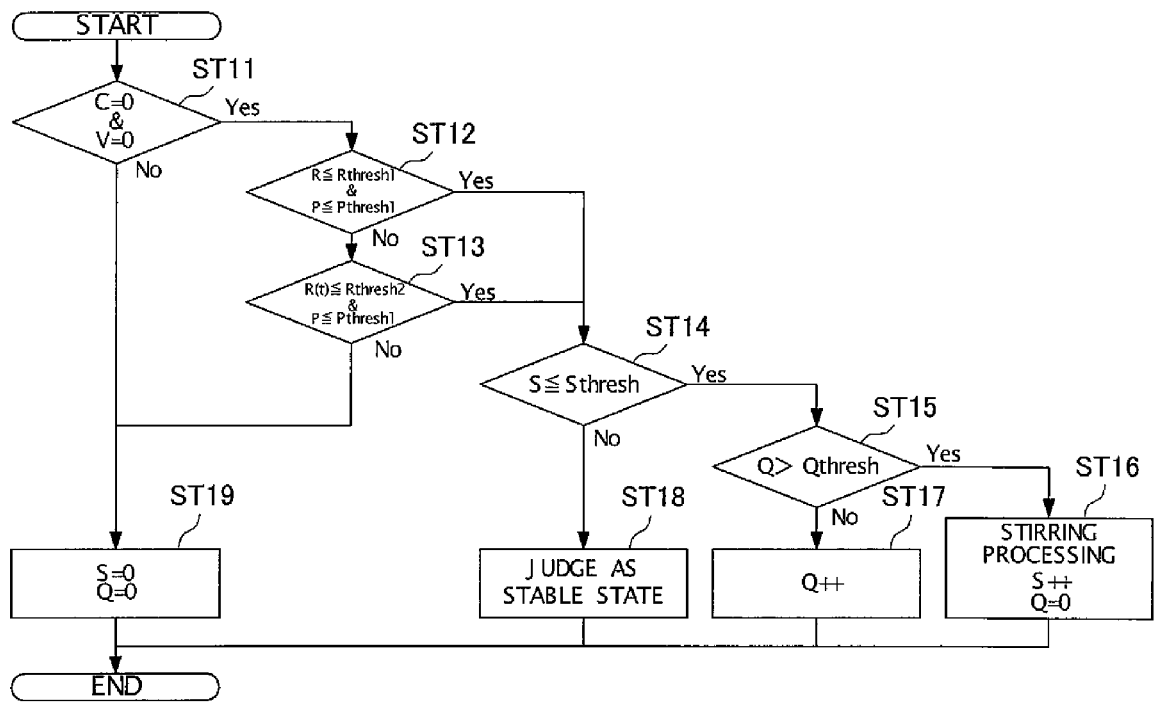
FIG. 36 is a flow chart for explaining processing for judging a stable state and performing stirring processing.

FIG. 36 is a flow chart for explaining processing for judging the stable state and performing the stirring processing.

In the following processing, C indicates the change value of the number of screens, V indicates the change value of the magnitude of audio, P indicates the change value of the positions, R indicates the change value of the display magnification, Rthresh1, Rthresh2, and Pthresh1 indicate threshold values, and Rmax indicates the display magnification in the case where the entire display is covered by one screen.

In the case where there is no change of the number of screens (C=0) and no change of the magnitude of audio (V=0) (step ST11) and where the change R of the display magnifications is the threshold value Rthresh1 or less (R≦Rthresh0) and the change P of the screen positions is the threshold value Pthresh1 or less (O≦Pthresh1) (ST12) or where the squares sum ratio R(t) of the display magnifications is the threshold value Rthresh2 or less (R(t)≦Rthresh2) and the change P of the screen positions is the threshold value Pthresh1 or less (P≦Pthresh1) (ST13), it is judged that the screens have fallen into a constant stable state.

In a case where the number of times S of stirring is Sthresh or less (S≦Sthresh) (ST14) and where an elapsed time Q after the stirring processing passes a threshold value Qthresh (ST15), the stirring processing is applied and the stirring number S and elapsed time Q are updated (S++, Q=0) (ST16, ST17). When the stirring number S exceeds the threshold value Sthresh (ST14), it is judged that the screens are in the stable state (ST18).

Note that in a case where the number of screens changes (C#0) or where the magnitude of audio changes (V≈0), the stirring number S and elapsed time Q are cleared (ST19).

Due to this, in a case where the screens are stabilized to a state where the change R of the display magnifications is small, it becomes possible to promote departure from this array state. Further, the stirring processing is carried out after the stable state is judged, therefore it becomes possible to eliminate unnecessary stirring processing.

Note that the change C of the number of screens, change V of the magnitude of audio, change P of positions, change R of display magnifications, and squares sum ratio of display magnifications at the time t are given by the following equations:

[Equation 11]

Change $C$ of number of screens $$C = \sum_{m=1}^{M} (C(t) - C(t - m\Delta t))^2$$

[Equation 12]

Change $V$ of magnitude of audio $$V = \sum_{m=1}^{M} \sum_{i}^{All} (Vi(t) - Vi(t - m\Delta t))^2$$

[Equation 13]

Change $P$ of positions $C(t) > 1$ $$P = \sum_{m=1}^{M} \sum_{i}^{All} ((Pi(t) - P_0(t)) - (Pi(t - m\Delta t) - P_0(t - m\Delta t)))^2$$

$C(t) = 1$ $$P = \sum_{m=1}^{M} (P_0(t) - P_0(t - m\Delta t))^2$$

[Equation 14]

Change $R$ of display magnification $$R = \sum_{n=1}^{M} \sum_{i}^{All} \frac{(Ri(t) - Ri(t - m\Delta t))^2}{R\max^2}$$

[Equation 15]

Squares sum ratio of display magifications at time $t$ $$R(t) = \frac{\sum_{i}^{All} Ri(t)^2}{R\max^2}$$

Note that, C(t) is defined as the number of screens at the time t, Vi(t) is defined as the magnitude of audio at the time t, Pi(t) is defined as the position of a screen i at the time t, and Ri(t) is defined as the display magnification of a screen i at the time t. Rmax is defined as the display magnification in a case where the entire display is covered by one screen.

Figure 37:
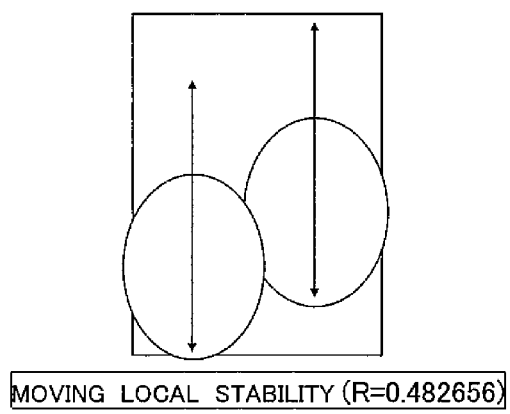
FIG. 37 is a diagram showing a case where two screens are in a stable relative positional relationship and move upward/downward as one mass.

Calculation of the change P of the position can be handled by using a relative value in the following case:

The example of FIG. 37 shows a case where two screens are in stable relative positional relationship and move upward/downward as one mass.

When judging the local stability by simply using only absolute positions, the end result is that the state does not correspond to the locally stable state since the screens move up/down as a whole.

Further, in the judgment of the vibrating state as well, it becomes difficult to judge the vibrating state since the upward/downward movement distance is large.

Contrary to this, by performing the judgment by using relative positions as in the present third embodiment, it becomes possible to judge the locally stable state.

Figure 38:
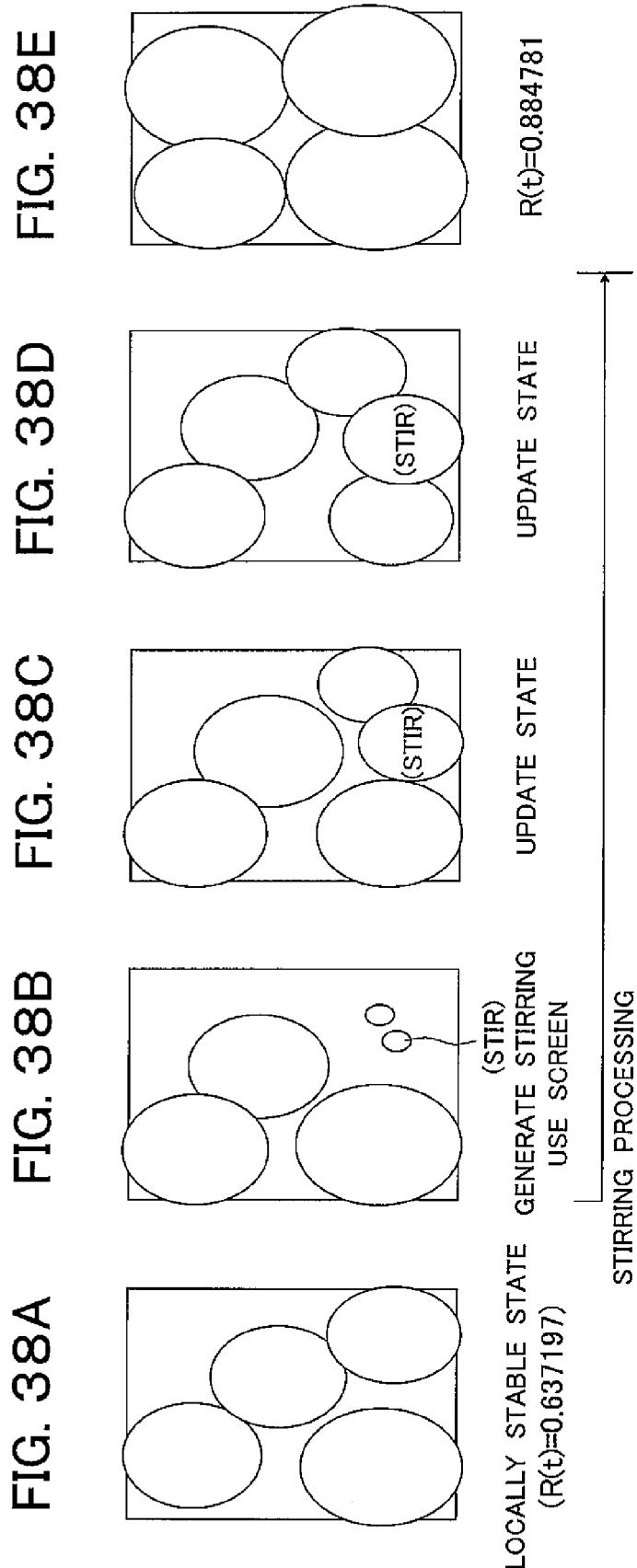
FIG. 38A to FIG. 38E are diagrams showing screens for stirring and diagrams for explaining behaviors.

FIG. 38A to FIG. 38B are diagrams showing stirring use screens and diagrams for explaining behaviors.

Provisional centers are arranged on the display screen, and the display magnification (Rmin) is calculated at each center. A screen for stirring is generated at a position at which the smallest value of the display magnifications (Rmin) is obtained, the U step state (U≧1) is updated, then the screen for stirring is discarded. This stirring use screen is made invisible.

Further, this stirring processing itself may be made invisible to the user as well. When the effect does not appear by one time, the stirring is repeated several times. In this case, the generation point of the stirring use screen is set at a position different from the point of the previous time.

After the stirring processing, a long time is required until the screens are stabilized. For this reason, when starting the judgment of presence/absence of execution of stirring processing in this unstable state, the stirring processing time S is immediately cleared (S=0). That is, irrespective of whether or not the processing works effectively, it is judged that the processing works effectively. For this reason, the judgment is restarted after the elapsed time Q passes the Qthresh step.

[Equation 16]

$$R\min(k') = \min_{j=all}(R(k', j))$$

[Equation 17]

$$R(k) = \min_{k'=all}(R\min(k'))$$

FIG. 38A to FIG. 38E illustrate screens for stirring for easy understanding.

In the display screen views of FIG. 38A to FIG. 38E, time proceeds from the left (FIG. 38A) to the right (FIG. 38E).

In FIG. 38A, when the locally stable state is judged, the stirring processing is started as shown in FIG. 38B. The screen for stirring is generated. According to positional relationships, the sizes of the nearby screens became small.

In FIG. 38C, the state is updated. The array is updated so that the squares sum ratio of display magnifications becomes larger.

In FIG. 38D, the state is updated. The array is further updated so that the squares sum ratio of display magnifications becomes larger.

Then, in FIG. 38D, the stirring processing ends (state is updated). The screen for stirring is extinguished. The array is updated so that the squares sum ratio of display magnifications becomes larger.

When comparing FIG. 38A and FIG. 38E, it is seen that the positional relationships of screens change, and the squares sum ratio of display magnifications increases from R(t)=0.637197 to 0.884781.

Note that, in the present third embodiment, the screen display control on the display portion 510 in which the sizes and display modes are controlled as explained above is the same as the display control explained with reference to FIG. 27 to FIG. 31 in the second embodiment, therefore an explanation thereof is omitted here.

As explained above, according to the present third embodiment, the encoder 40 serving as the transmitting side has a function of generating the corresponding instruction information, screen information, and volume information when a screen exists at the instructed position on the display screen and transmitting the same to the other party in the communications. The decoder 50 has a function of displaying a multi-screen image and has a function of calculating display magnifications of screens based on the line segments connecting screen centers, thicknesses of standard shapes, and magnitudes of audio, controlling the movement and new generation of screens based on these display magnifications to optimally form a plurality of screens on the display screen, judging whether or not the array state of screens on the display screen is the vibrating state, fixing the screens when in the vibrating state, judging the stable state, and applying the stirring processing in order to eliminate the locally stable state. Therefore, the sizes of the screens can be adaptively changed in accordance with the magnitude of volume and the number of screens.

Further, there are the advantages that the movement of the screens becomes continuous and screens can be arranged with optimum sizes even when different in shape.

Further, by stopping the vibration, it becomes possible to eliminate irritation.

Further, by eliminating the locally stable state, the screens are enlarged.

Further, there is the advantage that unnecessary stirring processing does not have to be performed to judge whether screens are in the stable state.

As a result, even at the time of the connection of a plurality of terminals, the other parties in conversation are easily confirmed. Further, the control is performed so that images (screens) are not superimposed. Therefore, states of all members in the conversation can be confirmed at a glance. Further, new participants can be easily handled as well.

Fourth Embodiment

Figure 39:
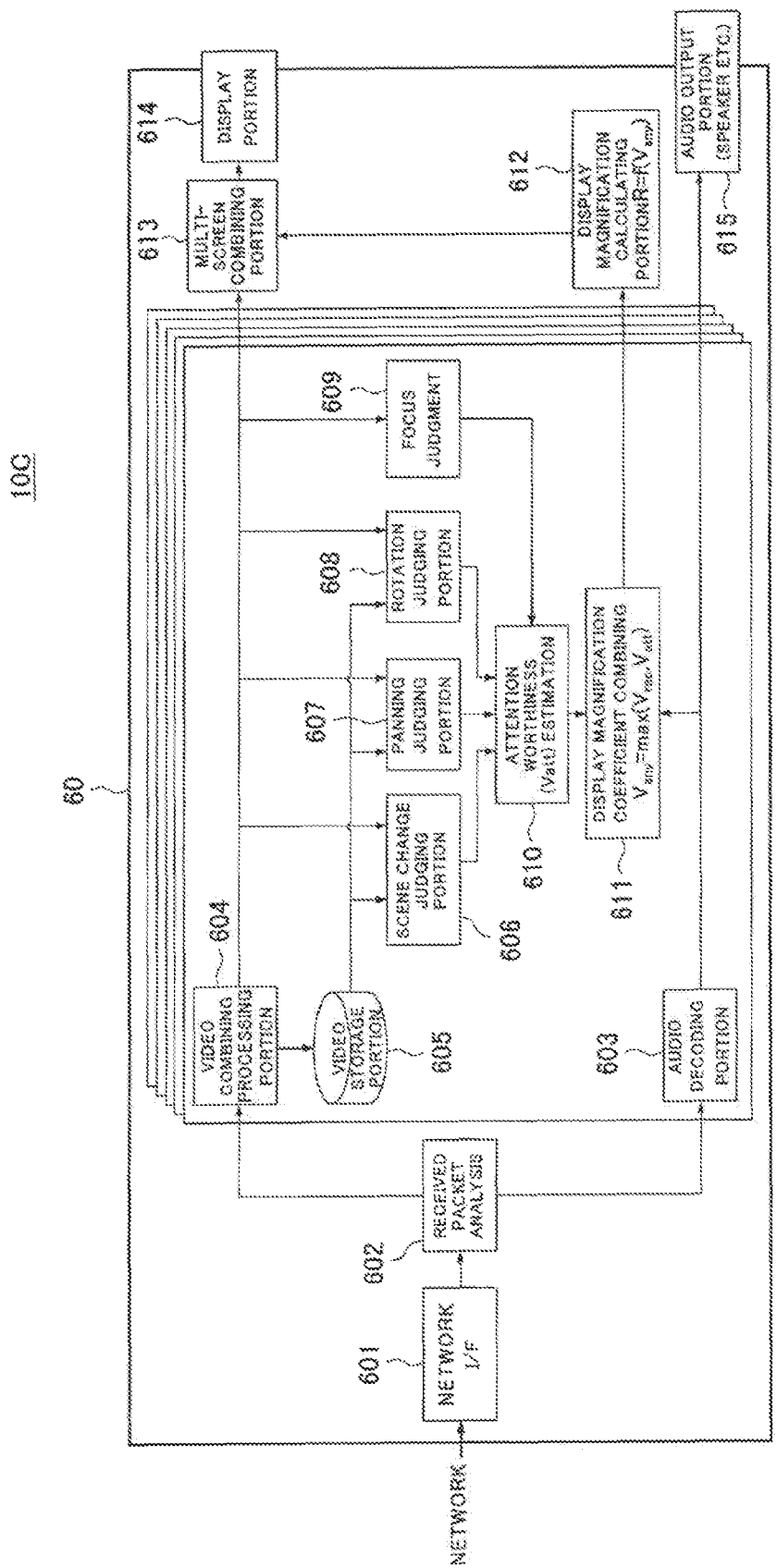
FIG. 39 is a diagram showing an example of the configuration of a mobile communication terminal according to a fourth embodiment of the present invention and a block diagram showing a decoder on the receiving side.

FIG. 39 is a block diagram showing an example of the configuration of a mobile communication terminal according to a fourth embodiment of the present invention and a block diagram showing a decoder on the receiving side.

The second and third embodiments explained before each realize a mobile communication terminal where the sizes and positions of the display image areas (screens) can be adaptively and optimally updated in accordance with the magnitudes of volume, number of display image areas (screens) to be displayed, or other situations without any operation by the user, the rearrangement (movement) of display image areas becomes continuous, screens can be arranged with optimum sizes even when different in shapes, vibration can be stopped and thereby irritation eliminated, and the locally stable state can be eliminated.

However, when for example a photographer at the transmitting side changes an object captured by panning the camera, he does this to show the object to the other parties on the receiving side. At that time, the photographer is not always speaking. Therefore, after panning, he has to say something.

For example, where he is sending an image in order to make the user select what he should purchase, the photographer cannot constantly be speaking. However, the received image itself must be a screen having a size large enough to be constantly viewed during sending.

Therefore, the fourth embodiment realizes a mobile communication terminal where the sizes and positions of the display image areas (screens) can be adaptively and optimally updated in accordance with the magnitudes of volume, number of display image areas (screens) to be displayed, or other situations without any operation by the user, rearrangement (movement) of display image areas becomes continuous, screens can be arranged with optimum sizes even when different in shapes, and images can immediately be shown large at the receiving side without the sender adding any new operation when the sender captures an image to be shown.

A decoder 60 in a mobile communication terminal 10C according to the present fourth embodiment basically has the function of reproducing the audio data and image data transmitted from an encoder of the other party of communications (transmitting side) and received via the network.

The decoder 60 has a function of selecting a screen to be used (display area controlled in size) and displaying the image including the face as the specific area and generating audio based on the control information of the received image when engaged in multi-point communications.

The decoder 60 has a function of splitting screens into circular (concept including oval) windows eliminating dead zones when displaying the screens.

Although explained in the first embodiment etc., the configuration of splitting screens to circular (oval) windows is adopted for the following reason.

In general, a display screen has been split into rectangles. Human faces are basically oval, so the four corners of such rectangles become dead zones. These dead zones consequently make the areas for displaying the faces narrower (smaller).

Accordingly, in the present embodiment, the decoder is configured to split screens into circular (oval) windows eliminating any dead zones.

A decoder 600 of FIG. 39 has a network interface (I/F) 601 able to perform wireless communications with the network and receiving packets including the audio data, image (video) data, control information and instruction information, screen information, volume information, etc. transmitted from the transmitting side, a received packet analyzing portion 602 for analyzing packets received at the network interface 601 and extracting the audio data, image data, transmitting side address, and control information (top/bottom information and instruction information etc.), an audio decoding portion 603 for decoding the audio data extracted by the received packet analyzing portion 602, a video decoding portion 604 for decoding video data extracted by the received packet analyzing portion 602, an video storage portion 605 for storing video data decoded by the video decoding portion 604, a scene change judging portion 606 for judging a scene change of a camera (capturing) operation on the transmitting side based on the video data stored in the video storage portion 605 and video signals decoded by the video decoding portion 604, a panning judging portion 607 for judging a panning operation of the camera (capturing) operation on the transmitting side based on the video data stored in the video storage portion 605 and video signals decoded by the video decoding portion 604, a rotation judging portion 608 for judging a rotation operation of the camera (capturing) operation on the transmitting side based on the video data stored in the video storage portion 605 and video signals decoded by the video decoding portion 604, a focus judging portion 609 for judging the focus state of the image based on video signals decoded by the video decoding portion 604, an attention worthiness estimating portion 610 for estimating the attention worthiness ($V_{att}$) of the received image based on judgment results of the scene change judging portion 606, panning judging portion 607, rotation judging portion 608, and focus judging portion 609, a display magnification coefficient combining portion 611 for calculating the display magnification coefficient ($V_{syn}$) of a display area (screen) in which an image is to be displayed based on the estimated attention worthiness ($V_{att}$) and received volume ($V_{rec}$), a display magnification calculating portion 612 for calculating the display magnification (R) of a screen based on the calculated display magnification coefficient ($V_{syn}$) a multi-screen combining portion 613 for combining video signals decoded by the video decoding portion 604 according to the calculated display magnification, an LCD or other display portion (image output portion) 614 for displaying the composite image of the multi-screen combining portion 613, and a speaker or other audio output portion 615 for generating audio decoded at the audio decoding portion 603 with a predetermined volume.

In this way, in the present fourth embodiment, the attention worthiness estimating portion 610 estimates the attention worthiness ($V_{att}$) of a received image based on the motion vector of the received image, increase of encoding, and frequency components.

The display magnification coefficient combining portion 611 calculates the display magnification coefficient ($V_{syn}$) of a screen based on the attention worthiness ($V_{att}$) and the received volume ($V_{rec}$).

Further, the display magnification calculating portion 612 calculates the display magnification (R) of a screen based on the display magnification coefficient ($V_{syn}$).

Further, the judging portions 606 to 609 judge camera operations (panning, rotation, scene change) at the transmitting side based on the motion vector of the received image and change of encoding.

Then, in a case where it is judged that a predetermined operation occurred, the attention worthiness estimating portion 610 estimates that the image received after the judged operation (end) has a high attention worthiness.

Further, the display magnification coefficient combining portion 611 selects the larger screen from the attention worthiness ($V_{att}$) and received volume ($V_{rec}$).

Below, the operation of the decoder 60 of FIG. 39 will be explained.

Based on the decoded video data (M(t)) and based on the video data (M(t−nΔt)) at the previous time, the scene change judging portion 606, panning judging portion 607, and rotation judging portion 608 judge the presence/absence of occurrence of scene change, presence/absence of occurrence of panning, and presence/absence of occurrence of rotation.

Specifically, for example, they detect the motion vector between videos and judge panning when the motion vectors of the display screen as a whole are aligned uniformly in one direction and the vector lengths thereof are a threshold value or more. Further, when the vectors are arranged in a spiral state about a certain point, they judge rotation. When the vectors are not aligned and the amount of coding increases, they judge a scene change.

The attention worthiness calculating portion 610 estimates that a video to be noted is received in a case where any of a scene change, panning, or rotation occurs and after it ends based on judgment results of the scene change judging portion 606, panning judging portion 607, and rotation judging portion 608 and the judgment result of the focus judging portion 609 and estimates the video after the subsequent receipt of a focused video to be the video to be noted.

Note that the focus judging portion 609 judges the focus by calculating the frequency components of the received video and judging if the maximum value of the frequency components is the threshold value or more.

The display magnification coefficient combining portion 611 calculates the display magnification coefficient ($V_{syn}$) based on the audio ($V_{rec}$) received as follows and the attention worthiness ($V_{att}$).

$$V_{syn}=\max(V_{rec}, V_{aat}) \qquad \text{[Equation 18]}$$

Then, the display magnification calculating portion 612 calculates the display magnification (R) from the display magnification coefficient ($V_{syn}$) as follows:

$$R=f(V_{syn}) \qquad \text{[Equation 19]}$$

Screens are formed on the display screen based on the display magnifications (R) of the screens and displayed at the display portion 614 as the image output portion. Further, the decoded audio is reproduced at the audio output portion 615.

Figure 40:
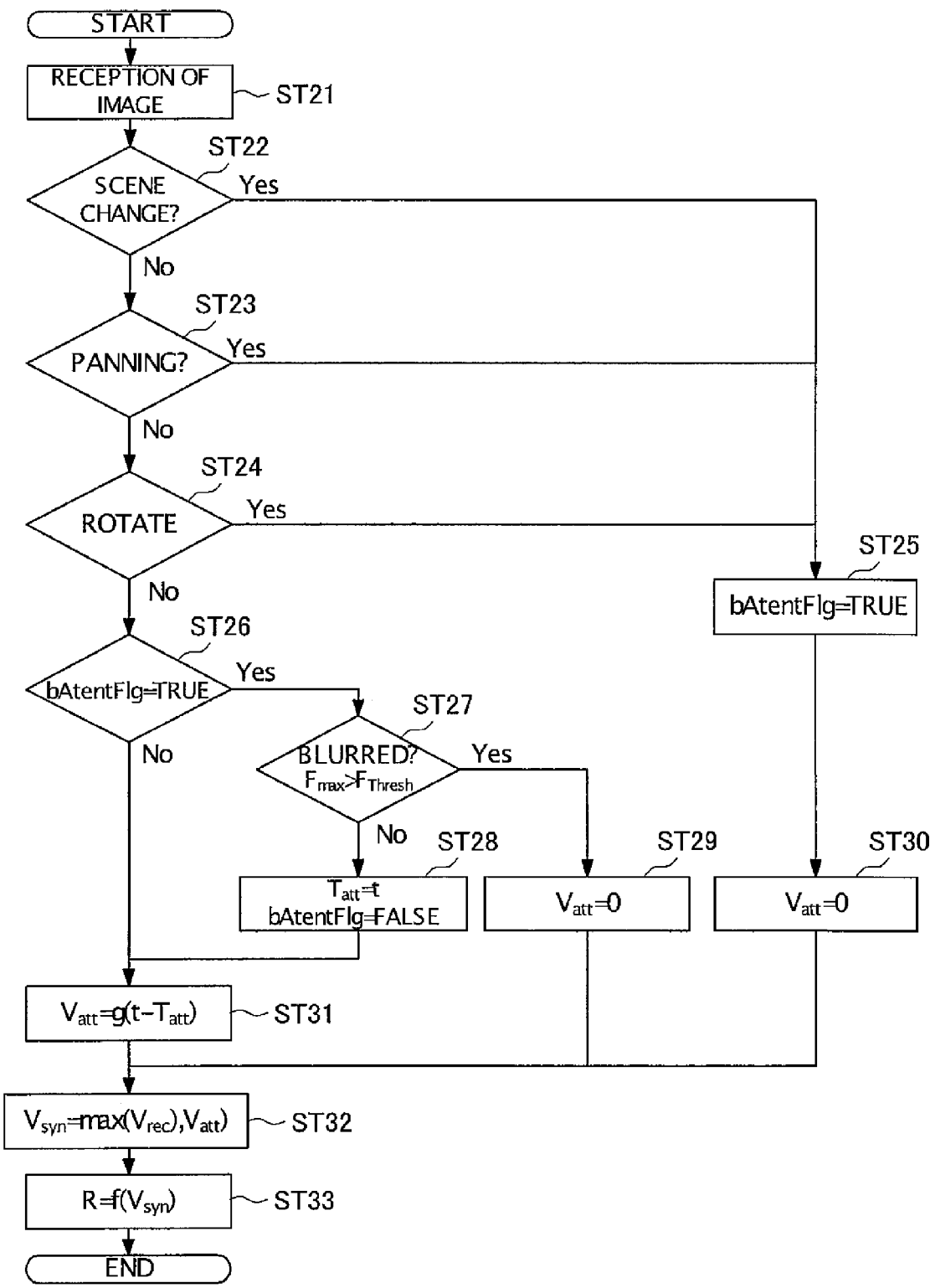
FIG. 40 is a flow chart showing a main operation of the fourth embodiment.

FIG. 40 is a flow chart showing a principal operation of the present fourth embodiment.

In this case, an image is received (ST21). When a scene change, panning, or rotation is judged (ST22 to ST24), an attention worthiness flag (bAtentFlg) is set to TRUE (ST25).

When the attention worthiness flag (bAtentFlg) is TRUE (ST26), it is judged whether or not the frequency component ($V_{max}$) of the video exceeds a threshold value ($F_{Threash}$) (ST27). When it exceeds it, the video is judged as focused, the time is initialized ($T_{stt}=t$), and the attention worthiness ($V_{att}$) is calculated by a function (g(·)) (ST28 to ST33). The function (g(·)) is a function which becomes the maximum at 0 and attenuates along with the elapse of time.

$$V_{att}=g(t-T_{stt})$$ [Equation 20]

Figures 41A, 41B, 41C:
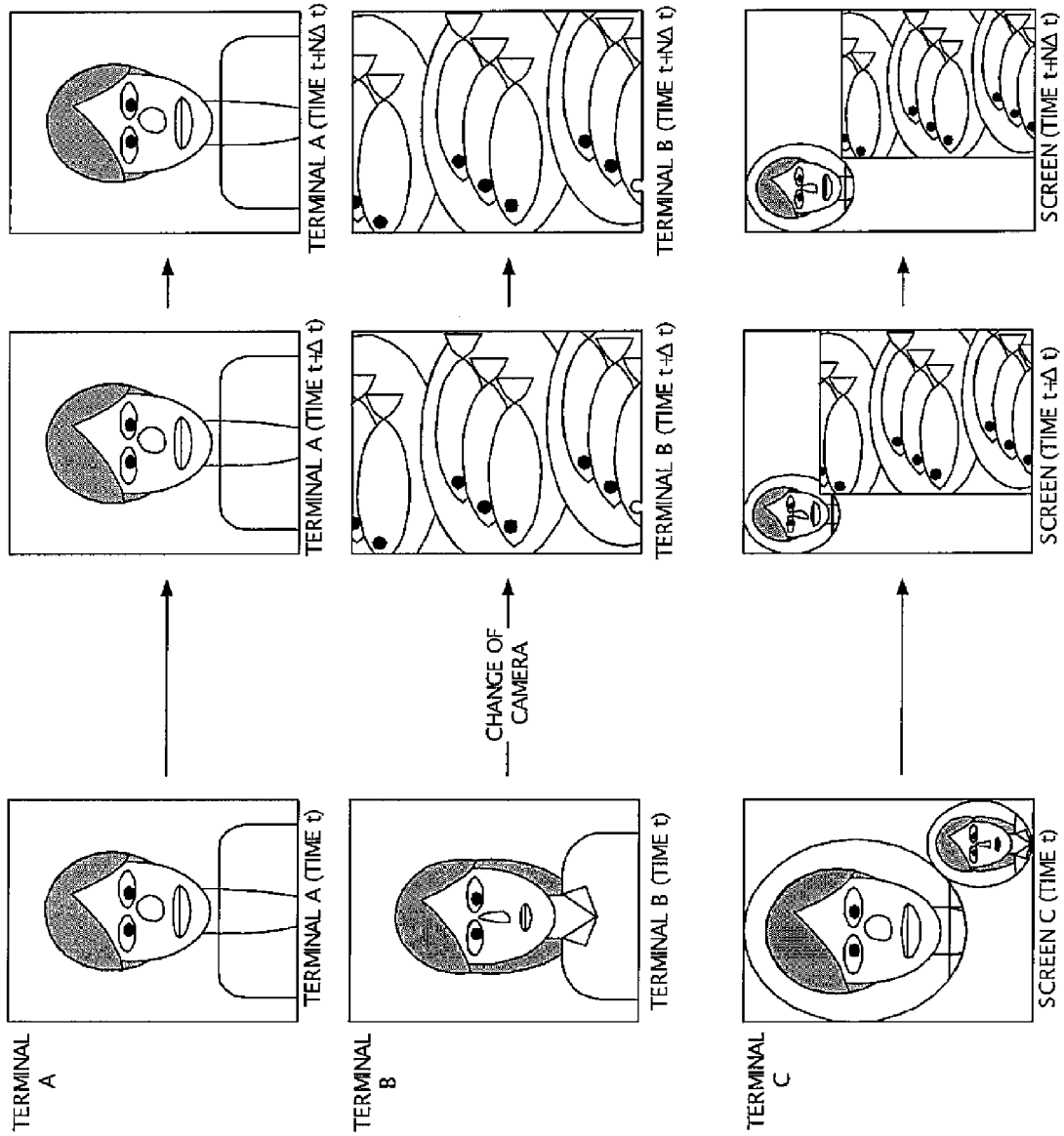
FIG. 41A to FIG. 41C are diagrams showing cases of display of captured images from a terminal A and terminal B on the display screen of a terminal C.

FIG. 41A to FIG. 41C are diagrams showing cases where captured images from the terminal A and terminal B are displayed on the display screen of the terminal C.

In this case, it is assumed that a voice having a constant volume is constantly sent from the terminal A.

At the terminal B, the camera used was switched from the time t to the time t+Δt. Due to this, the image captured at the time t+Δt changed from a person to fish.

In this case, it is judged that the attention worthiness of the image from the terminal B rises. On the display screen of the terminal C, the size of the screen of the terminal B at the time t+Δt becomes larger than the screen of the terminal B at the time t.

Where the time passes to a time t+NΔt as it is, it is estimated that the attention worthiness is lowered little by little. The screen of the terminal B at the time t+NΔt is made small in comparison with the screen size at the time t+Δt.

Figures 42A, 42B, 42C:
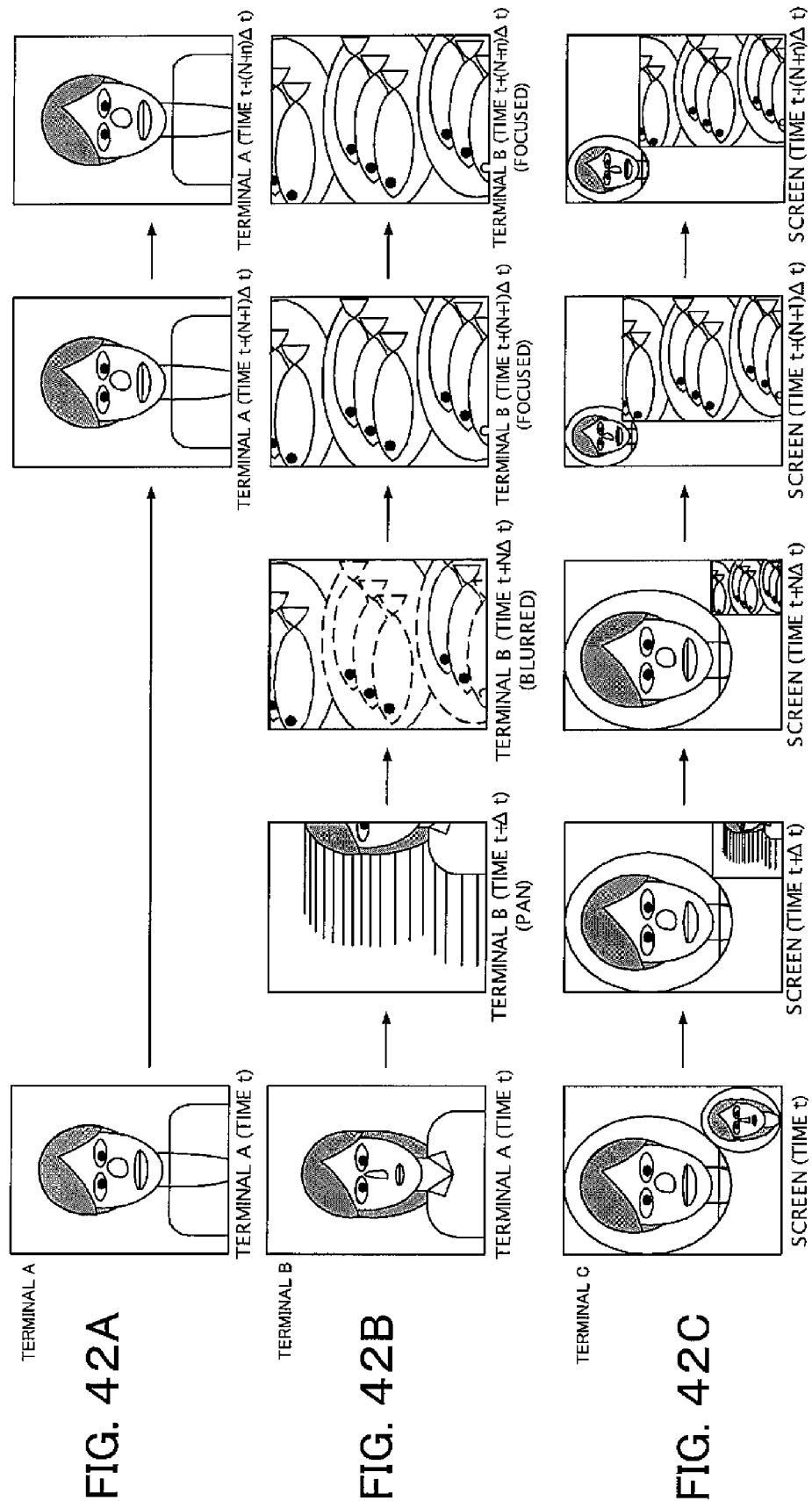
FIG. 42A to FIG. 42C are diagrams showing other examples of displaying captured images from the terminal A and terminal B on the display screen of the terminal C.

FIG. 42A to FIG. 42C are diagrams showing other examples of displaying the captured images from the terminal A and terminal B on the display screen of the terminal C.

In this case, it is assumed that a voice having a constant volume is constantly sent from the terminal A.

At the terminal B, the camera used was panned from the time t to the time t+NΔt. The image captured at the time t+NΔt changed from a person to fish. However, at the time t+NΔt, the image is blurred. It is focused at a time t+(N+1) Δt.

Contrary to this, on the display screen at the terminal C, along with the focusing at the time t+(N+1) Δt, the screen of the terminal B becomes larger than the screen at the time t+NΔt.

It is predicted that the noted image will come by the detection of panning at the time t+Δt. After that, by detection of focusing, the image at the time t+(N+1) Δt is judged as an image having a high attention worthiness, and the value of the attention worthiness is made large.

Figure 43:
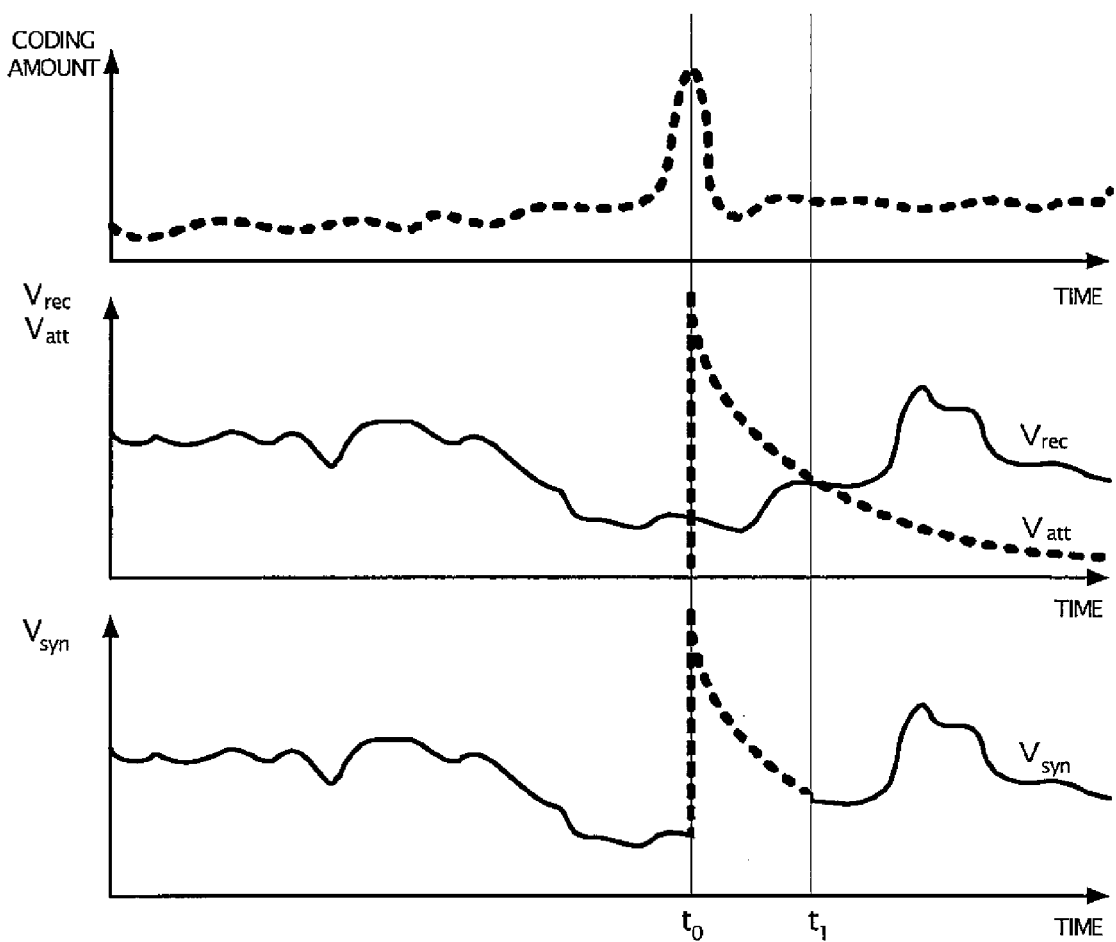
FIG. 43 is a diagram showing a change of attention worthiness ($V_{att}$) by a scene change, a change of received volume ($V_{rec}$), and change of a display magnification coefficient ($V_{syn}$).
Figure 44:
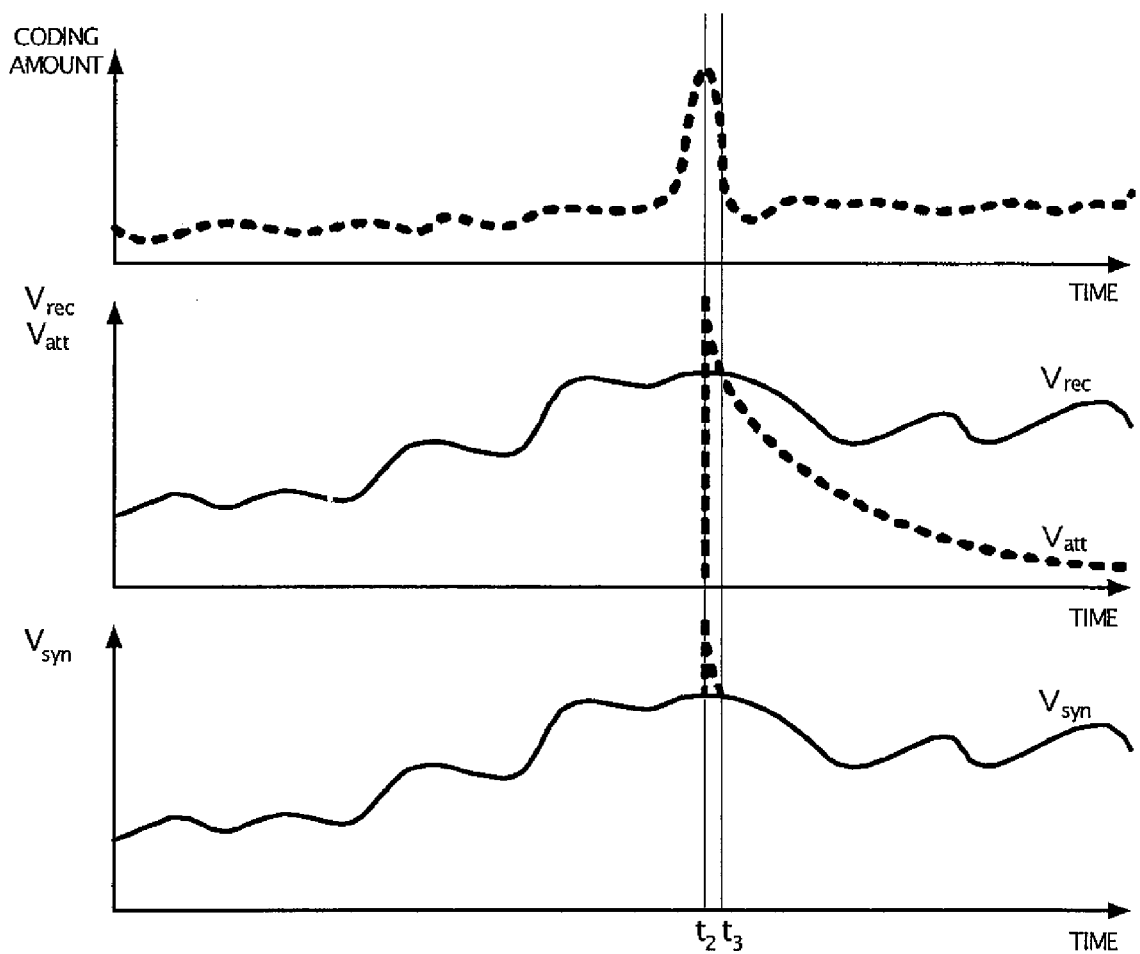
FIG. 44 is a diagram showing a change of attention worthiness ($V_{att}$) by a scene change, a change of received volume ($V_{rec}$), and change of a display magnification coefficient ($V_{syn}$).

FIG. 43 and FIG. 44 are diagrams showing the change of the attention worthiness ($V_{att}$) due to a scene change, a change of the received volume ($V_{rec}$), and a change of the display magnification coefficient ($V_{syn}$).

In FIG. 43, it is judged that a scene change occurred from an increase of the code amount at the time $t_0$ and the motion vector (not shown). The attention worthiness ($V_{att}$) becomes the maximum value at the time $t_0$. Along with the elapse of time, the attention worthiness ($V_{att}$) attenuates. In the display magnification coefficient combining portion, the display magnification coefficient ($V_{syn}$) is obtained. In a section from the time to $t_0$ a time $t_1$, the attention worthiness ($V_{att}$) is larger than the received volume ($V_{rec}$) therefore $V_{syn}=V_{att}$ is set.

This is true for FIG. 44 as well. The change of the received volume ($V_{rec}$) is different and high at the time of the scene change (time $t_2$). The display magnification coefficient ($V_{syn}$) is set so that $V_{syn}=V_{att}$ since the attention worthiness ($V_{att}$) is larger than the received volume ($V_{rec}$) in a section from the time $t_2$ to a time $t_3$.

In the calculation of the display magnification coefficient ($V_{syn}$), the attention worthiness ($V_{att}$) and received volume ($V_{rec}$) are combined in the maximum value (max) computation. Therefore, in a case where the received volume is high, when the attention worthiness rises, a further too great increase of the display magnification coefficient ($V_{syn}$) is restricted. It becomes possible to prevent the screen size from being extremely large when it is estimated that the attention worthiness is high, for example, at the time of a scene change, panning, or rotation, for only images captured by a person having a loud voice.

As explained above, according to the present fourth embodiment, the decoder 60 has a display portion 114 for displaying images, an attention worthiness estimating portion 610 for estimating the attention worthiness of the received images, a display magnification coefficient combining portion 611 for calculating the display magnification coefficients of the display areas based on the estimated attention worthiness and received volume, and a display magnification calculating portion 612 for calculating the display magnifications of the display areas based on the calculated display magnification coefficients. It has a function of displaying a multi-screen image and has a function of calculating display magnifications of screens based on the line segments connecting screen centers, thicknesses of standard shapes, and magnitudes of audio and controlling the movement and new generation of screens based on these display magnifications to thereby optimally form a plurality of screens on the display screen. Therefore, the sizes of the screens can be adaptively changed in accordance with the magnitudes of volumes and the number of screens.

Further, there are the advantages that the movement of the screens becomes continuous and it becomes possible to arrange screens with optimum sizes even when they have different shapes.

Further, when the sender captures an image desired to be shown, it becomes possible to quickly show that image (screen size) large on the receiving side without adding any new operation by the sender (further, without the sender saying anything).

As a result, even at the time of the connection of a plurality of terminals, it is easy to confirm the other parties in conversation. Control is performed so that images (screens) are not superimposed, therefore the states of all members in the conversations can be confirmed at a glance. Further, it is possible to easily cope with new participants as well.

Fifth Embodiment

Figure 45:
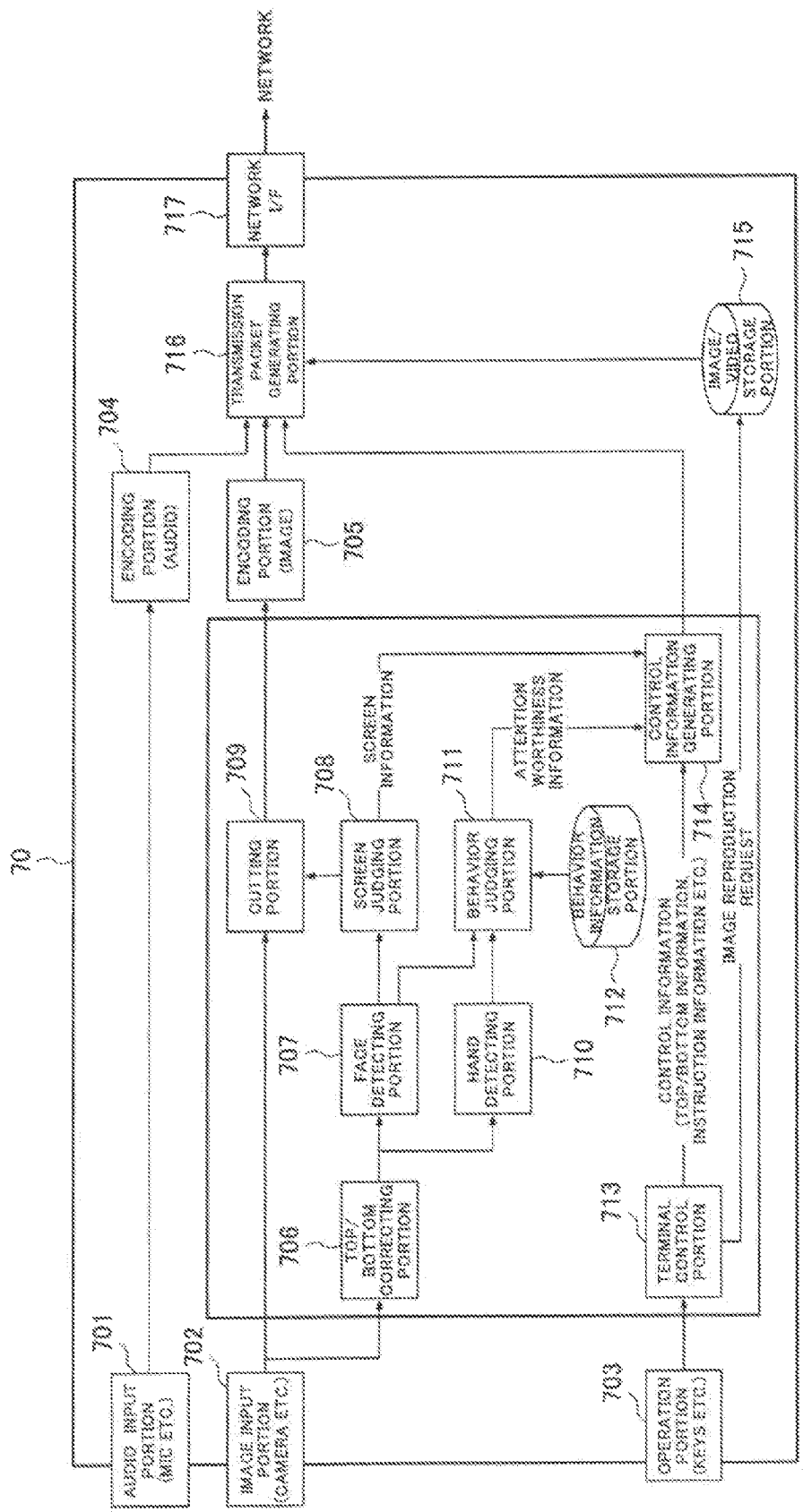
FIG. 45 is a diagram showing an example of the configuration of a mobile communication terminal according to a fifth embodiment of the present invention and a block diagram showing an encoder.
Figure 46:
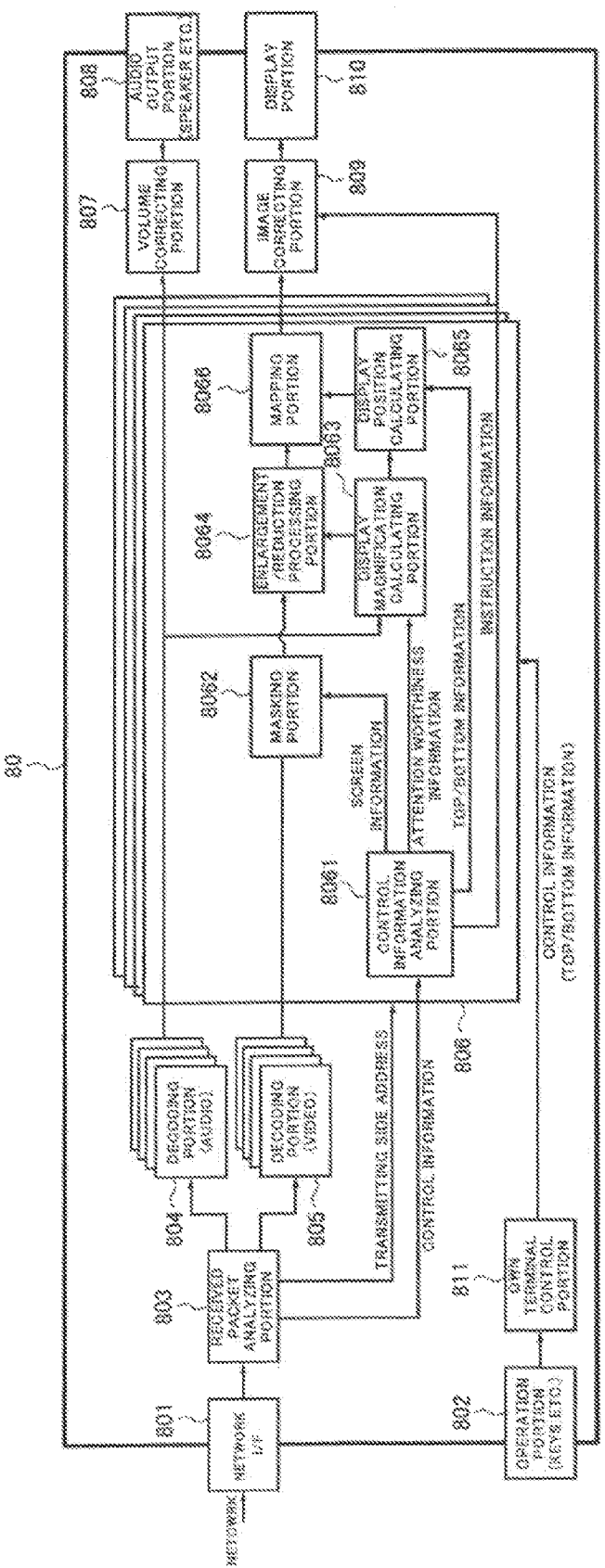
FIG. 46 is a diagram showing an example of the configuration of a mobile communication terminal according to the fifth embodiment of the present invention and a block diagram showing a decoder.

FIG. 45 and FIG. 46 are diagrams showing examples of the configuration of a mobile communication terminal according to a fifth embodiment of the present invention, in which FIG. 45 is a block diagram showing an encoder, and FIG. 46 is a block diagram showing a decoder.

The difference of the present fifth embodiment from the fourth embodiment explained above resides in that the processing is dispersed between the transmitting side and the receiving side.

A mobile communication terminal 10D according to the present fifth embodiment has an encoder 70 and a decoder 80.

The encoder 70 according to the present fifth embodiment, in the same way as the embodiments explained before, has a function of transmitting encoded audio data and image data to a network with instruction information for the receiving side terminals and top/bottom information of the images etc. added to form packets.

The instruction information of the transmitting side added to the audio data and image data includes information for identifying the transmitting side of the instructed image (for example, IP address and MAC address) and position information indicating the position on the received image.

The encoder 70 serving as the transmitting side has the function of generating corresponding instruction information, screen information, and volume information and transmitting the same to the other parties in communications when there is a screen at the instructed point on the display screen.

The encoder 70 of FIG. 45 has a microphone or other audio input portion 701, a digital camera or other image input portion 702, an operation portion 703 enabling key input etc., an audio encoding portion 704 for encoding the audio data input by the audio input portion 701, an image encoding portion 705 for encoding the image data input from the image input portion 702 and cut to a predetermined area, a top/bottom correcting portion 706 for correcting the top/bottom of the captured image so as to coincide with the top/bottom of the display screen (terminal screen) of the display portion on the receiving side based on the top/bottom information linked with the captured image, a face area detecting portion (sometimes referred to as a "face detecting portion") 707 for detecting and extracting an area (first specific area) of the face from the captured image, a screen judging portion 708 for judging the screen to be used (display image area to be displayed) based on the face area detected at the face area detecting portion 707 and generating screen information, a cutting portion 709 for cutting the corresponding area from the received image based on the judgment of the screen judging portion 708, a hand detecting portion 710 for detecting and extracting an area (second specific area) of a hand from the captured image, a behavior judging portion 711 for judging behavior based on detection results of the face area detecting portion 707 and hand detecting portion 710 and generating attention worthiness information, a behavior information storage portion 712 for storing behavior information, a terminal control portion 713 for controlling a terminal based on the input information of the operation portion 703, a control information generating portion 714 for generating control information including instruction information and top/bottom information, screen information, attention worthiness information, volume information, etc. based on the instruction of the terminal control portion 713, a storage portion 715 for storing images and/or video, a transmission packet generating portion 716 for generating the encoded audio data and image data, control information, and image and/or video data read out from the storage portion 715 based on the instruction of the terminal control portion 713 as transmission packets, and a network interface (I/F) 717 able to wirelessly communicate with the network and transmitting the generated transmission packets via the network to the terminal of the other parties in the communications or the server.

The behavior judging portion 711 detects the movement of a hand on an image when extracting a face on the video at the face detecting portion 707 and raises the attention worthiness when detecting a previously set movement.

The behavior information storage portion 712 stores a vector group representing the path of movement of the position of the hand with respect to the position of the face.

Then, the behavior judging portion 711 recognizes this as relative coordinates of the hand with respect to the position of the face based on coordinates of the face extracted at the face detecting portion 707 and coordinates of the hand extracted at the hand detecting portion 710, calculates the motion vector of the relative coordinates of the hand with respect to the elapse of the time, calculates the degree of coincidence (correlation) of the motion vector with the vector stored in the behavior information storage portion 712, and judges that the stored behavior is carried out when the degree of coincidence is larger than the threshold value.

The decoder 80, in the same way as the embodiments explained before, has the function of reproducing the audio data and image data transmitted from the encoder 20 of the other party of communications (transmitting side) and received via the network.

The decoder 80 has the function of displaying an image including the face as the specific area based on the control information of the received image by selecting a screen (display area controlled in size) to be used and generating audio when performing for example multi-point communications.

The decoder 80 has a function of splitting screens into circular (concept including oval) windows eliminating any dead zones when displaying the same.

In the same way as the first embodiment, the decoder is configured to split screens into circular (oval) windows for the following reason.

In general, a display screen has been split into rectangles. Human faces are basically oval, so the four corners of such rectangles become dead zones. These dead zones consequently make the areas for displaying the faces narrower (smaller).

Accordingly, in the present embodiment, the decoder is configured to split screens into circular (oval) windows eliminating any dead zones.

Further, the decoder 80 has a function of displaying a multi-screen image and has a function of calculating the display magnifications of screens based on the line segments connecting centers of screens, the thicknesses of standard shapes, and the magnitudes of audio and controlling the movement and new generation of screens based on these display magnifications to thereby optimally form a plurality of screens on the display screen.

The decoder 80 of FIG. 46 has a network interface (I/F) 801 able to perform wireless communications with the network and receiving packets including audio data, image (video) data, control information and instruction information, screen information, attention worthiness information, volume information, etc. transmitted from the transmitting side, an operation portion 802 enabling key input etc., a received packet analyzing portion 803 for analyzing packets received at the network interface 801 and extracting the audio data, image data, transmitting side address, and control information (top/bottom information and instruction information etc.), an audio decoding portion 804 for decoding the audio data extracted by the received packet analyzing portion 803, a video decoding portion 805 for decoding the video data extracted by the received packet analyzing portion 803, a display image control portion 806 for controlling the sizes and display modes of the screens to be displayed (display windows) based on the video data decoded by the video decoding portion 805, transmitting side address, control information, screen information, size information, and top/bottom information, a volume correcting portion 807 for correcting the volume of the audio decoded by the audio decoding portion 804, a speaker or other audio output portion 808 for generating sound with a volume corrected by the volume correcting portion 807, an image correcting portion 809 for correcting an image controlled in the size and display mode by the display image control portion 806, an LCD or other display portion (image output portion) 810 for displaying an image via the image correcting portion 809, and an own terminal control portion 811 for giving the control information (top/bottom information) to the display image control portion 806 based on the input information from the operation portion 802.

Note that, the encoder 70 and decoder 80 can share the operation portions 703 and 802, network interfaces 717 and 801, terminal control portion 713, and own terminal control portion 811.

A display image control portion 8306 of FIG. 46 has a control information analyzing portion 8061 for extracting the screen information, size information, top/bottom information, and instruction information based on the control information supplied from the received packet analyzing portion 803, a masking portion 8062 for masking the video decoded at the video decoding portion 805 based on the screen information, a display magnification coefficient combining portion 8063 for calculating display magnification coefficients of screens to be displayed (display image areas) based on the attention worthiness information, a reducing/enlarging portion 8064 for reducing/enlarging the image after the masking processing according to the display magnification coefficient calculated at the display magnification coefficient combining portion 8063, a display position calculating portion 8065 for calculating display positions according to the display magnification coefficients calculated at the display magnification coefficient combining portion 8063 and the top/bottom information, and a mapping portion 8066 for mapping the images obtained at the reducing/enlarging portion 3064 at the positions on the display portion 810 obtained at the display position calculating portion 8065.

In the fifth embodiment as well, the screens controlled in sizes and display modes by the display image control portion 806 are displayed as a multi-screen image displaying a plurality of screens on one display screen.

Next, the calculation of display magnifications of screens controlled in sizes and display modes by the display image control portion 806, the calculation of the generation positions of new screens, the calculation of the movement positions of the screens, and so on according to the present fifth embodiment are the same as the display control explained in the second embodiment with reference to FIG. 19 to FIG. 26 etc., therefore an explanation thereof is omitted here.

In the present fifth embodiment, the face detecting portion 707, hand detecting portion 710, and behavior judging portion 711 are placed on the transmitting side, and the attention worthiness judged at the behavior judging portion 711 is transmitted to the receiving side as the control information. On the receiving side, the display magnification coefficient ($V_{syn}$) is calculated at the display magnification coefficient combining portion 8063, and screens are formed from the attention worthiness information ($V_{att}$) described in the received control information and the received volume ($V_{rec}$). Note that it is assumed that the attention worthiness ($V_{att}$) can be intentionally generated at the operation portion 703 from the transmitting side as well.

The behavior information storage portion 712 stores a vector group representing the path of movement of the position of the hand with respect to the position of the face. This is recognized as relative coordinates of the hand with respect to the position of the face based on coordinates of the face extracted at the face detecting portion 707 and coordinates of the hand extracted at the hand detecting portion 710, the motion vector of relative coordinates of the hand is calculated with respect to the elapse of the time, the degree of coincidence (correlation) of this motion vector with the vector stored in the behavior information storage portion 712 is calculated, and when the degree of coincidence is larger than the threshold value, it is judged that the stored behavior is carried out.

Figure 47:
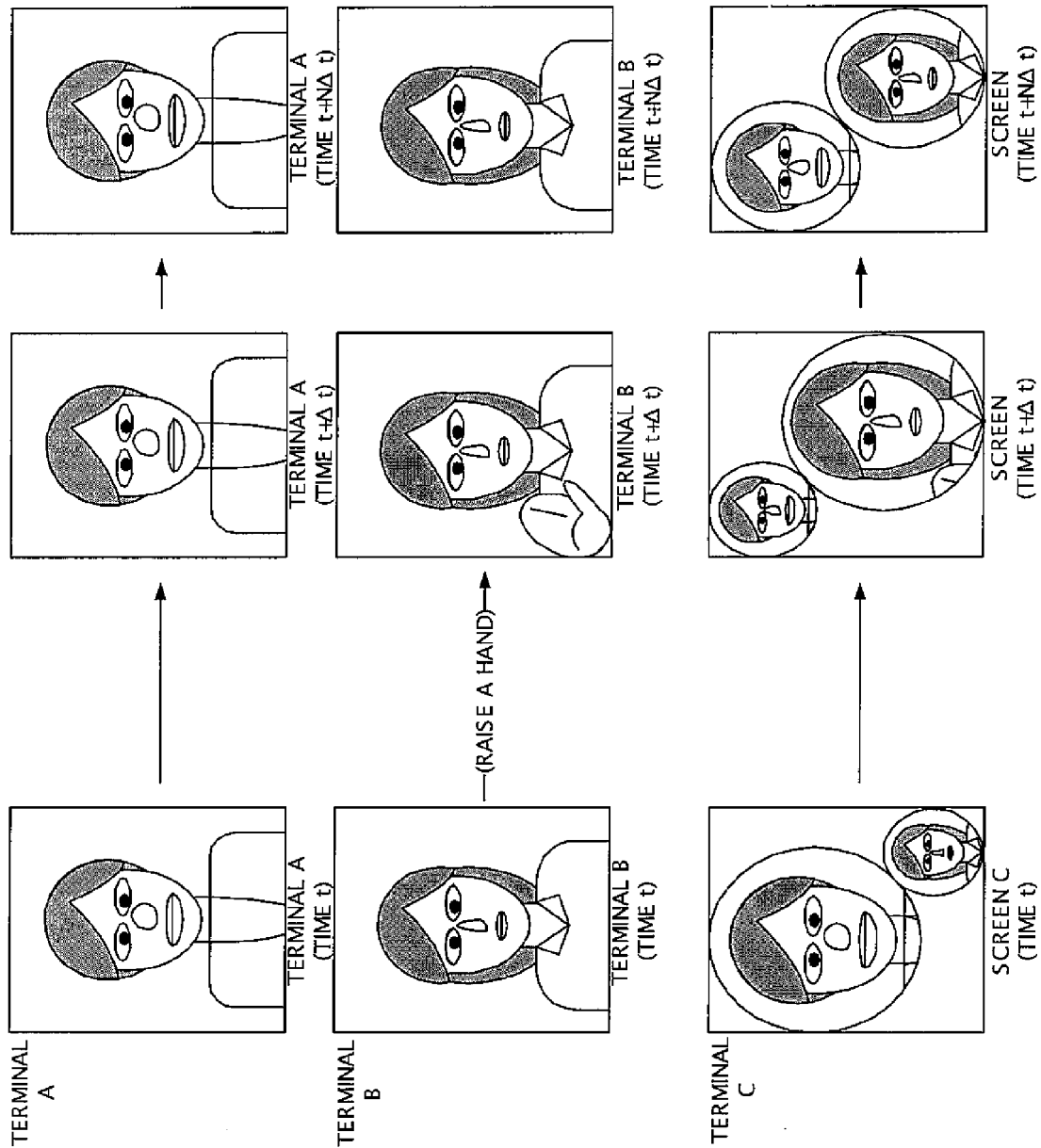
FIG. 47A to FIG. 47C are diagrams showing cases of recognizing faces from images and a case of increasing the attention worthiness when a hand enters an image.

FIG. 47A to FIG. 47C are diagrams showing cases were the face is recognized from the video and cases where the attention worthiness is increased in a case where the hand enters into the video.

When a face can be detected within a video, the hand is searched for in the image. In a case where the (upward facing) hand cannot be detected at the time t-Δt, but the (upward facing) hand can be detected at the time t, the attention worthiness $V_{att}$ is increased. Note that when the received audio increases after that, it is restricted so that the attention worthiness $V_{att}$ is not lowered to the threshold value ($V_{attThresh}$) or less along with the elapse of time. Note that, when the received volume is interrupted for a constant time, the restriction of the threshold value ($V_{attThresh}$) of the attention worthiness ($V_{att}$) is eliminated.

Due to this, in a screen where it is judged that the hand was raised, by beginning to speak together with the operation of raising the hand, lowering of the display magnification coefficient ($V_{syn}$) for calculating the screen size to a constant value or less is suppressed during the period where the conversation is continued, and it becomes possible to suppress the reduction of the screen size along with the elapse of time.

Figure 48:
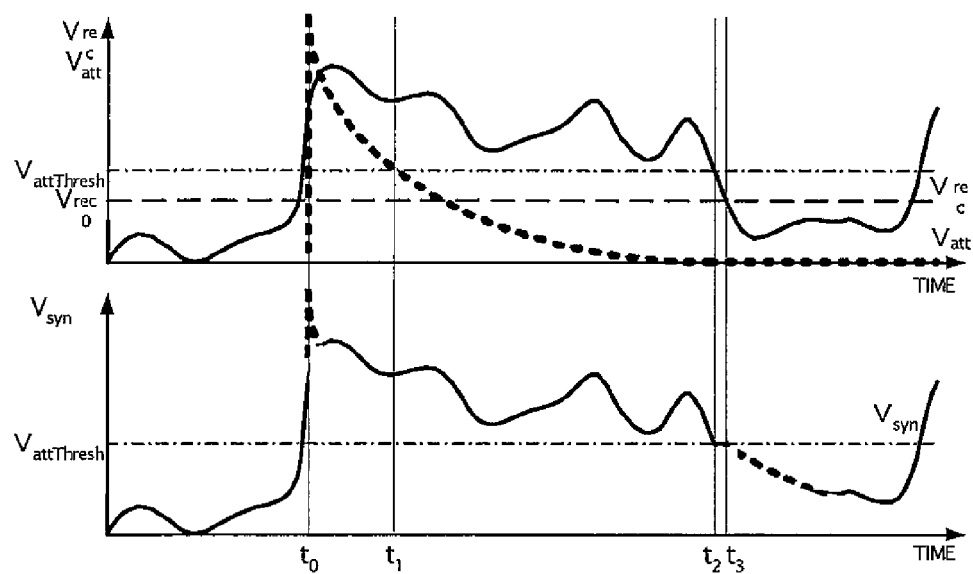
FIG. 48 is a diagram showing a change of attention worthiness ($V_{att}$) by a scene change, a change of received volume ($V_{rec}$), and change of a display magnification coefficient ($V_{syn}$) when the received volume is high.
Figure 49:
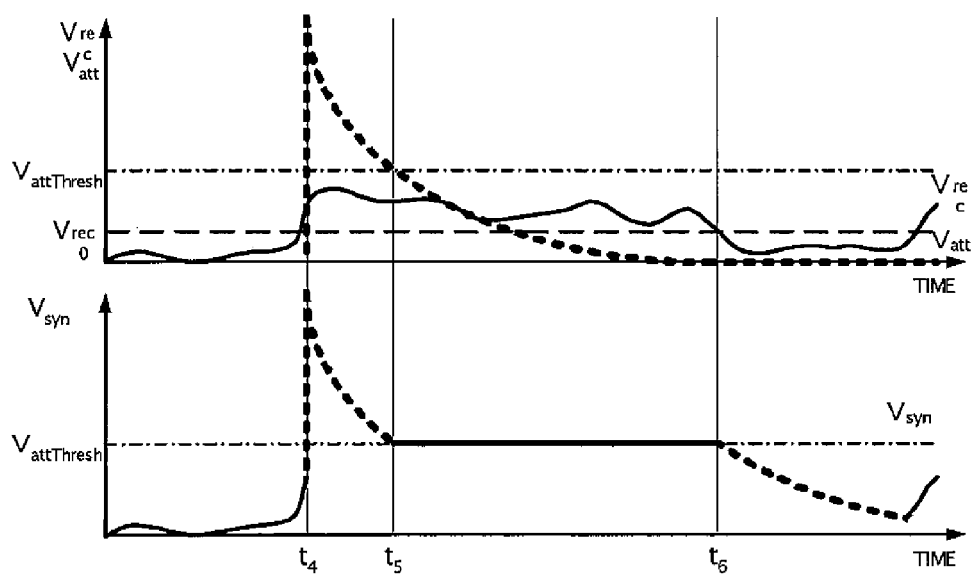
FIG. 49 is a diagram showing a change of attention worthiness ($V_{att}$) by a scene change, a change of received volume ($V_{rec}$), and change of a display magnification coefficient ($V_{syn}$) when the received volume is low.

FIG. 48 shows a case where the received volume is high, while FIG. 49 shows a case where the received volume is low (solid line). At the time $t_0$ and time $t_4$, the upward facing hand is detected, and the attention worthiness ($V_{att}$) increases (broken line). When the received volume ($V_{rec}$) becomes lower than a threshold value ($V_{rec0}$), it is judged that the conversation is interrupted. In the section from the time to $t_0$ the time $t_1$, the attention worthiness ($V_{att}$) is larger than the received volume ($V_{rec}$), therefore the display magnification coefficient ($V_{syn}=V_{att}$) is set. In the section from the time $t_1$ to the time $t_2$, the received volume ($V_{rec}$) is larger than the attention worthiness ($V_{att}$) therefore the display magnification coefficient ($V_{syn}=V_{rec}$) is set. It is judged that the received volume becomes lower than the threshold value ($V_{rec0}$) at the time $t_3$, and the conversation is interrupted.

At a time $t_5$, the attention worthiness ($V_{att}$) reaches the threshold value ($V_{attThresh}$). The received volume ($V_{rec}$) is smaller than the threshold value ($V_{attThresh}$), therefore the display magnification coefficient $V_{syn}$ becomes equal to $V_{attThresh}$ until a time $t_6$ when the conversation is interrupted.

Due to this, even in a case where the received volume is small, it becomes possible to keep the display magnification coefficient ($V_{syn}$) at a magnitude large enough to a certain extent during speaking.

Note that the upward facing hand is recognized. That is, the case of operation with respect to the behavior of raising the hand was shown. However, it is also possible to set things so as to raise the attention worthiness with respect to other behavior by approaching the face or the like.

Next, examples of the display mode in the fifth embodiment will be explained with reference to FIG. 50 to FIG. 52.

Figure 50:
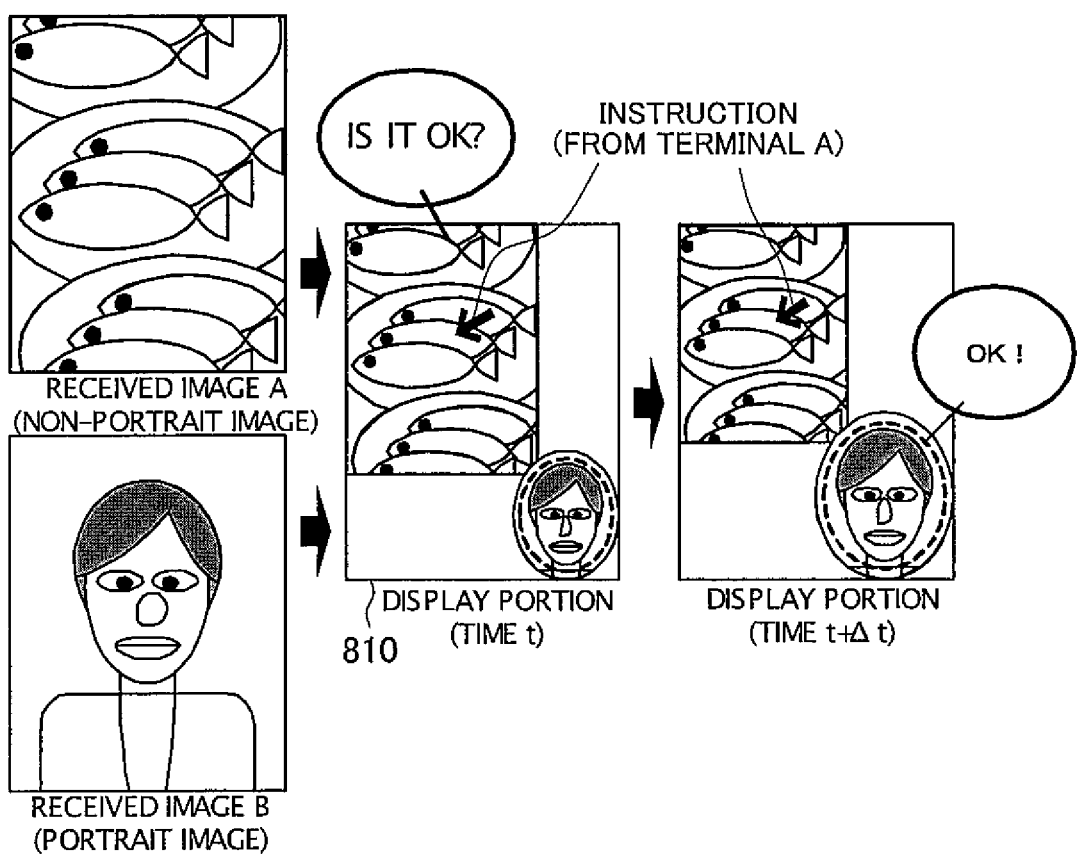
FIG. 50 is a diagram for explaining screen display control in the fifth embodiment and an explanatory diagram of processing in accordance with the surface area of a face area.

As shown in FIG. 50, when the surface area of the face area is a constant value or more, the received image is judged as a "portrait image". When the surface area of the face area is less than the constant value, the received image is judged as a "non-portrait image".

When it is judged to be a "portrait image", the screen is made a circular screen. When it is judged to be a "non-portrait image", the screen is made a rectangular screen. Even in the case of a "non-portrait image", the display size changes in accordance with the sound pressure from the same transmitting side.

Figure 51:
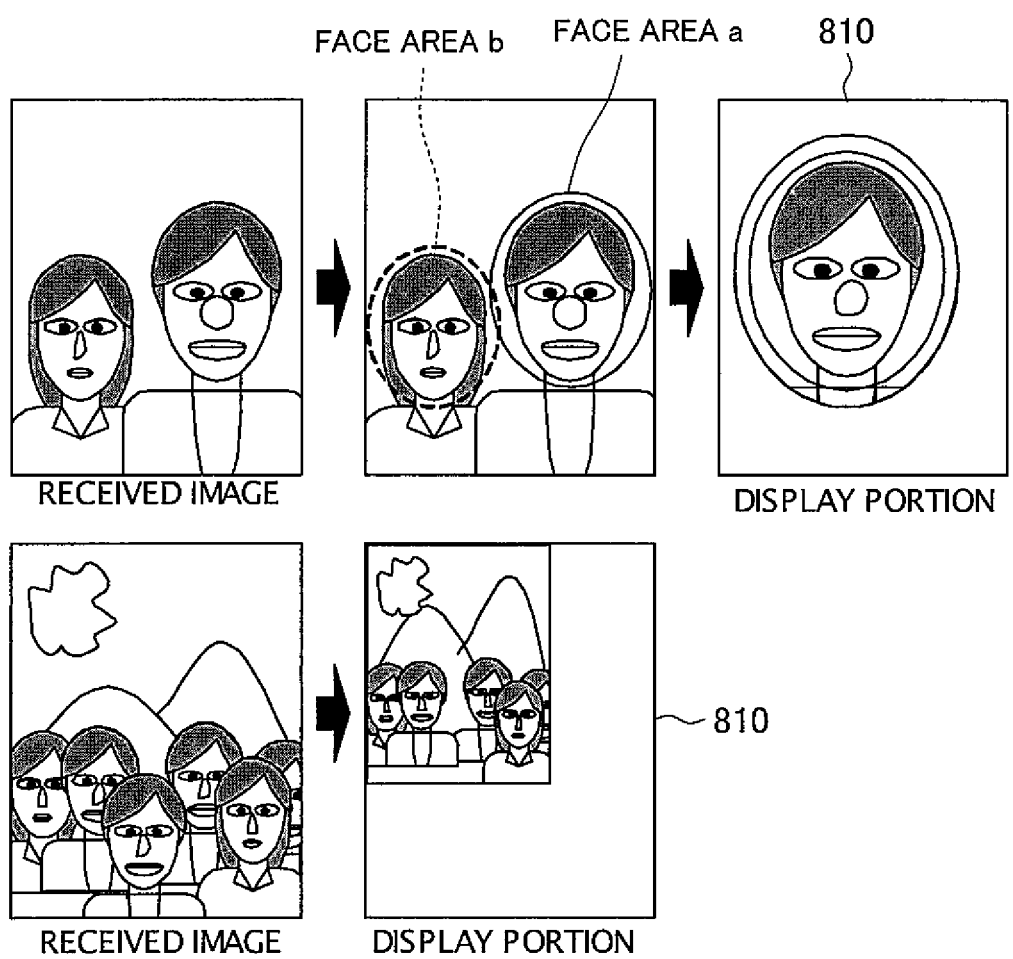
FIG. 51 is a diagram for explaining screen display control in the fifth embodiment and an explanatory diagram of processing for handling cases where there are a plurality of face-judged areas.

As shown in FIG. 51, in a case where there are a plurality of areas judged as faces and a case where the number is a constant value or less, an area having a larger surface area is given a higher priority. In a case where the number is the constant value or more, it is displayed by a rectangular screen in the same way as the case of a non-portrait.

Figure 52:
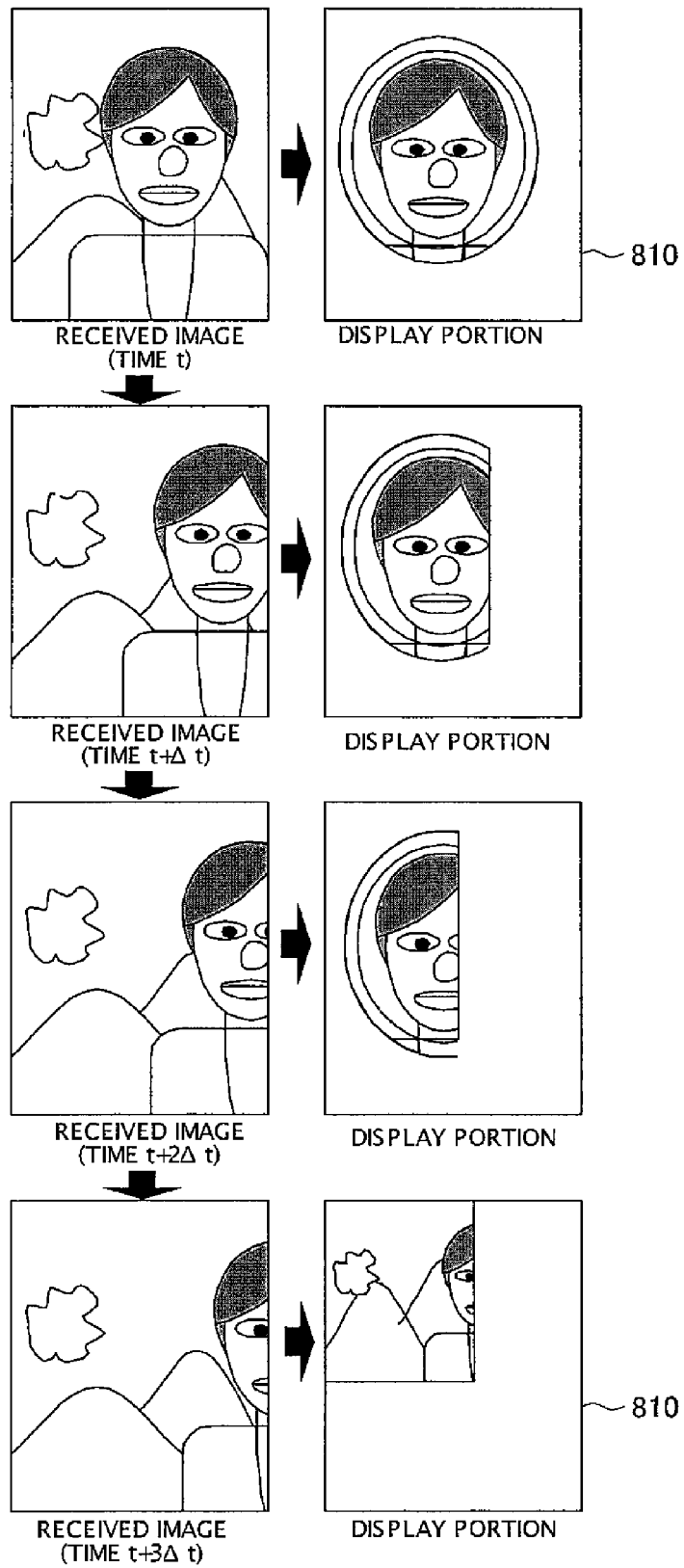
FIG. 52 is a diagram for explaining screen display control in the fifth embodiment and an explanatory diagram of processing for handling a case where a cut out area sticks out from the received image.

As shown in FIG. 52, when the face goes out (sticks out) from the received image, the area which can be cut is estimated from the motion vector. The circular screen (window) is cut only at the visible part.

When the ratio of the face image remaining on the display screen with respect to the size of the estimated face area becomes a constant value or less, that face is deemed as out of bounds.

According to the present fifth embodiment, the same effects as the effects by the fourth embodiment explained before can be obtained.

Namely, the sizes of the screens can be adaptively changed in accordance with the magnitudes of volume and number of screens. Not only do the movements of the screens becomes continuous and it becomes possible to arrange screens with optimum sizes even when different in shapes, but also it becomes possible to quickly show the image (screen size) large on the receiving side without adding any new operation by the sender (further, without the sender speaking) when the sender captures an image that he wants to show.

As a result, even at the time of the connection of a plurality of terminals, it is easy to confirm the other parties in conversation. Control is performed so that images (screens) are not superimposed, therefore the states of all members in the conversations can be confirmed at a glance. Further, it is possible to easily cope with new participants as well.

Sixth Embodiment

Figure 53:
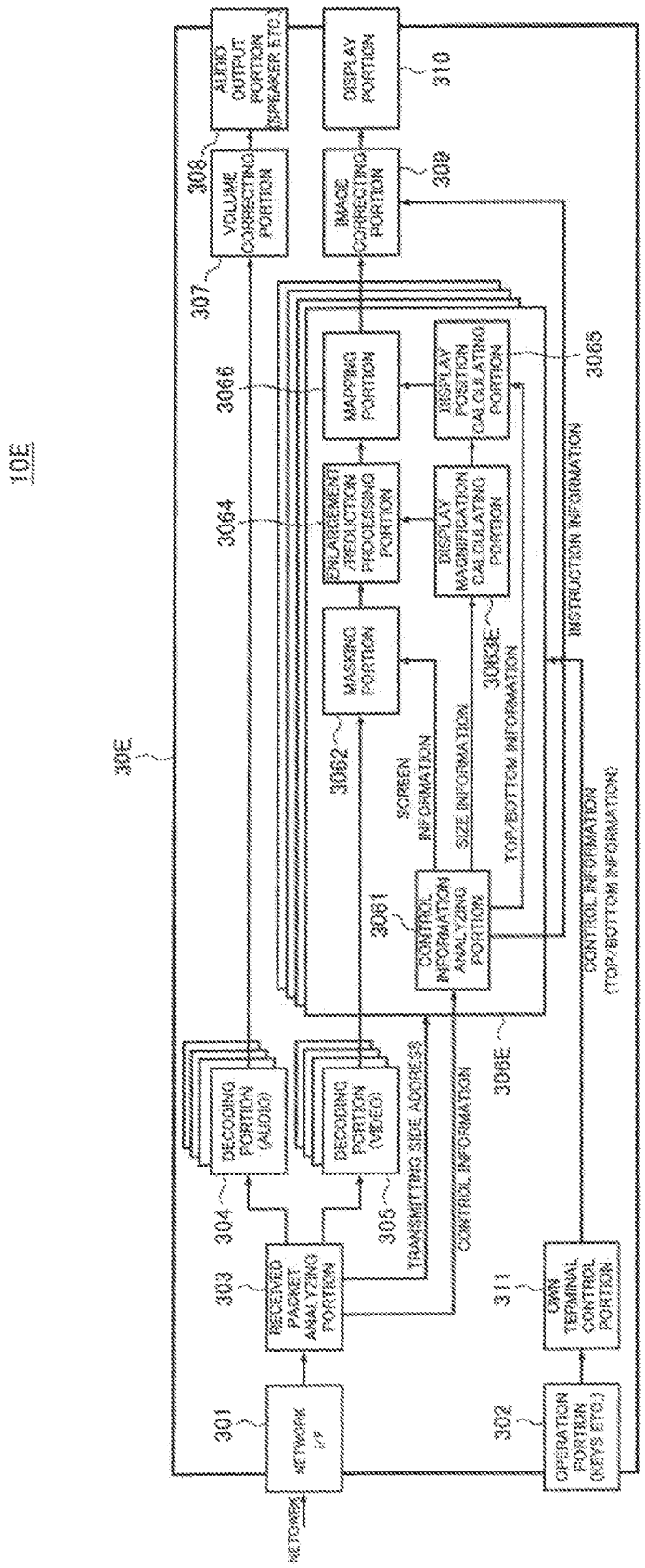
FIG. 53 is a diagram showing an example of the configuration of a decoder in a mobile communication terminal in a sixth embodiment of the present invention.

FIG. 53 is a diagram showing an example of the configuration of a decoder in a mobile communication terminal according to a sixth embodiment of the present invention.

An encoder in a mobile communication terminal 10E according to the present sixth embodiment has the same configuration as the configuration of FIG. 17 explained in the second embodiment, therefore an illustration thereof is omitted here. Further, a basic block configuration of a decoder 50E is the same as the configuration of FIG. 18 explained in the second embodiment, but the processing of a display image control portion 506E is different.

As explained above, in the case where the calculation of positions and calculation of the screen sizes are made based on the interaction with the surrounding screens, the positions and sizes thereof do not always converge to the expected state.

Sometimes a screen will stop with the rate of area occupied small as it is (locally stable state). In this case, the screen remains small as it is, therefore the displayed content becomes small as well. The problem of the locally stable state may also be eliminated previously by the stirring processing.

However, in the locally stable state, even when stirring processing is applied, sometimes the screens cannot shift to an array where the rate of area occupied by all screens is the highest due to the array of screens and the relationships of volume.

Figure 54A:
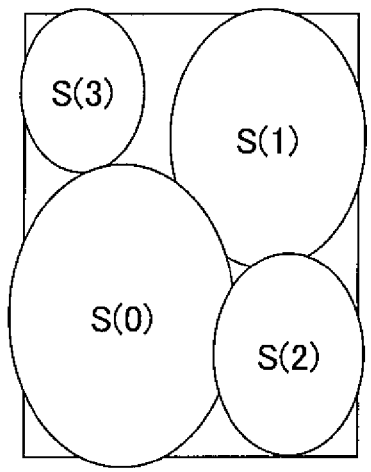
FIG. 54 are diagrams for explaining the problem in the locally stable state of multi-screen images.
Figure 54B:
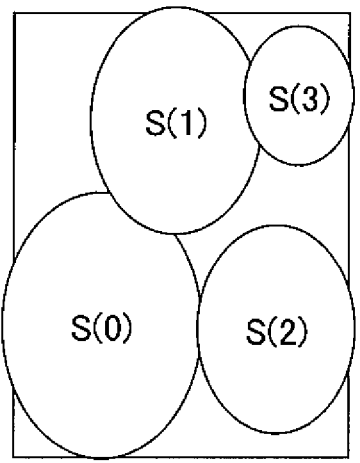

In FIG. 54A and FIG. 54B, the volume ratios of screens are V(S0):V(S1):V(S2):V(S3)=6:5:4:3. The positions of S1 and S3 are different between FIG. 54A and FIG. 54B. In this case, it is seen that the rate of area occupied (R) becomes small in FIG. 54B in comparison with FIG. 54A. In this way, in certain arrays, sometimes screens cannot shift to the state where the rate of area occupied is the highest.

Therefore, in the present sixth embodiment, a mobile communication terminal able to adaptively and optimally update the sizes and positions of the display image areas (screens) in accordance with the magnitudes of volume, number of display image areas (screens) to be displayed, or other situations without any operation by the user and, in addition, in which the rearrangement (movement) of display image areas becomes continuous, and screens can be arranged with optimum sizes even when these have different shapes, so the locally stable state can be eliminated is realized.

A decoder 30E according to the present sixth embodiment, in addition to the functions of the third and/or fourth embodiments, has a function of analyzing array patterns of display areas on the display screen based on the screen information and switching arrays of the patterns for stabilization.

The concrete processing will be explained in detail later with reference to the drawings.

The decoder 30E of FIG. 53, basically, in the same way as the configurations of FIG. 18 and FIG. 32, has a network interface (I/F) 301 able to perform wireless communications with the network and receiving packets including the audio data, image (video) data, control information and instruction information, screen information, volume information, etc. transmitted from the transmitting side, an operation portion 302 enabling key input etc., a received packet analyzing portion 303 for analyzing packets received at the network interface 301 and extracting the audio data, image data, transmitting side address, and control information (top/bottom information and instruction information etc.), an audio decoding portion 304 for decoding the audio data extracted by the received packet analyzing portion 303, a video decoding portion 305 for decoding the video data extracted by the received packet analyzing portion 303, a display image control portion 306E for controlling the sizes and display modes of the screens to be displayed (display windows) based on the video data decoded by the video decoding portion 305, transmitting side address, control information, screen information, size information, and top/bottom information, a volume correcting portion 307 for correcting the volume of the audio decoded by the audio decoding portion 304, a speaker or other audio output portion 308 for generating sound with a volume corrected by the volume correcting portion 307, an image correcting portion 309 for correcting the images controlled in the sizes and display modes by the display image control portion 306E, an LCD or other display portion (image output portion) 310 for displaying the image via the image correcting portion 309, and an own terminal control portion 311 for giving the control information (top/bottom information) to the display image control portion 306E based on the input information from the operation portion 302.

Below, the more concrete configuration and functions of the display image control portion 306E characterizing the present sixth embodiment and concrete examples of the display modes of the screens will be explained in sequence.

The display image control portion 306E of FIG. 53 has a control information analyzing portion 3061 for extracting the screen information, size information, top/bottom information, and instruction information based on the control information supplied from the received packet analyzing portion 303, a masking portion 3062 for masking the video decoded at the video decoding portion 305 based on the screen information, a display magnification calculation and judging portion 3063E for calculating display magnifications of screens to be displayed (display image areas) based on the size information and screen information, analyzing array patterns of display areas on the display screen, and switching arrays of patterns for stabilization, a reducing/enlarging portion 3064 for reducing/enlarging images after the masking processing according to display magnifications calculated at the display magnification calculation and judging portion 3063E, a display position calculating portion 3065 for calculating display positions according to display magnifications calculated at the display magnification calculation and judging portion 3063 and the top/bottom information, and a mapping portion 3066 for mapping images obtained at the reducing/enlarging portion 3064 at positions on the display portion 310 obtained at the display position calculating portion 3065.

The display image control portion 306E of the present embodiment has the vibrating state judgment function of judging whether or not one or more screens are in the continuously moving state in local regions.

This vibrating state judgment function judges that the screens are in a vibrating state in a case where, in a constant period (n), there is no change of the number of screens, there is no change of magnitude of audio of the screens, and further there is a change of the positions of the screens, the changes are threshold value (Pthresh0) or less, and the changes of the display magnifications of the screens are a threshold value (Rthresh0) or less, and fixes screens at an array where the squares sum value (R) of display magnifications during the above period is the largest in the vibrating state.

Further, the display image control portion 506E of the present embodiment has a stable state judgment function of judging whether or not the screens are in the stable state.

This stable state judgment function judges that the screens are in the stable state in a case where, in a constant period (m), there is no change of the number of screens, no change of magnitudes of audio of the screens, the change of the positions of the screens is a threshold value (Pthresh1) or less, and the change of the display magnifications of the screens is a threshold value (Rthresh1) or less.

Further, the stable state judgment function judges that the screens are in the locally stable state in a case where, in a constant period, there is no change of the number of screens, there is no change of magnitudes of audio of the screens, the change of the positions of the screens is a threshold value (Pthresh1) or less, and the change of the squares sum ratio of display magnifications of the screens is a threshold value (Rthresh2) or less.

Further, the display image control portion 506E of the present embodiment has the stirring processing function of promoting the rearrangement of the positional array of screens in the case where they are judged as stable by the stable state judgment function of the screen.

This stirring processing function performs stirring by arranging provisional centers on the display screen, setting the position giving the smallest value, not selected previously, of the display magnifications at the centers as the center of the screen for stirring, and generating, updating, and erasing the screen for stirring over the constant period for stirring.

Where a number of times (S) of execution of the stirring processing exceeds a threshold value (Sthresh), it is judged that the screens are in the stable state, and the stirring processing is stopped.

The screens controlled in sizes and display modes by the display image control portion 306E of the present embodiment are displayed as a multi-screen image displaying a plurality of screens on one display screen.

The display control of the multi-screen image basically including the processing of the display magnification calculation and judging portion 3063B and the display position calculating portion 3065 of the display image control portion 306E of the present sixth embodiment is the same as the display control explained in connection with FIG. 19 to FIG. 26 etc. in the second embodiment, therefore an explanation thereof is omitted here.

Next, the processing for switching the array of patterns for analyzing array patterns of display areas on the display screen based on the screen information and stabilizing the same will be explained with reference to FIG. 55 to FIG. 68.

Figure 55:
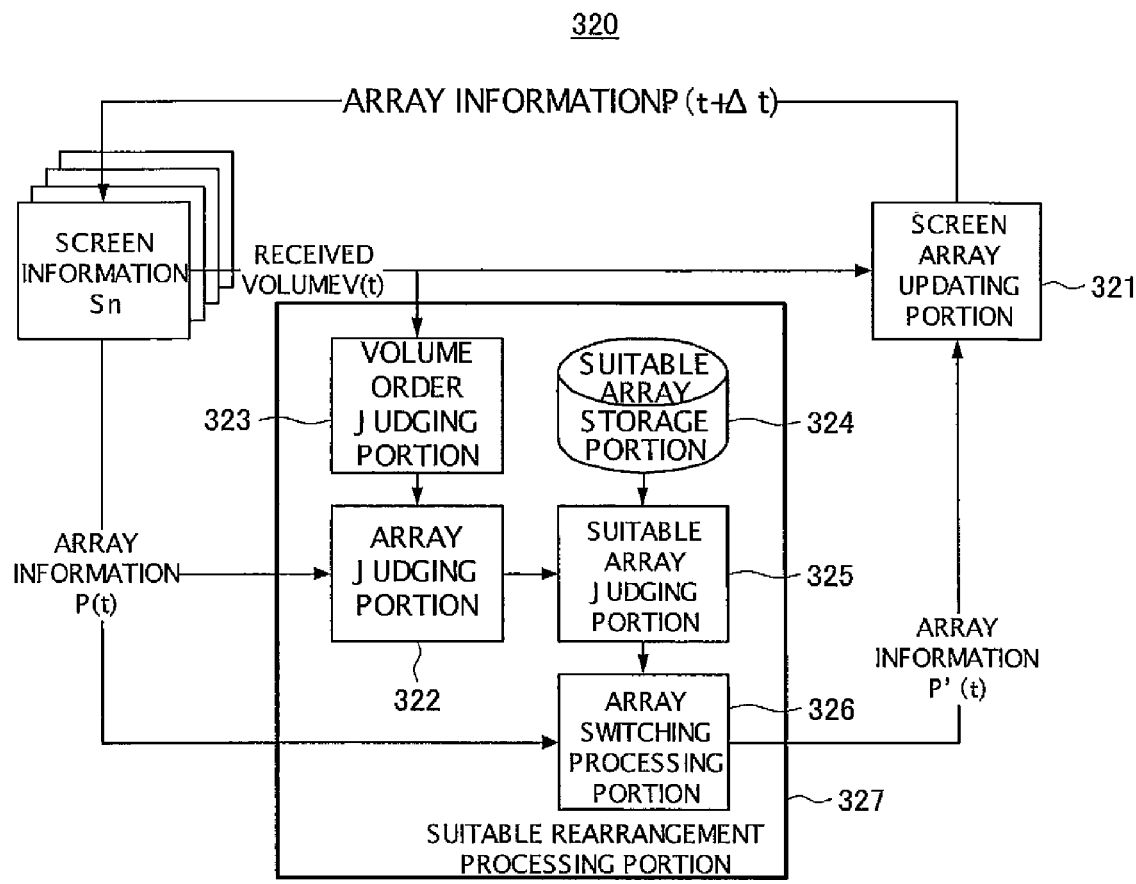
FIG. 55 is a block diagram showing an example of the configuration of an array switching processing function portion in a display magnification calculation and judging portion of the sixth embodiment.

FIG. 55 is a block diagram showing an example of the configuration of the array switching processing function portion in the display magnification calculation and judging portion 3063E of the present embodiment.

The array switching processing function portion 320 of FIG. 55 has a screen array updating portion 321, an array discrimination portion 322, a volume order judging portion 323, a suitable array storage portion 324, a suitable array judging portion 325, and an array switching portion 326.

Further, a suitable rearrangement processing portion 327 is configured by the array discrimination portion 322, volume order judging portion 323, suitable array storage portion 324, suitable array judging portion 325, and array switching portion 326.

The screen array updating portion 321 generates array information (P(t+Δt)) at the next time (t+Δt) based on the array information P(t) and received volumes V(t) of the screens (Sn).

The array discrimination portion 322 discriminates the array of screens based on the order according to the volume order judging portion 323.

The suitable array judging portion 325 compares the array discriminated at the array discrimination portion 322 with an array pattern stored in the suitable array storage portion 324 and judges if it is a suitable array.

In a case where the array must be made suitable based on the judgment result of the suitable array judging portion 325, the array of screens is switched at the array switching portion 326.

The screen array updating portion 321 updates the array of screens for the switched array (P'(t)). Where it is unnecessary to make the array suitable, the array switching portion 326 does nothing, so the screen array updating portion 321 generates the array information (P(t+Δt)) of the next time (t+Δt) based on the array information P' (t) (=P(t)).

The suitable array judging portion 325 compares the array relationships based on the volume order of screens and array relationships of screens of the volume order which become suitable by using the screen having the highest volume as the standard.

Further, the array switching processing function portion 320 makes the screen determined as the priority display target selected by the user larger in the size of the screen in comparison with the other screens (irrespective of the reproduction volume) by a display magnification calculation use volume ($V_{display}$) obtained by raising the volume ($V_{receive}$) of reception by a priority display offset ($V_{offset}$).

Further, the key array of the terminal is projected on the screen array on the display screen. The screen existing in the range of an operated (for example, depressed) key projected onto the display screen is selected.

Further, in a silent period ($T_{silent}$) after a speaking period ($T_{speak}$), the attenuation of the display magnification calculation use volume ($V_{display}$) is made slow when the speaking period ($T_{speak}$) is short, and the attenuation is made fast when the speaking period ($T_{speak}$) is long.

The speaking period and silent period for each screen are measured, statistics of the length of the speaking period having a short silent period are taken based on patterns of the speaking period and silent period in the past, and where it is estimated based on the statistics that the next silent period is short, the attenuation rate in the silent period having a volume ($V_{display}$) for display magnification calculation is made slow.

Figure 56:
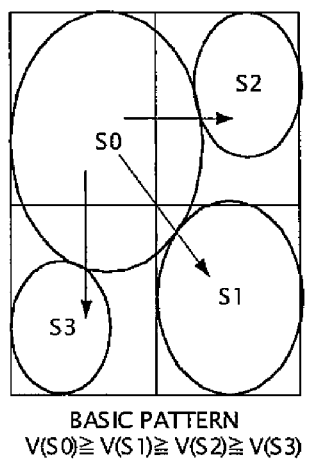
FIG. 56 is a diagram showing a basic pattern of the received volume of a screen.

FIG. 56 is a diagram showing a basic pattern of the received volume of the screen.

As shown in FIG. 56, the relationship of received volumes ($V_{receive}$) of the screens sets the relationships of the positional array of the screens in a case where $V(S0) \geqq V(S1) \geqq V(S2) \geqq V(S3)$.

Figure 57:
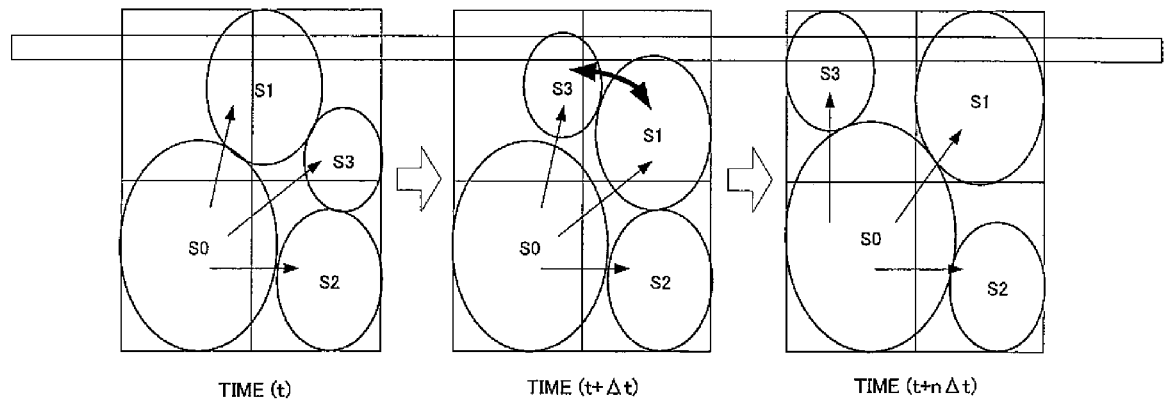
FIG. 57 is a diagram for explaining processing for obtaining a grasp of the relative magnitude of received volumes of screens.

FIG. 57 is a diagram for explaining processing for obtaining a grasp of the relative magnitudes of received volumes of the screens.

The relative magnitudes of the received volumes of the screens are grasped, and the screens are defined as S0, S1, S2, and S3 from the screen having the largest received volume. The relative arrays of S1, S2, and S3 with respect to S0 are compared with the basic pattern. The positional relationships between the basic pattern (FIG. 56) and the time t are compared.

In the basic pattern, the array sequence of S1 to s3 when viewed from S0 becomes S2→S1→S3 from a neighbor of S0.

Contrary to this, the arrangement of the time t becomes S2→S3→S1 from next to S0. This means a reverse of positional relationships of S3 and S1. For this reason, at the time t+Δt, the arrays of S3 and S1 are switched. Finally, by the mode of operation of screens with respect to each other, the array automatically shifts to an array where the rate of area occupied is the highest (see FIG. 3) (time t+nΔt).

Figure 58:
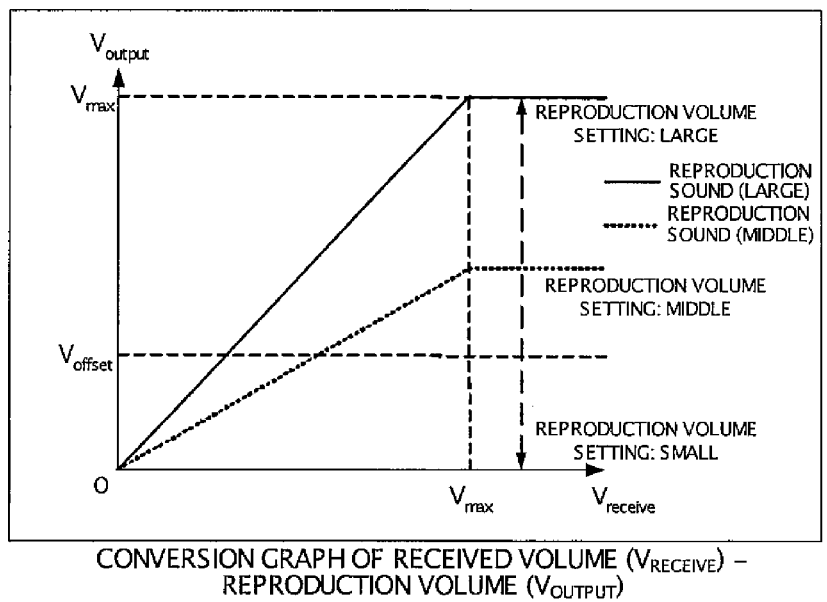
FIG. 58 is a diagram showing a graph of conversion of a volume ($V_{receive}$) of reception and reproduction volume ($V_{output}$).
Figure 59:
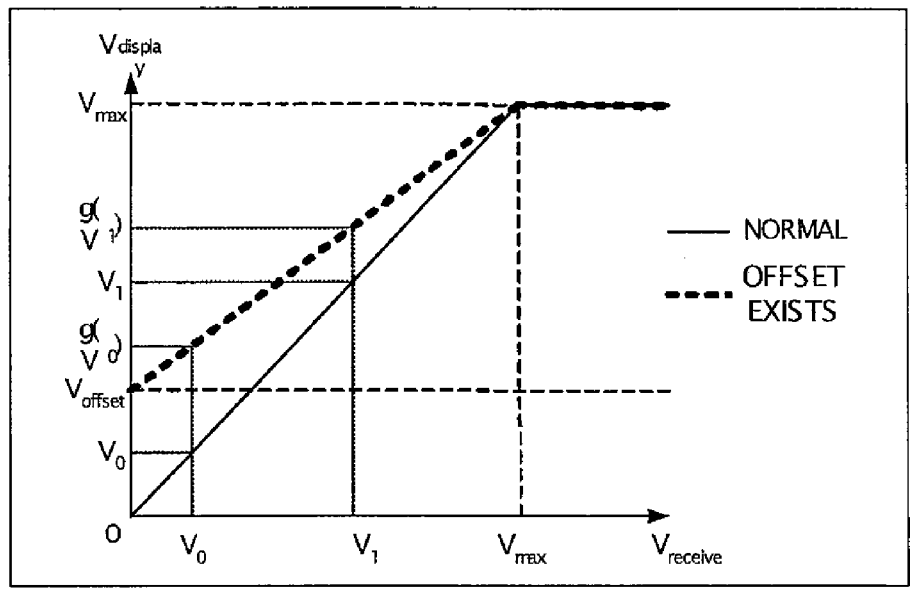
FIG. 59 is a diagram showing a graph of conversion of a volume ($V_{receive}$) of reception and a display magnification calculation use volume value ($V_{display}$).

FIG. 58 is a diagram showing a conversion graph of received volume ($V_{receive}$)-reproduction volume ($V_{output}$). FIG. 59 is a diagram showing a conversion graph of received volume ($V_{receive}$)-display magnification calculation use volume value ($V_{display}$).

Sometimes it is desired to make a specific screen larger than the other screens with priority. In such a case, an offset is added to the magnitude (V) of audio of the screen of the parameter forming the basis of calculation of the display magnification (R).

Usually, as the magnitude (V) of audio of the screen, use is made of the magnitude of the received audio.

Contrary to this, by setting the magnitude ($V_{display}$) of audio for the calculation of the display magnification (R) and converting the magnitude ($V_{receive}$) of the received audio to the display magnification use volume value ($V_{display}$) according to the received volume ($V_{receive}$)-display magnification calculation use volume ($V_{display}$) conversion graph, the display size of the screen on the display screen is made larger with priority. In the conversion from $V_{receive}$ to $V_{display}$, the value is raised by the offset ($V_{offset}$) (FIG. 59).

Note that assume that the volume ($V_{output}$) of reproduction is in a proportional relationship in a section from minimum (0) to maximum volume ($V_{max}$) and that the maximum value ($V_{max}$) of the reproduction volume ($V_{output}$) can be made variable based on the setting of the terminal volume (FIG. 58). Further, assume that this can be set for each screen as well.

The calculation equation of the usual display magnification is as follows:

$R = f(V_{receive})$  [Equation 21]

In this case, at the screen set large in size with priority (offset added), the following equations stand. The offset ($V_{offset}$) is added at the function g(·).

$V_{display} = g(V_{receive})$ $R = f(V_{display})$  [Equation 22]

Note that assume that the reproduction volume ($V_{output}$) does not change from usual one ($V_{output} = V_{receive}$).

Figure 60:
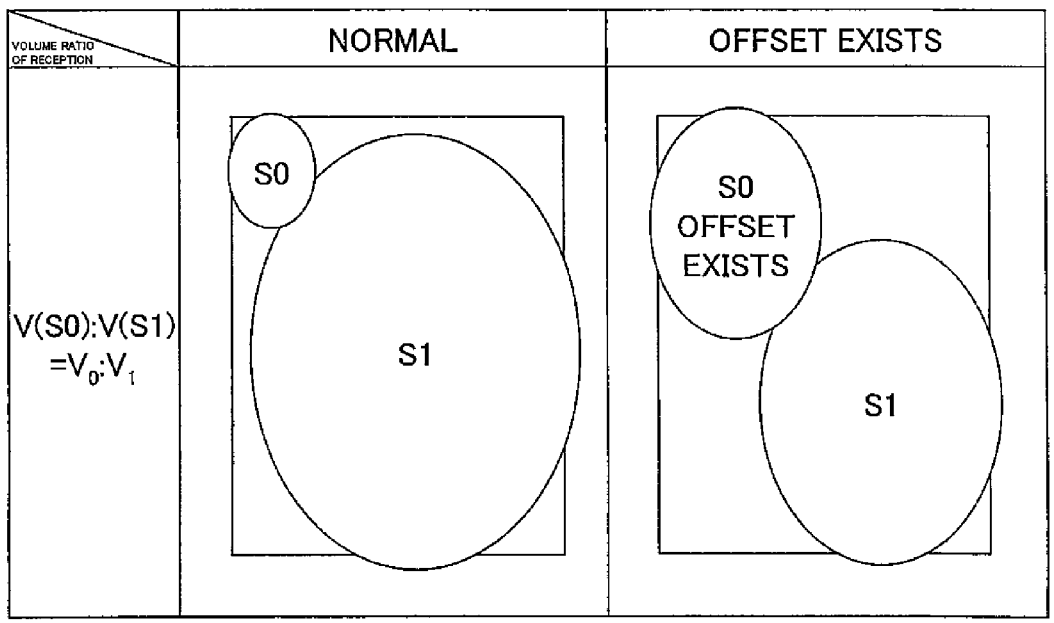
FIG. 60 is a diagram showing set states of screens in accordance with a received volume ratio in a normal mode and a case where there is an offset.
Figure 61:
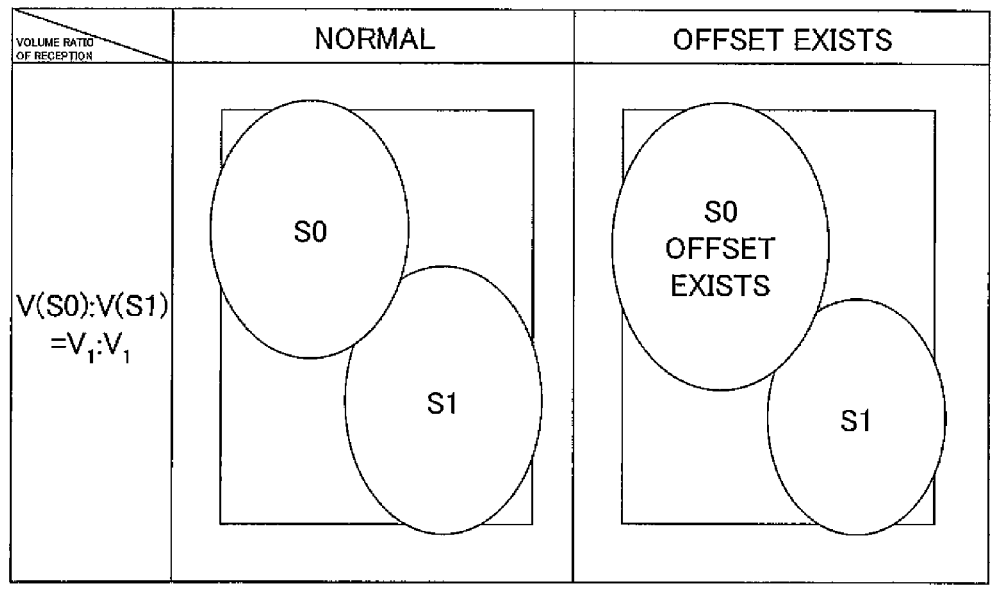
FIG. 61 is a diagram showing set states of screens in accordance with a received volume ratio in a normal mode and case where there is an offset.

FIG. 60 and FIG. 61 are diagrams showing settings of the screens in accordance with the received volume ratio in the ordinary mode and a case where offset exists.

Two screens (S0,S1) are set on the display screen. The ratios V(S0):V(S1) of the received volumes of the screens (S0,S1) are set as $V_0:V_1$ (FIG. 60) and $V_1:V_1$ (FIG. 61). In this case, these are diagrams showing the difference of sizes in a case where the size of the screen (S0) is set to become large with priority (offset added) and a case where it is not so set.

It is seen that the screen (right, S0) in the case where the offset is added clearly becomes larger in comparison with the usual screen (left, S0) in both diagrams.

Figure 62A:
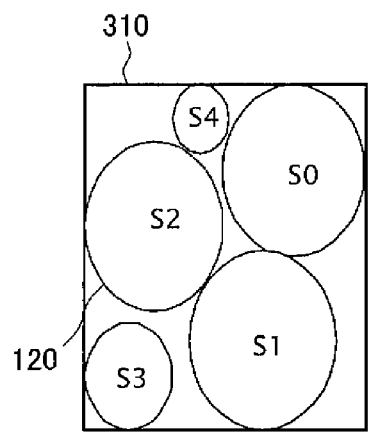
FIG. 62A to FIG. 62C are diagrams showing relationships between screen array and key array on a display screen.
Figure 62B:
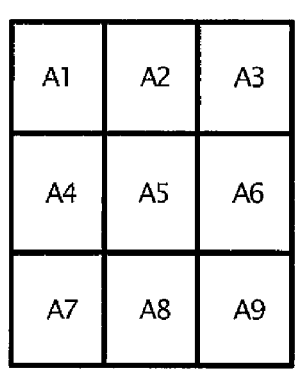
Figure 62C:
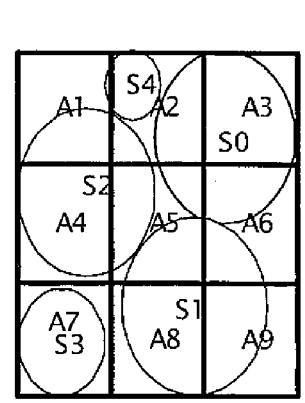

FIG. 62A to FIG. 62C are diagrams showing the relationships between the screen array and key array on the display screen.

When selecting individual screens on the display screen, the key array 330 is projected onto the display screen. When any key is depressed, it is deemed that the screen number included in the area corresponding to the key number has been selected and the outer frame of the screen changes in color to a selected color. The outer frame becomes thicker. The size of the screen is repeatedly enlarged and/or reduced through by small amounts.

In the screens, as shown in Table 1, in which areas the rates by which they are included are largest are calculated. These are designated, in the order of size, the maximum area MA, second area A2, third area A3, . . . .

The screen S0 is included in the areas A2, A3, A5, and A6. Among these, it is the area A3 that has the largest rate of area occupied, so the maximum area MA is made the area A3. The area having the second largest rate of area occupied is the area A6, so the second area A2 is made the area A6. The screen S3 is included in only the area A7. For this reason, the maximum area MA becomes the area A7, and the second and third areas do not exist.

TABLE 1

| Screen no. | Areas included in | Maximum area | Second area | Third area |
| --- | --- | --- | --- | --- |
| 0 | 2, 3, 5, 6 | 3 | 6 | 2 |
| 1 | 5, 6, 8, 9 | 8 | 9 | 5 |
| 2 | 1, 2, 4, 5 | 4 | 1 | 5 |
| 3 | 7 | 7 | — | — |
| 4 | 1, 2 | 2 | 1 | — |

Based on this Table 1, screen numbers are assigned with respect to key numbers. Screen numbers are assigned to the empty key numbers in the sequence of the maximum area MA, second area A2, and third area A3. Note that when they are already assigned at n-th, it is assumed they cannot be assigned at n+1. In the first assignments, when there is a plurality of screens in one area, they are assigned as they are. In the second assignments and third assignments, they are assigned to the areas with the larger rates of area occupied. When the differences in the rates of area occupied are small, they are assigned to both.

The first assignments to the key numbers are entered based on the maximum areas and screen numbers in Table 1. The maximum area MA for the screen S0 is the area A3. For this reason, the screen S0 is entered for the key number 3 in the first assignment. When nothing is assigned to the key numbers in the first assignments, this is left as it is and the screens are entered in the second assignments. The screen number corresponding to the second area A2 is entered for a key number to which nothing is assigned in the first assignments among the key numbers based on the second area A2 and screen numbers of the table. The screens S2 and S4 have the area A1 as the second area A2. At this time, the screen S2 having a higher surface area rate of area occupied in the area A1 is selected and entered as the second assignment. In the same way, the same operation is carried out for the third assignments.

In the case of the screens of the display screen described above, it becomes possible to perform assign screens as in the following Table 2 (key number-assignment).

Due to this, it becomes possible to easily select a screen.

TABLE 2

| Key number | First assignment | Second assignment | Third assignment | Assignment |
|---|---|---|---|---|
| 1 | — | 2 | — | 2 |
| 2 | 4 | — | — | 4 |
| 3 | 0 | — | — | 0 |
| 4 | 2 | — | — | 2 |
| 5 | — | — | 1 | 1 |
| 6 | — | 0 | — | 0 |
| 7 | 3 | — | — | 3 |
| 8 | 1 | — | — | 1 |
| 9 | — | 1 | — | 1 |

Figure 63:
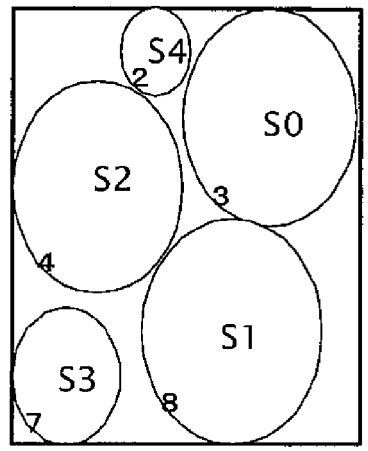
FIG. 63 is a diagram showing an example of expression of corresponding key numbers on screens at the time of a selection operation.

Further, as shown in FIG. 63, by labeling the screens with the corresponding key numbers at the time of the selection operation, it becomes possible to more improve the operation.

Figure 64:
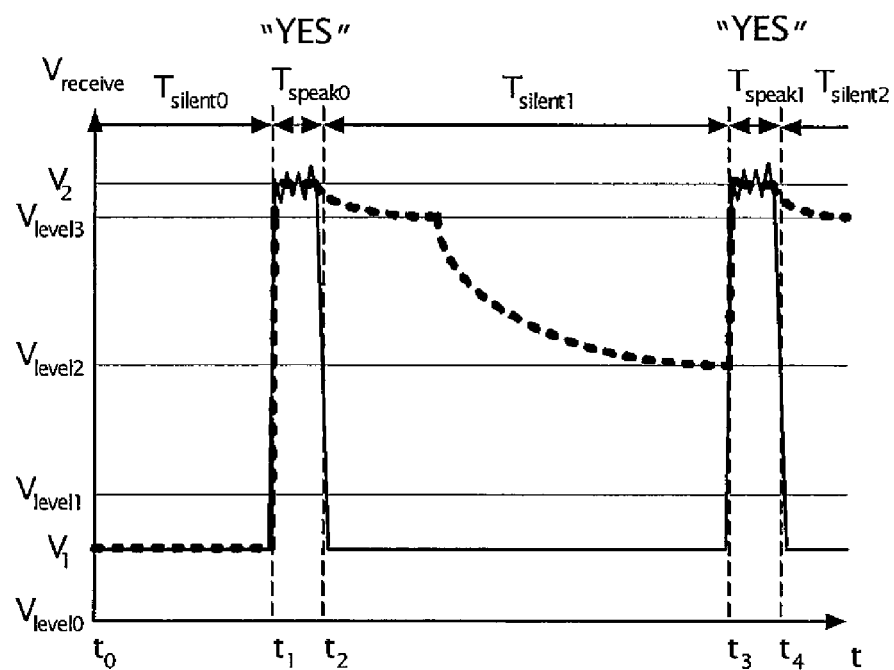
FIG. 64 is a diagram showing the relationship between the volume ($V_{receive}$) of the received audio and the display magnification calculation use volume ($V_{display}$) in a first case.
Figure 65:
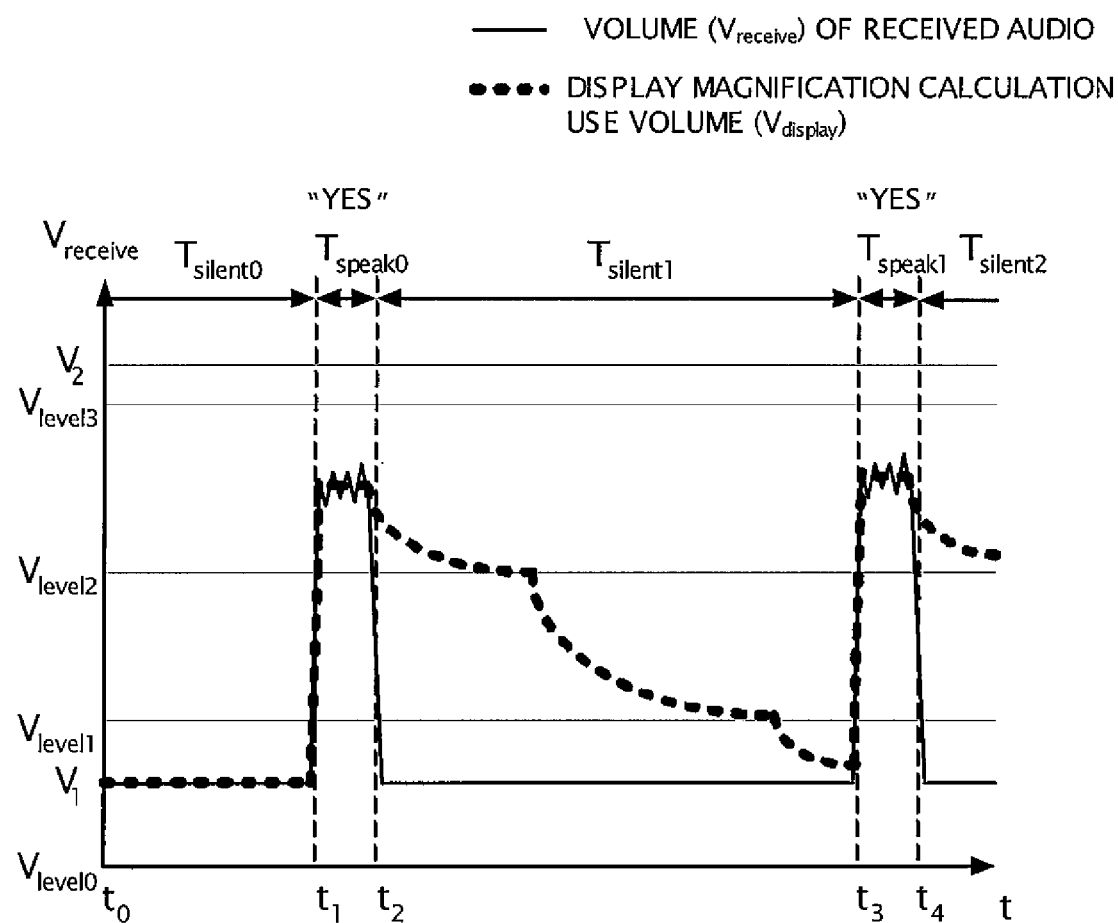
FIG. 65 is a diagram showing the relationship between the volume ($V_{receive}$) of the received audio and the display magnification calculation use volume ($V_{display}$) in a first case.

FIG. 64 and FIG. 65 are diagrams showing the relationships between the volume ($V_{receive}$) of the received audio and the display magnification calculation use volume ($V_{display}$) in the first case.

Figure 66:
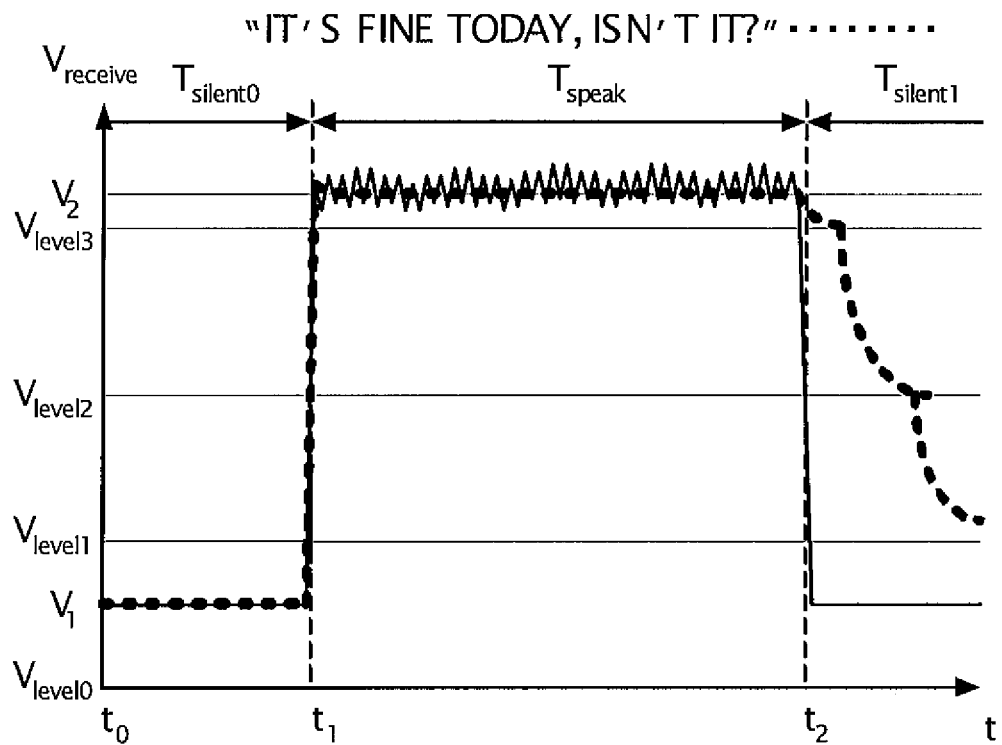
FIG. 66 is a diagram showing the relationship between the volume ($V_{receive}$) of the received audio and the display magnification calculation use volume ($V_{display}$) in a second case.
Figure 67:
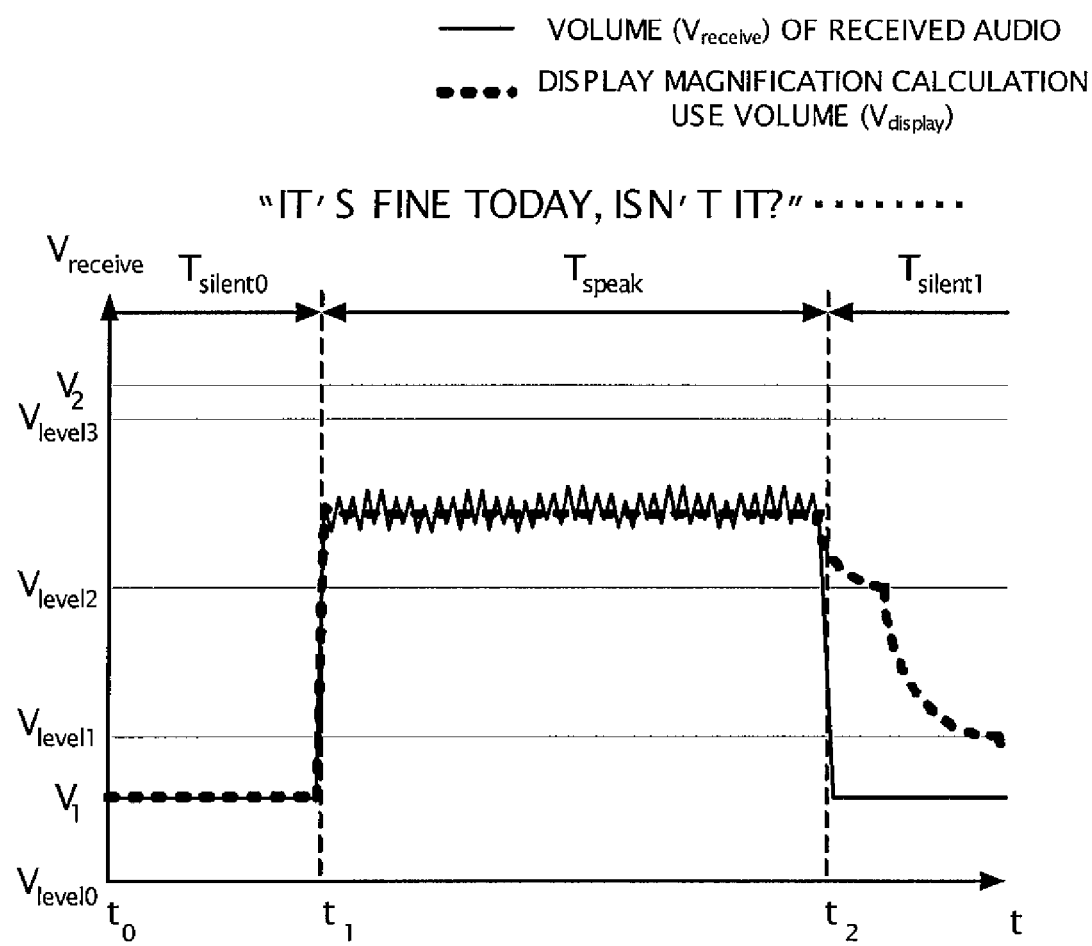
FIG. 67 is a diagram showing the relationship between the volume ($V_{receive}$) of the received audio and the display magnification calculation use volume ($V_{display}$) in a second case.

FIG. 66 and FIG. 67 are diagrams showing the relationships between the volume ($V_{receive}$) of the received audio and the display magnification calculation use volume ($V_{display}$) in the second case.

In the figures, the solid lines show the volumes ($V_{receive}$) of the received audio, while the broken lines show the display magnification calculation use volumes ($V_{display}$). The abscissas represent the time axis, and the ordinates represent volumes. Note that, $T_{speak}$ is the time of speaking, and $T_{silent}$ is the time of no speaking. Several threshold values ($V_{level0,1,2}$) are set for the volume.

Case 1 in FIG. 64 and FIG. 65 shows a case of "supportive response" or another short audio, and case 2 shows a case of conversation or another long audio.

In case 1, when there is an audio "Yes" at the time $t_1$ and the received volume ($V_{receive}$) exceeds the threshold value ($V_{levelj}$) and becomes $V_2$, it is judged that a large change occurred in the audio input, and the display magnification calculation use volume ($V_{display}$) becomes a straight value ($V_2$). At the period $[t_1,t_2]$, the threshold value ($V_{levelj}$) is not exceeded. At this time, in the period $[t_1,t_2]$, the display magnification use volume ($V_{display}$) becomes a mean value of received volumes ($V_{receive}$) in this period.

When the received volume ($V_{receive}$) crosses the lower limit threshold value ($V_{level3}$), it is judged that the audio has ended, and the display magnification use volume ($V_{display}$) is attenuated. At this time, the attenuation rate is determined depending upon the period ($T_{speak}$) of the volume level ($[V_{level3}, V_{level4}]$ having this threshold value ($V_{level3}$) as the lowest limit.

When the speaking period ($V_{speak}$) is short, the attenuation is made slower, while when the speaking period ($V_{speak}$) is long, the attenuation is made faster. In Case 1, the period ($V_{speak}$) is short, therefore the attenuation rate is made slow. In the silent period ($V_{silent1}$), the received volume ($V_{receive}$) has become small, i.e., $V_1$. Contrary to this, the display magnification calculation use volume ($V_{display}$) has become a relatively high value, i.e., $V_{level2}$ even immediately before the time $t_3$. At the time $t_3$, there is an audio "YES", and the received volume ($V_{receive}$) exceeds the threshold value ($V_{level3}$). Therefore, in the same way as that explained above, it is judged that a large change occurred in the audio input, and the display magnification calculation use volume ($V_{display}$) becomes a straight value ($V_2$).

In Case 2 in FIG. 66 and FIG. 67, there is an audio "Hello . . . " at the time $t_1$ and the received volume ($V_{receive}$) exceeds the threshold value ($V_{level1,2,3}$) and becomes $V_2$ in the same way as case 1, therefore it is judged that a large change occurred in the audio input, and the display magnification calculation use volume ($V_{display}$) becomes a straight value ($V_2$). In the period $[t_1,t_2]$ not crossing the threshold value ($V_{levelj}$), the display magnification use volume ($V_{display}$) becomes a mean value (mean($V_{receive}$)) of received volumes in this period. When the received volume ($V_{receive}$) crosses the lower limit threshold value ($V_{level3}$) at the time t2, it is judged that the audio has ended, and the attenuation rate is determined depending upon the speaking period ($V_{speak}$). In Case 2, the speaking period ($V_{speak}$) is long, therefore the attenuation is made fast.

By gently reducing the change of the screen with respect to the end of audio for a "supportive response", "answer", or other short audio, it becomes possible to reduce the visual impediment in the change of size of the screens.

Figure 68:
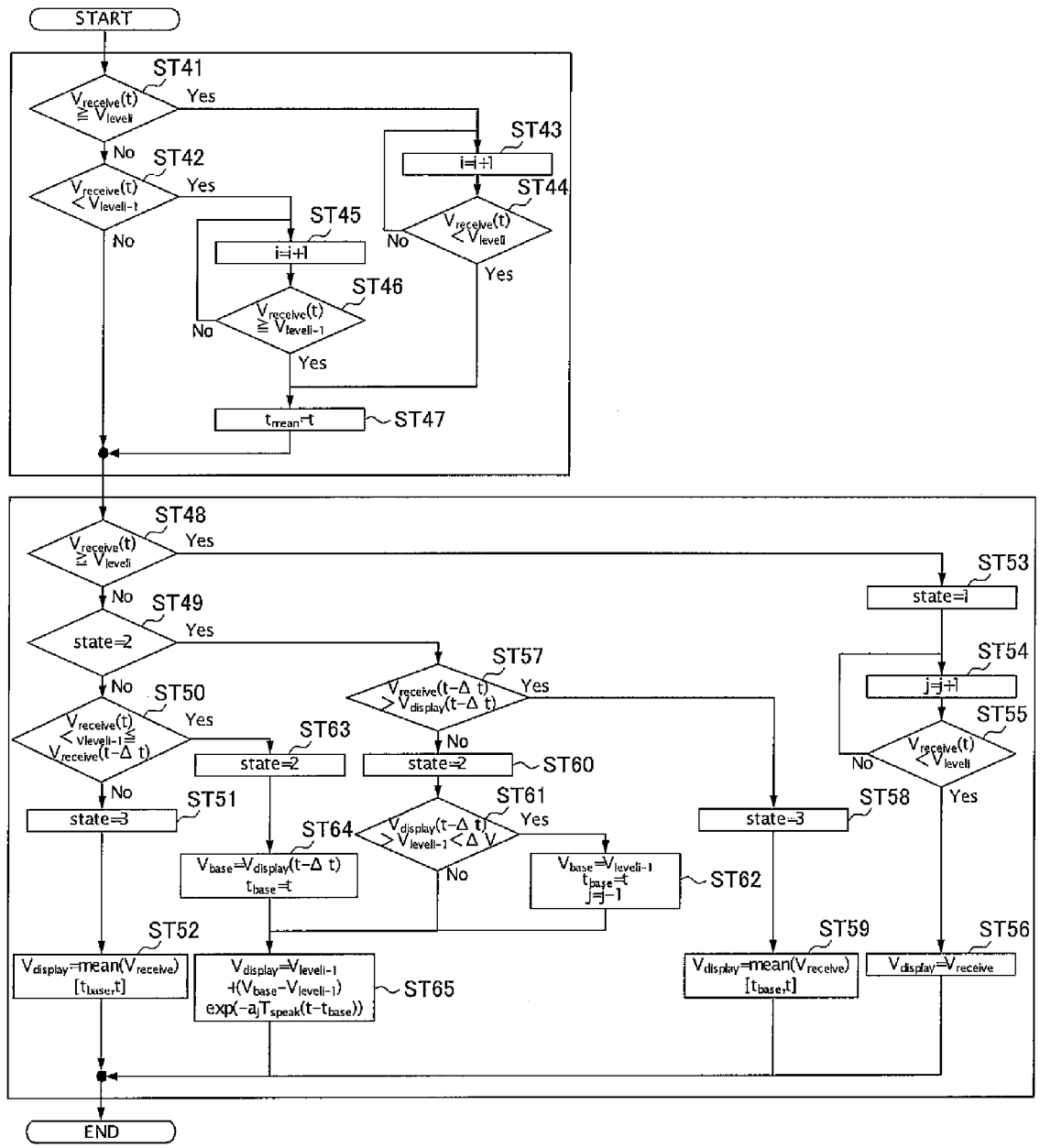
FIG. 68 is a flow chart showing a flow of the processing linked with FIG. 64 to FIG. 67.

FIG. 68 is a diagram showing a flow of the processing with reference to FIG. 64 to FIG. 67.

In this case, there are three states (state 1, state 2, and state 3).

State 1 is a rising state and a case where the received volume increases crossing the upper limit threshold value ($V_{levelj}$).

State 2 is a falling state and falling period and is a case where the received volume is reduced crossing the lower limit threshold value ($V_{levelj-1}$) and a case where the display magnification calculation use volume ($V_{display}$) is larger than the received volume ($V_{receive}$) in the state 2.

State 3 is a stable period and a case of a period where the upper/lower limit threshold values ($V_{levelj}, V_{levelj-1}$) are not crossed after the rising state and a period where the display magnification calculation use volume ($V_{display}$) becomes lower than the received volume in the state 2.

Calculation equations of the display magnification calculation use volume ($V_{display}$) in periods will be shown below. Note that the transitions in the states will be shown at steps ST40 to ST65 of the flow chart of FIG. 68.

[Equation 23]

Rising $V_{receive}(t) \geq V_{levelj} > V_{receive}(t - \Delta t))$ ( → state 1)

$V_{display} = V_{receive}$

Falling $V_{receive}(t) < V_{levelj-1} \leq V_{receive}(t - \Delta t))$ ( → state 2)

$V_{display} = V_{levelj-1} + (V_{base} - V_{levelj-1})\exp(-a_j T_{speak}(t - t_{base}))$ Falling ($V_{display}(t - \Delta t) \geq V_{receive}(t - \Delta t)$)(state 2 → state 2)

$V_{display} = V_{levelj-1} + (V_{base} - V_{levelj-1})\exp(-a_j T_{speak}(t - t_{base}))$ Stable (state 1 → state 3)

-continued $$V_{display} = \underset{t=[t_{mean},t_{now}]}{\text{mean}}(V_{receive}(t))$$

Stable $(V_{display}(t-\Delta t) < V_{receive}(t-\Delta t))$(state 2 → state 3)

$$V_{display} = \underset{t=[t_{mean},t_{now}]}{\text{mean}}(V_{receive}(t))$$

For each screen, the speaking period and silent period are measured, and the attenuation rate is changed based on the patterns of the speaking period and silent period in the past.

Specifically, a plurality of speaking periods is viewed in accordance with the length. For the speaking periods, the silent periods after that are measured, and the mean value of the silent periods in the speaking periods is calculated. When the mean silent period is short with respect to a parameter a in the attenuation equation of the display magnification calculation use volume ($V_{display}$) in the silent period after any speaking period, the parameter a is made small so as to make the attenuation rate slow.

Due to this, in a case of a person (screen) who continues speaking without interruption, it becomes possible to link to the next speaking period without much attenuation by not quickly attenuating in the silent period.

As explained above, according to the present sixth embodiment, the encoder 20 serving as the transmitting side has the function of generating corresponding instruction information, screen information, and volume information when there is a screen at the instructed position on the display screen and transmitting the same to the other parties in the communication. The decoder 30E has a function of displaying a multi-screen image and has a function of calculating the display magnifications of screens based on the line segments connecting screen centers, thicknesses of standard shapes, and magnitudes of audio, controlling the movement and new generation of screens based on these display magnification, and thereby optimally forming a plurality of screens on the display screen and analyzing array patterns of display areas on the display screen and switching arrays of patterns for stabilization, therefore sizes of screens can be adaptively changed in accordance with the magnitudes of volumes and the number of screens.

Further, there are the advantages that the movement of the screens becomes continuous, and it becomes possible to arrange screens with optimum sizes even when different in shapes.

Further, the locally stable state is eliminated.

Further, it becomes possible to set the size of a specific screen larger with priority.

Furthermore, it becomes possible to reduce the number of times of depression of a key for the screen selection.

Furthermore, with respect to a change of the received volume, when the received volume greatly increases, the screen immediately enlarges. The rate of reduction of the screen after the end of speech is inversely proportional to the length of the speaking period. The screen size becomes larger immediately in response to new speech, but is reduced in size slowly for short audio such as "supportive response" and "answer". Therefore, it becomes possible to eliminate the irritating changes in sizes of screens which enlargement/reduction of screens in a short period causes.

Seventh Embodiment

Figure 69:
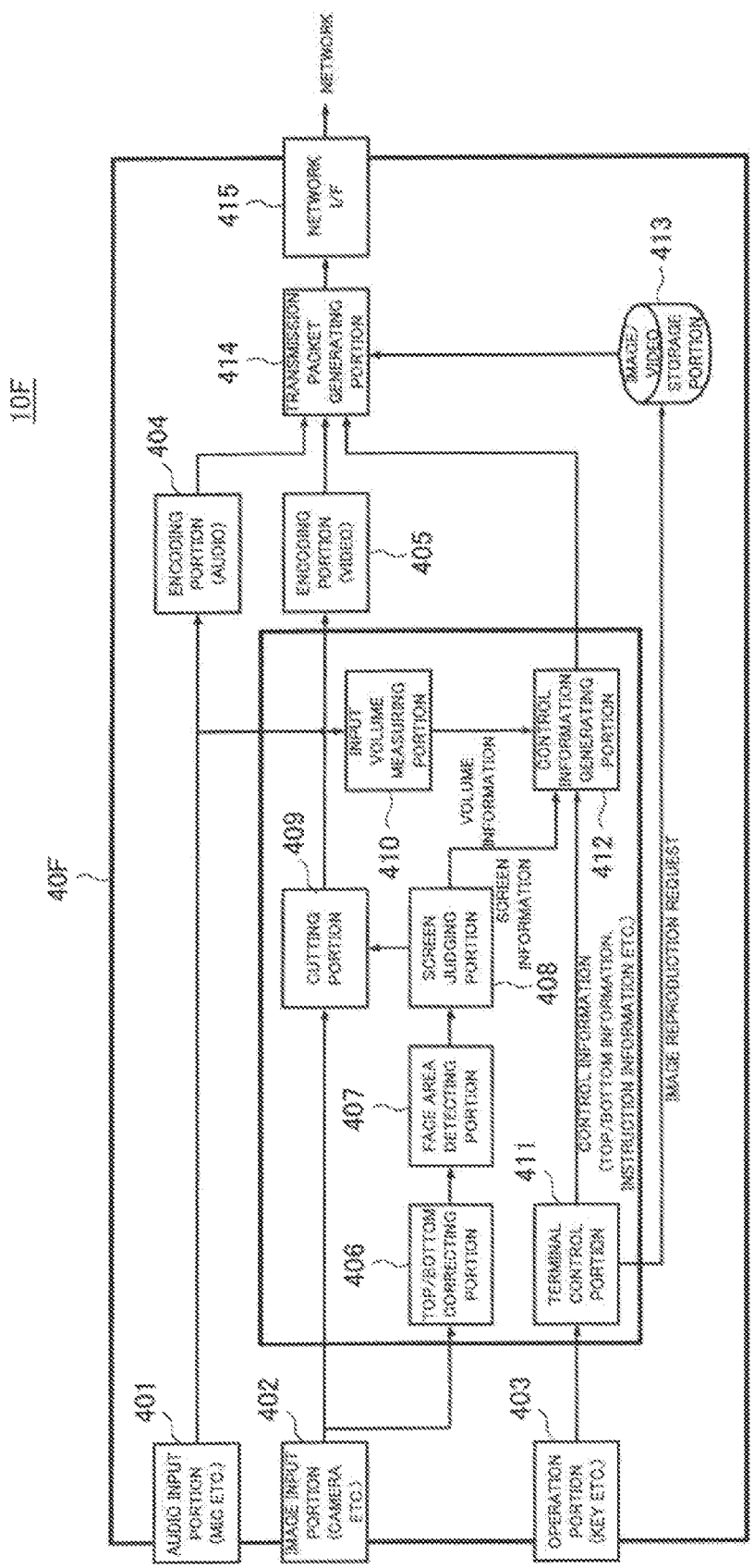
FIG. 69 is a diagram showing an example of the configuration of a mobile communication terminal according to a seventh embodiment of the present invention and a block diagram showing an encoder.
Figure 70:
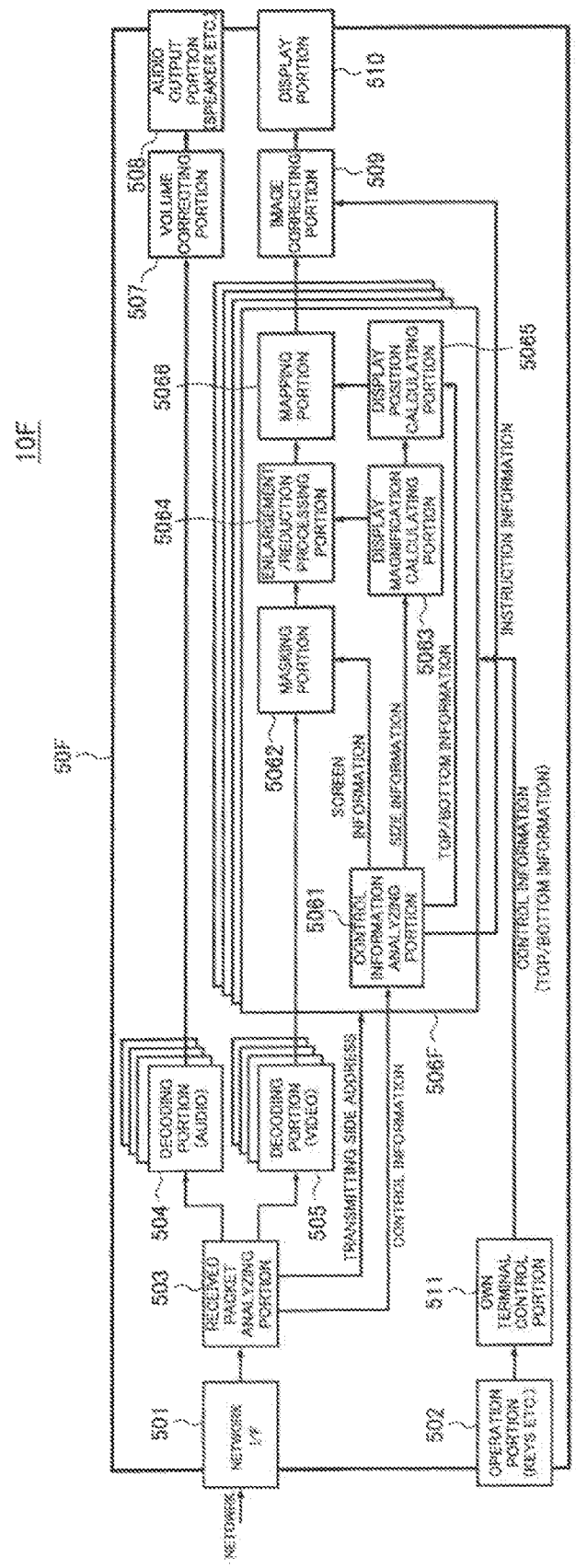
FIG. 70 is a diagram showing an example of the configuration of the mobile communication terminal according to the seventh embodiment of the present invention and a block diagram showing a decoder.

FIG. 69 and FIG. 70 are diagrams showing an example of the configuration of a mobile communication terminal according to a seventh embodiment of the present invention, in which FIG. 69 is a block diagram showing an encoder, and FIG. 70 is a block diagram showing a decoder.

A basic block configuration of an encoder 40F in a mobile communication terminal 10F according to the present seventh embodiment is the same as the configuration of FIG. 17 explained in the second embodiment, while the basic block configuration of a decoder 50F is the same as the configurations of FIG. 18 and FIG. 32 explained in the second embodiment.

The mobile communication terminal 10F according to the present seventh embodiment has, in addition to the functions in the second embodiment, third embodiment, etc., a function of adding communication information formed by another session from the same terminal as lower information of the same terminal, judging, as a display area size for displaying an image, a display area concerned with the information positioned the lowest as the display area to be noted, and controlling it to the corresponding display area.

As explained above, when for example a photographer at the transmitting side changes an object captured by panning the camera, he does this to show the object to the other parties on the receiving side. At that time, the photographer is not always speaking. Therefore, after panning, he has to say something. For example, where he is sending an image in order to make the user select what he should purchase, the photographer cannot constantly be speaking.

However, the received image itself must be a screen having a size large enough to be constantly viewed during sending.

Further, a file sent during conversation is a file which should be noted during that conversation. The screen must have a size that enables the displayed and reproduced content to be viewed.

In conventional connection, when shifting from a conversion among two persons to a conversation among three persons, a terminal connected to two changes the media connected to two and operates as a media mixing terminal. The screens are controlled by the terminal performing the media mixing.

That is, control is not possible at a terminal displaying the screens. In this case, when performing synchronous reproduction of files (images, audio) and web access together, the media has to be changed matching with that on each occasion.

Therefore, the present seventh embodiment realizes a mobile communication terminal able to adaptively and optimally update sizes and positions of display image areas (screens) in accordance with magnitudes of volumes, the number of display image areas to be displayed (screens), and other situations without any operation by the user and in addition making the rearrangement (movement) of display image areas continuous, able to immediately show images large on the receiving side, and capable of reproducing images at the same timing on the transmitting side and the receiving side.

The encoder 40F of FIG. 69 has a microphone or other audio input portion 401, a digital camera or other image input portion 402, an operation portion 403 enabling key input etc., an audio encoding portion 404 for encoding the audio data input by the audio input portion 401, an image encoding portion 405 for encoding the image data input from the image input portion 402 and cut to a predetermined area, a top/bottom correcting portion 406 for correcting the top/bottom of the captured image so as to coincide with the top/bottom of the screen (terminal screen) of the display portion on the receiving side based on the top/bottom information linked with the captured image, a face area detecting portion 407 for detecting and extracting the area of a face from a captured image, a screen judging portion 408 for judging a used screen (display image area to be displayed) based on the face area detected at the face area detecting portion 407 and generating screen information, a cutting portion 409 for cutting the corresponding area from the received image based on the judgment of the screen judging portion 408, an input volume measuring portion 410 for measuring the input volume by the audio input portion 401 and generating volume information, a terminal control portion 411 for controlling the terminal based on the input information of the operation portion 403, a control information generating portion 412 for generating control information including the instruction information, top/bottom information, screen information, volume information, etc. based on the instruction of the terminal control portion 411, a storage portion 413 for storing images and/or video, a transmission packet generating portion 414 for generating the encoded audio data and image data, control information, and image/video data read out from the storage portion 413 based on the instruction of the terminal control portion 411 as transmission packets, and a network interface (I/F) 415 able to wirelessly communicate with the network and transmitting the generated transmission packets via the network to the terminals of the other parties in communication or server.

The decoder 50F of FIG. 70 has a network interface (I/F) 501 able to perform wireless communications with the network and receiving packets including audio data, image (video) data, control information and instruction information, screen information, volume information, etc. transmitted from the transmitting side, an operation portion 502 enabling key input etc., a received packet analyzing portion 503 for analyzing packets received at the network interface 501 and extracting the audio data, image data, transmitting side address, and control information (top/bottom information and instruction information etc.), an audio decoding portion 504 for decoding the audio data extracted by the received packet analyzing portion 503, a video decoding portion 505 for decoding the image data extracted by the received packet analyzing portion 503, a display image control portion 506F for controlling the sizes and display modes of the screens to be displayed (display windows) based on the video data decoded by the video decoding portion 505, transmitting side address, control information, screen information, size information, and top/bottom information, a volume correcting portion 507 for correcting the volume of the audio decoded by the audio decoding portion 504, a speaker or other audio output portion 508 for generating sound with a volume corrected by the volume correcting portion 507, an image correcting portion 509 for correcting an image controlled in size and display mode by the display image control portion 506F, an LCD or other display portion (image output portion) 510 for displaying an image via the image correcting portion 509, and an own terminal control portion 511 for giving control information (top/bottom information) to the display image control portion 506F based on the input information from the operation portion 502.

Note that the encoder 40F and decoder 50F can share the operation portions 403 and 502, network interfaces 415 and 501, terminal control portion 411, and own terminal control portion 511.

Below, the more concrete configuration and functions of the display image control portion 506F characterizing the present seventh embodiment and concrete examples of the display modes of the screens will be explained in sequence.

The display image control portion 506F of FIG. 70 has a control information analyzing portion 5061 for extracting the screen information, size information, top/bottom information, and instruction information based on the control information supplied from the received packet analyzing portion 503, a masking portion 5062 for masking the video decoded at the video decoding portion 505 based on the screen information, a display magnification calculating and judging portion 5063 for calculating display magnifications of screens to be displayed (display image areas) based on the size information and screen information, a reducing/enlarging portion 5064 for reducing/enlarging images after the masking according to the display magnifications calculated at the display magnification calculating and judeging portion 5063, a display position calculating portion 5065 for calculating display positions according to the display magnifications calculated at the display magnification calculating and judging portion 5063 and the top/bottom information, and a mapping portion 5066 for mapping images obtained at the reducing/enlarging portion 5064 at positions on the display portion 510 obtained at the display position calculating portion 5065.

The display image control portion 506F of the present embodiment has a vibrating state judgment function judging whether or not one or more screens are in a continuously moving state in local regions.

This vibrating state judgment function judges that the screens are in a vibrating state in a case where, in a constant period (n), there is no change in the number of screens, there is no change of magnitude of audio of the screens, and further there is a change of the positions of the screens, the change is a threshold value (Pthresh0) or less, and the change of the display magnification of the screens is a threshold value (Rthresh0) or less, and fixes, in the vibrating state, the screens at an array where the squares sum value (R) of display magnifications during the above period is the largest.

Further, the display image control portion 506F of the present embodiment has a stable state judgment function of judging whether or not the screens are in the stable state.

This stable state judgment function judges that the screens are in the stable state in a case where, in a constant period (m), there is no change in the number of screens, there is no change of magnitude of audio of the screens, and further the change of the positions of the screens is a threshold value (Pthresh1) or less, and the change of the display magnifications of the screens is a threshold value (Rthresh1) or less.

Further, the stable state judgment function judges that the screens are in the locally stable state in a case where, in the constant period, there is no change of the number of screens, no change of magnitude of audio of the screens, and further the change of the positions of the screens is a threshold value (Pthresh1) or less and the change of the squares sum ratio of the display magnifications of the screens is a threshold value (Rthresh2) or less.

Further, the display image control portion 506F of the present embodiment has a stirring processing function of promoting the rearrangement of the positions of the screens in the case where the screens are judged stable by the stable state judgment function.

This stirring processing function perform stirring by arranging provisional centers on the display screen, setting the position giving the smallest value, not selected previously, of the display magnifications at the centers as the center of the screen for stirring, and generating, updating, and erasing the screen for stirring over the constant period for stirring.

Where a number of times (S) of execution of the stirring processing exceeds a threshold value (Sthresh), it is judged that the screens are in the stable state, and the stirring processing is stopped.

The screens controlled in size and display mode by the display image control portion 506F of the present seventh embodiment are displayed as a multi-screen image displaying a plurality of screens on one display screen.

The display control of a multi-screen image making mainly the processing of the display magnification calculation and judging portion 5063 and display position calculating portion 5065 of the display image control portion 506F of the present seventh embodiment is similar to the display control explained in connection with FIG. 19 to FIG. 26 etc. in the second embodiment, therefore an explanation thereof is omitted here.

Next, although there are portions overlapping the embodiments explained before, examples of the display modes in the present seventh embodiment will be explained.

Figure 71:
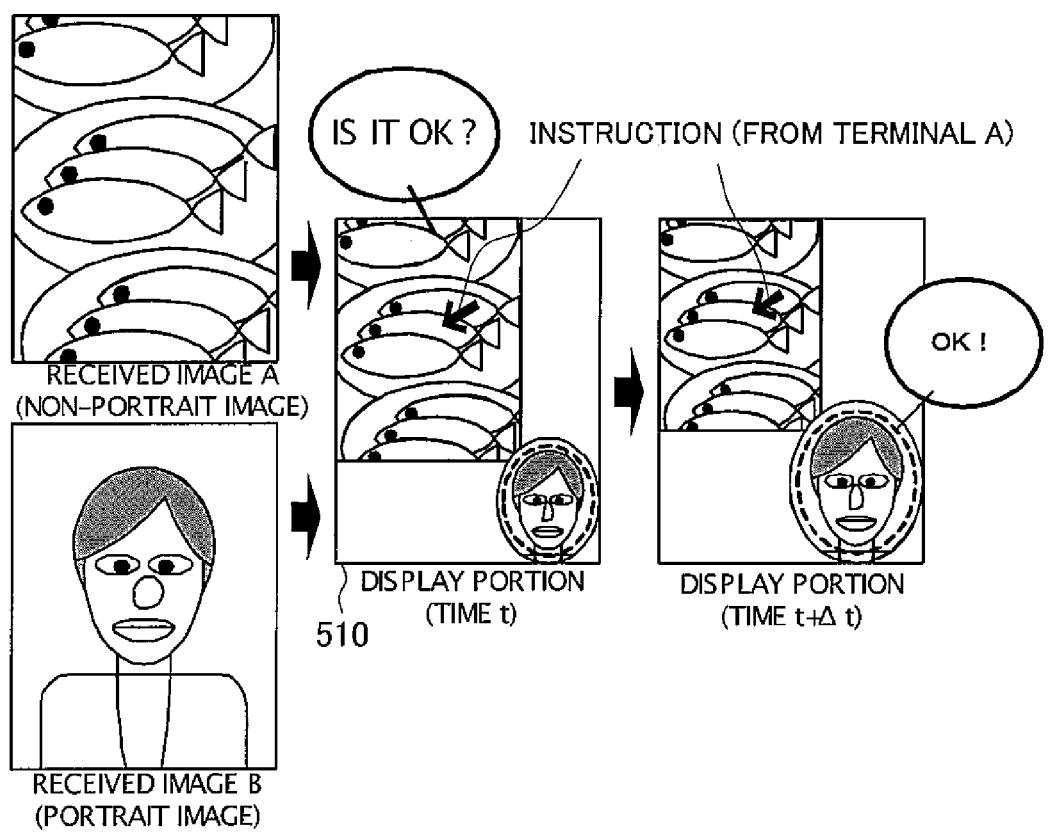
FIG. 71 is a diagram for explaining screen display control in the seventh embodiment and an explanatory diagram of processing in accordance with the surface area of a face area.

As shown in FIG. 71, when the surface area of the face area is a constant value or more, the received image is judged as a "portrait image". When the surface area of the face area is less than the constant value, the received image is judged as a "non-portrait image".

When it is judged as a "portrait image", it is made a circular screen. When it is judged as a "non-portrait image", it is made a rectangular screen. Even in the case of a "non-portrait image", the display size changes in accordance with the sound pressure from the same transmitting side.

Figure 72:
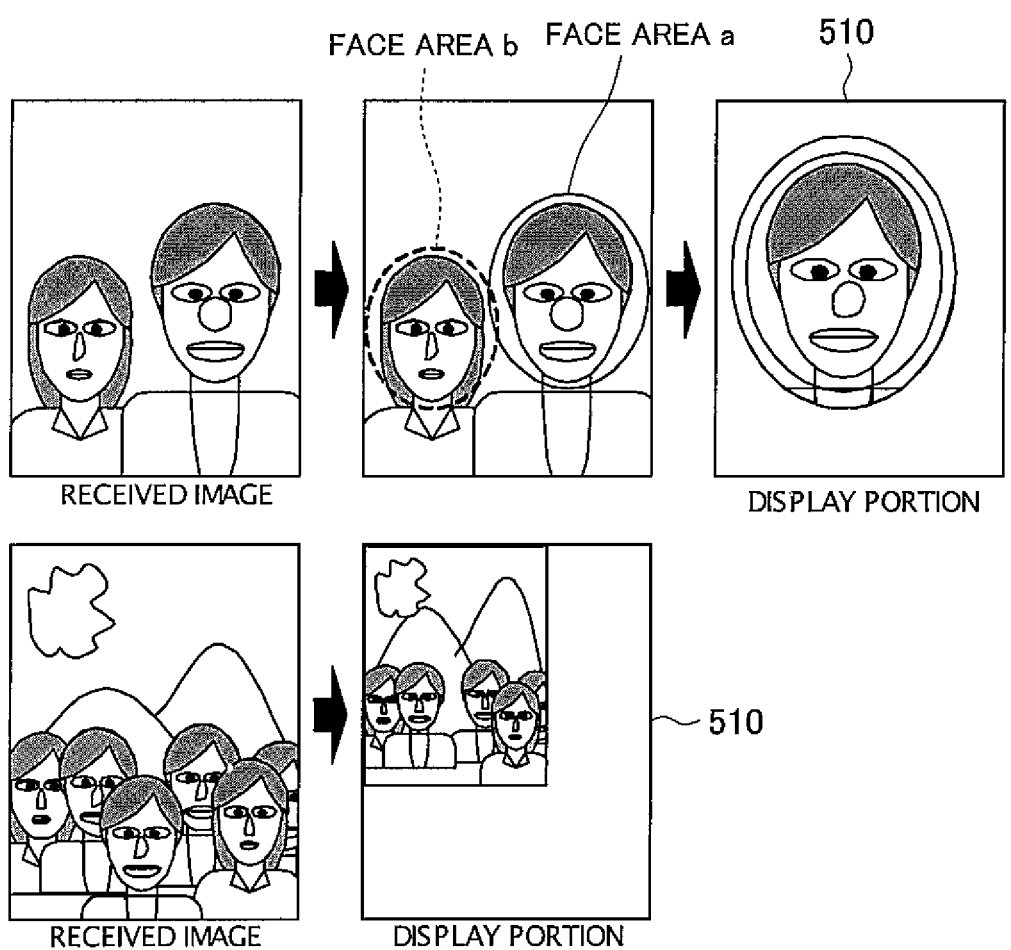
FIG. 72 is a diagram for explaining screen display control in the seventh embodiment and an explanatory diagram of processing for handling the case where there is a plurality of face-judged areas.

As shown in FIG. 72, when there are a plurality of areas judged as faces, priority is given to the larger surface areas when the number is a constant value or less.

When the number is a constant value or more, the screen is displayed by a rectangular display screen in the same way as a non-portrait image.

Figure 73:
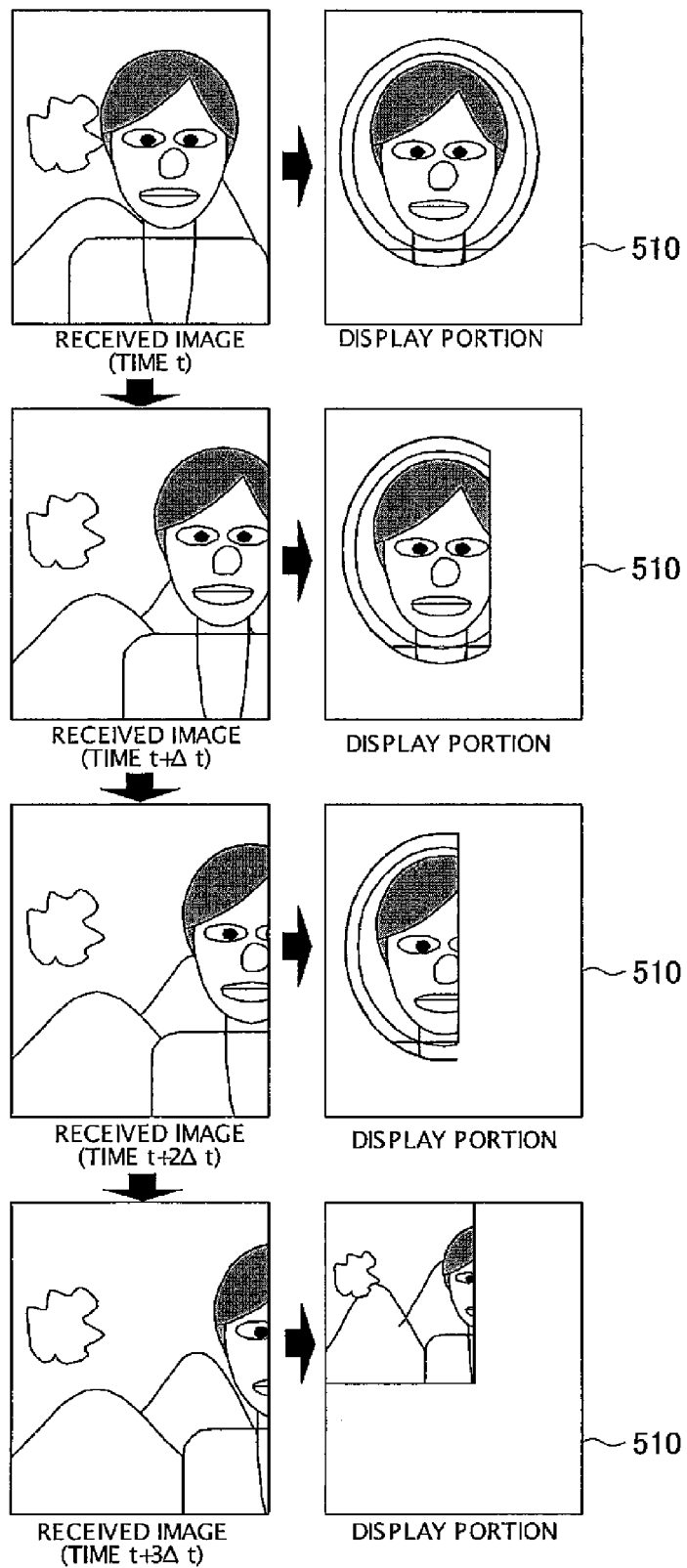
FIG. 73 is a diagram for explaining screen display control in the seventh embodiment and an explanatory diagram of the processing for handling a case where a cut out area sticks out from the received image.

As shown in FIG. 73, when a face is outside of (sticks out from) the received image, the area which can be cut is estimated from the motion vector and the cutting area becomes just the part visible from the circular display screen (window).

When the ratio of the face image remaining on the display screen with respect to the size of the estimated face area becomes a constant value or less, that face is judged out of bounds.

Next, the multi-point communication processing using the mobile communication terminal 10F having the above functions will be explained.

In the present seventh embodiment, as the communication information, another session from the same terminal is added as lower information of the same terminal. As the screen size, the screen concerned with the information positioned the lowest (added finally) is judged as the screen to be noted and given a corresponding screen size. The other screens are minimized.

For file display and reproduction, when the transmitting side requests synchronous reproduction, the same file is transferred and the information of the reproduction start time is transmitted. The transmitting side and receiving side reproduce the file according to the reproduction start time.

The presence/absence of streaming transmission of an image captured by the camera is displayed based on the activation (or other operation) of the camera at the time of the conversation. When the operator permits it, a reproduction request of streaming is transmitted to the other party in conversation at present. When the receiving side permits the reproduction, the streaming distribution is started based on this, the receiving side generates a new screen, and the reception streaming is reproduced.

Further, in a case where a still image is captured by a camera at the time of the conversation, the presence/absence of transmission of the still image is displayed. When the operator permits it, a reproduction request of the image is transmitted to the other party in conversation at present.

When the receiving side permits the reproduction, the image is transmitted based on this, and the receiving side generates a new screen and reproduces the received image.

When the reproduction screen is closed on the transmitting side, this fact is transmitted to the receiving side, screen reproducing information corresponding to the closed screen is closed, and the corresponding information is deleted.

In a case where both groups of a first group simultaneously speaking with a number (number of persons N (N≧1)) of terminals and a second group simultaneously speaking with a number (number of persons M (M≧1)) of terminals are regarded as one group at a terminal connected to the two, a call reception request formed by transmitting side information (phone number, IP address, MAC address, and other identifier etc. able to identify a terminal), authentication key, and encryption key is transmitted to one group, a call request formed by destination side information (phone number, IP address, MAC address, and other identifier etc. able to identify a terminal), authentication key, and encryption key is transmitted to the other group, a terminal receiving the call request makes a call based on the information described in the call request, and a terminal receiving the call reception request judges if the call reception matches with the information (transmitting side information, authentication key, encryption key) described in the call reception request and, when they coincide, performs the connection.

Further, on the display screen, screens belonging to the same simultaneous conversation group are given the same screen outer frame color and same frame wideness.

When a call is received, an image corresponding to the number of the other party in the call is read out from the memory and newly generated on the screen. The screen changes in the color of the outer frame to the color assigned for call reception, the outer frame vibrates to large or small, and the color is changed in density (or blinks).

The size of the screen for displaying an image captured by the camera of one's own terminal is made a constant size without depending upon the audio input by the microphone of the terminal. The outer frame of the screen is treated equivalent to the walls of the outer frame of the display screen in computation of behavior of the other screens.

Further, the color of the outer frame of the screen transmitting audio acquired by the microphone of one's own terminal is made dark, while the color of the outer frames of the screens not transmitting audio is made light (or the wideness is changed).

The encoding rate of the transmitted image is controlled based on the screen size of the receiving side the previous time.

Further, the image is encoded matching with the size having the largest rate of area occupied with respect to the screen in accordance with the screen size on the receiving side receiving and reproducing the same image and everything (I pictures, P picture, and B picture) is transmitted. For smaller sizes, the I picture and P picture excluding the B picture are transmitted from the encoded data.

Further, for a still smaller size, only the I picture excluding the P picture and B picture from the encoded data are transmitted. For a still smaller size, data obtained by excluding the P picture and B picture from the encoded data and thinning out the I picture is transmitted.

Further, in a case where the screen sizes are in a range not generating noise giving a visually uncomfortable feeling (for example, a surface area ratio of 2 times or less), they are handled as the same size.

The change of the encoding size along with the change of the screen size is handled in units of I pictures.

Along with the change of the screen size, for the change of the encoding size, the prediction image is subjected to up sampling (or down sampling) to the present size and interframe prediction is carried out. On the receiving side, the prediction image is subjected to up sampling (or down sampling) in the same way, and decoded.

The multi-point communication processing using the mobile communication terminal 10F having the above functions will be concretely explained with reference to FIG. 74 to FIG. 78.

Figure 74:
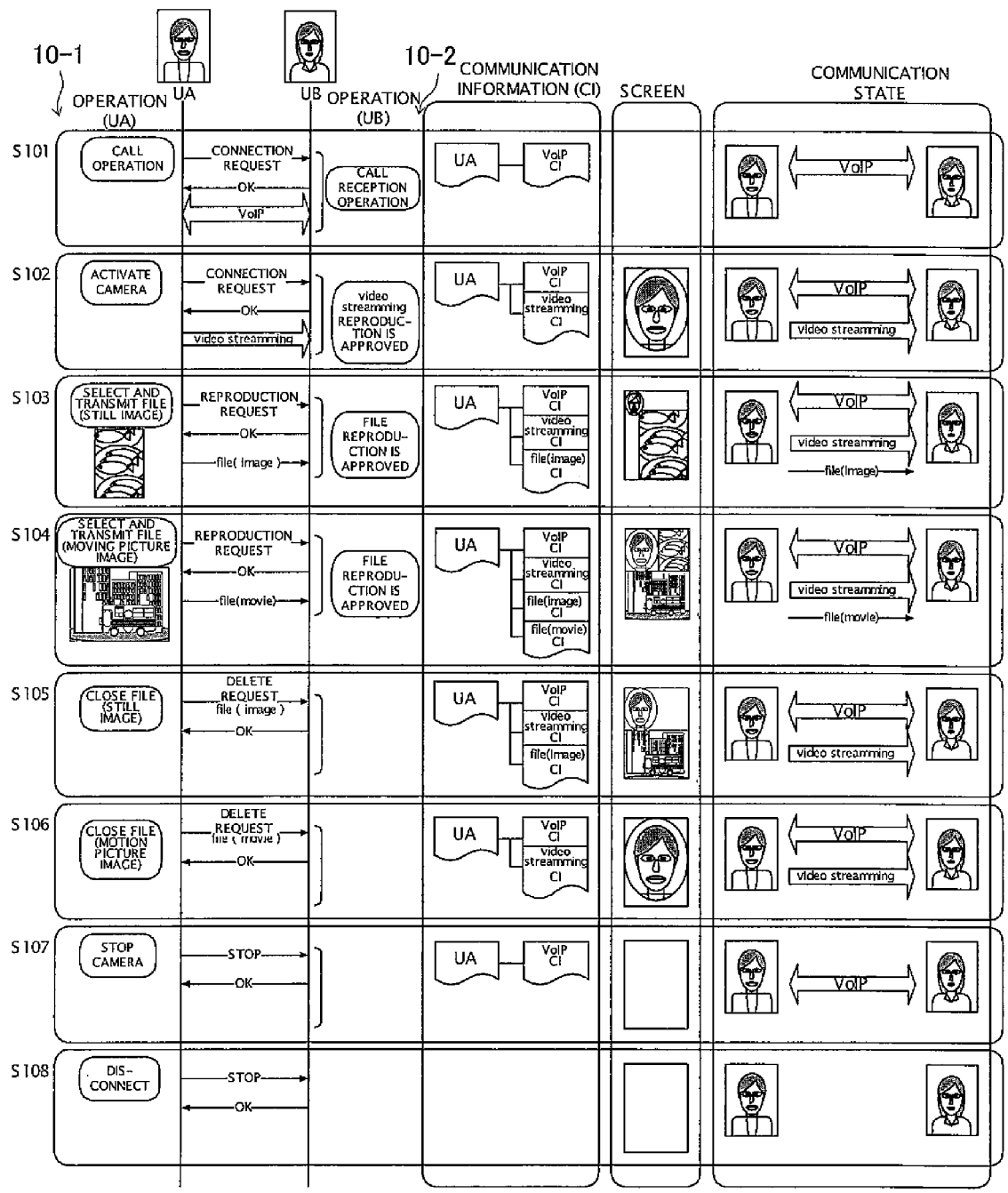
FIG. 74 is a diagram showing an example of basic communication processing according to the seventh embodiment.

FIG. 74 is a diagram showing an example of the basic communication processing according to the present embodiment (S101 to S108).

In the present embodiment, as explained before, as the communication information, another session from the same terminal is accompanied as the lower information of the same terminal. The screen concerned with the information positioned the lowest (added finally) is controlled as the screen to be noted, and the other screens are minimized in size.

For the file reproduction, when (synchronous) reproduction is requested on the transmitting side, the same file is transferred. In order to synchronize the reproduction timing, when transmitting a size of data enabling reproduction, the information of the reproduction start time is transmitted. On the transmitting side and receiving side, the reproduction is started according to the above reproduction start time.

When the reproduction screen is closed on the transmitting side, the reproduction screen is closed on the receiving side as well. The memory secured as the communication information is opened.

When the transmitting side and receiving side stop reproduction, information indicating this is transmitted to the other terminals starting reproduction screens in the same way. The terminals receiving the above information display stop messages on the reproduction screens, then stop the reproduction.

At the time of the start of conversation, the audio conversation (VoIP) is performed as the base and the image captured from the camera is transmitted as another session based on the operation of the terminal.

Accompanying the phone number or address (identifier for specifying the other party in the conversation), at the time of the activation, the information of the activation of the camera and whether or not a session for the transmission of the captured image is to be attached is simultaneously stored. The processing of the image transmission at the time of the conversation is carried out based on the above information.

When the file is a file of music etc., an application for reproduction is displayed in the screen. The screen size does not depend upon the volume.

Figure 75:
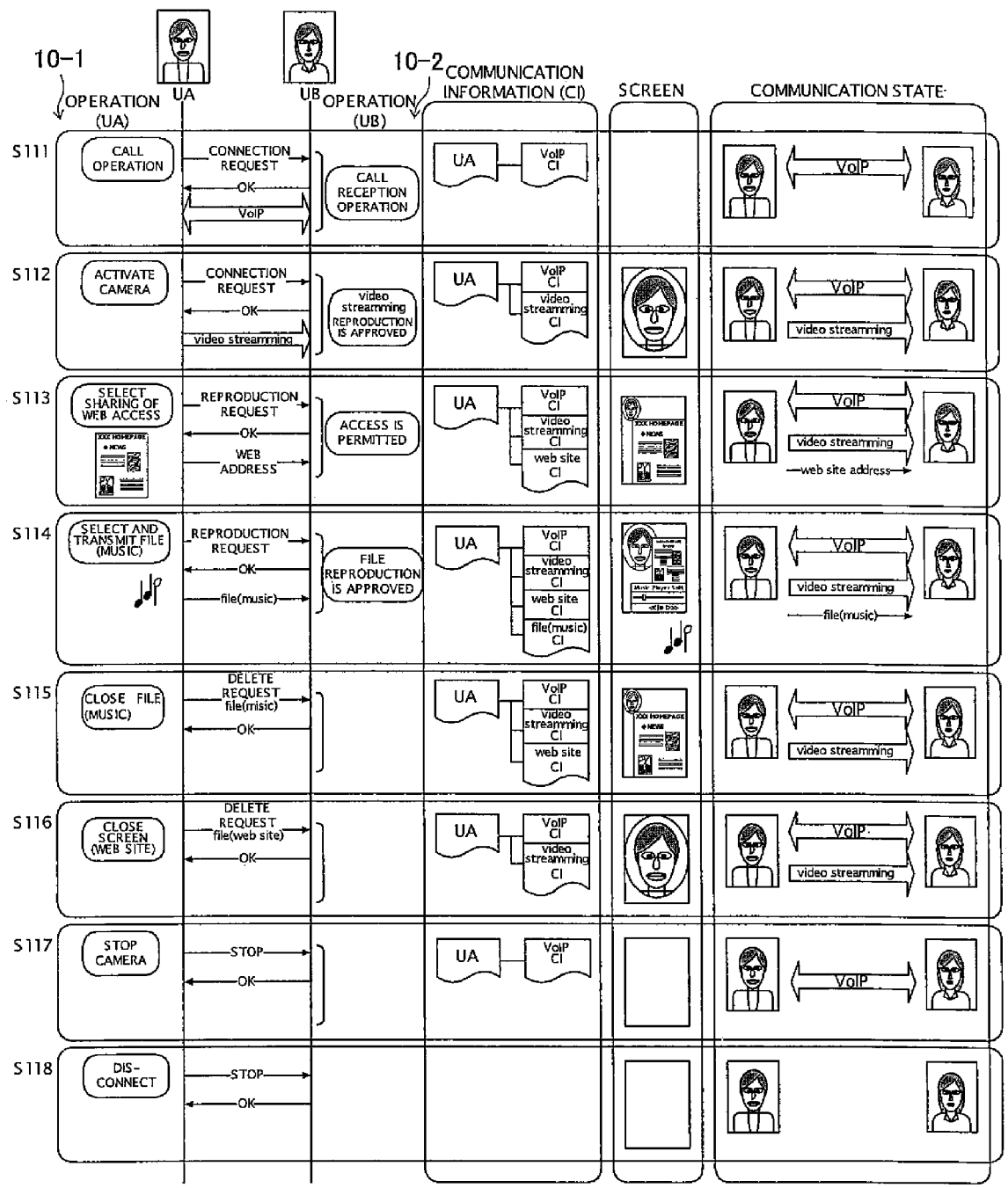
FIG. 75 is a diagram showing an example of the communication processing when opening up a web site.

FIG. 75 is a diagram showing an example of the communication processing when the web site is opened (S111 to S118).

When opening a web site, when selecting sharing (or transmission), the address of the web site is transmitted.

At the receiving side, when receiving the web site, the information for accessing the web site is connected as attachment information of the same session, and the accessed web site is displayed on a new screen. When it is the finally attached information, the size of the screen for displaying the web site is set to a size linked with the audio ratio. The other screens are reduced to the minimum size.

When a sound file is to be transmitted, the sound file and reproduction timing are transmitted, and the sound file is reproduced on the transmitting side and receiving side matching with the above reproduction timing (when synchronous reproduction is requested).

On the receiving side, when there is no attachment information with respect to the sound file such as an image, information, etc. to be displayed, reproduction use software is displayed on a new screen with a size which can be operated on. The other screens are reduced to the minimum size.

Figure 76:
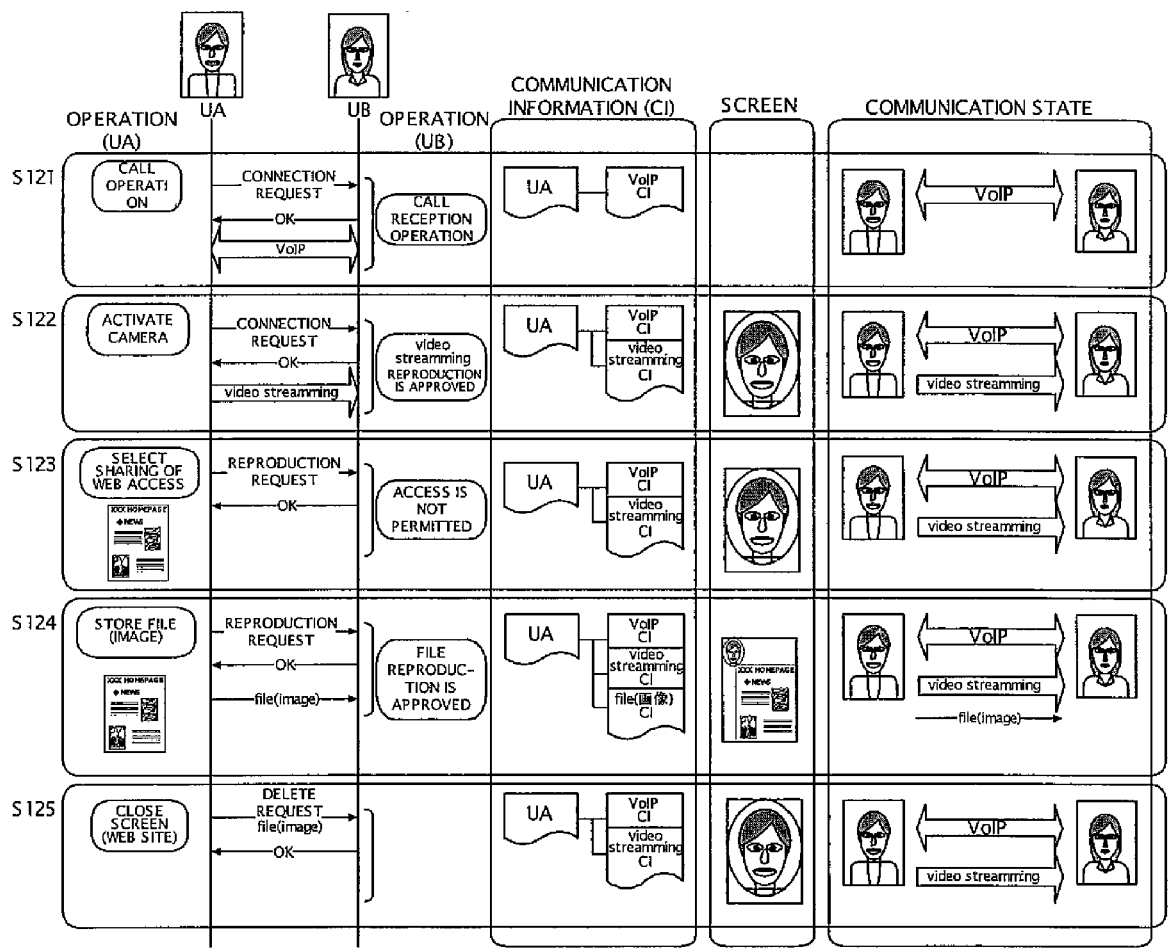
FIG. 76 is a diagram showing an example of the communication processing when the receiving side rejects transmission of an address of a web site.

FIG. 76 is a diagram showing an example of the communication processing in a case where the receiving side rejects the transmission of the address of the web site (S121 to S125).

When the receiving side rejects the transmission of the address of the web site, the transmitting side stores the web site in display at present and tries the transmission as an image again.

When the receiving side permits the image reception, the image is transmitted, and the image is reproduced on a new screen on the receiving side.

Note that, for the transmission and reception of an image file, audio file, web site, etc., by previously confirming the address of the transmitting side, confirming the connection port along with that, and switching the authentication key, encryption key, etc. by the reproduction request, reproduction of a file (including streaming etc.) and web site transmitted from an unrelated terminal is blocked.

Due to this, it becomes possible to block information distribution of advertisements, solicitations, etc. from a related terminal to many unspecified terminals. Further, it becomes possible to prevent the reception of information believed unnecessary by enabling the rejection of a transmission request even for the other party in the middle of audio conversation.

Note that it becomes possible to control the screen size as well by selectively selecting the screen on the transmitting side and receiving side.

Figure 77:
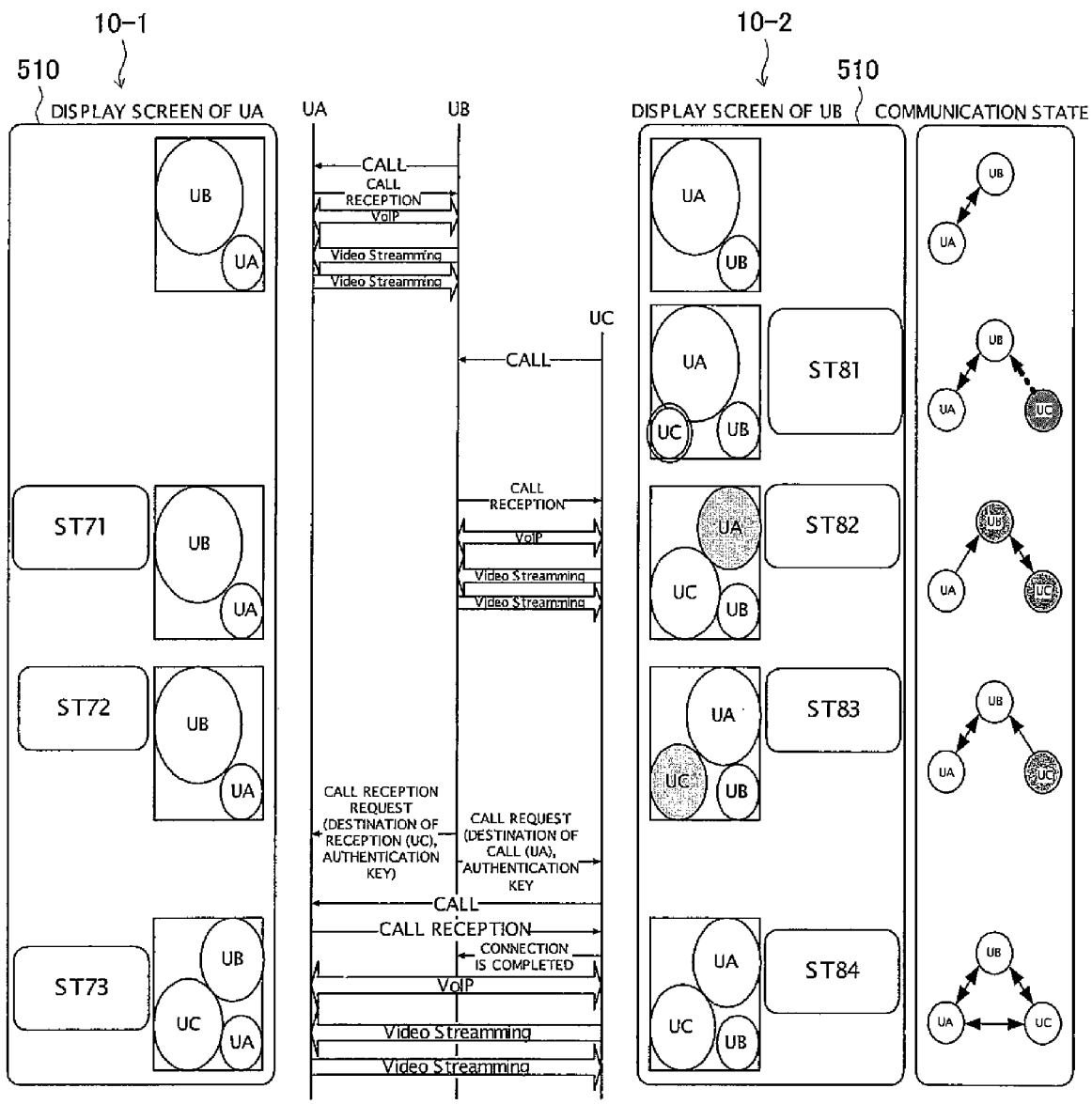
FIG. 77 is a diagram showing an example of a mode of display of screens at the time of communication processing.

FIG. 77 is a diagram showing an example of the display modes of screens at the time of the communication processing.

The colors of the outer frames of screens belonging to a group speaking together are made the same.

In the case of different groups, the colors of the outer frames of the screens are basically made different.

In a case of a group not sending audio, the outer frames of the screens belonging to that group are given a color different from the usual one (for example given a light color) or a different wideness so that it can clearly seen that the group is not transmitting audio.

Further, the images in these screens are changed, for example, the color is lightened or images are misted over.

When a call is received, the screen is changed so that the reception is clearly seen. For example, the size of the screen is vibrated to large or small, or the color of the outer frame is made to blink.

A third party can participate in the conversation by operation from a terminal communicating with the other two terminals. A call reception request (identifier for identifying the calling side and authentication key) is transmitted to the already existing group and, at the same time, a calling request (identifier for identifying the destination of the call and authentication key) is transmitted to the newly participating terminal.

The newly participating terminal sends call to the described destinations of the call according to the calling request. The already existing terminals receive the call from the new terminal and connect when the authentication key coincides.

When the authentication key differs, the terminals immediately disconnect. When the connection is completed, terminals completing connection judge the new terminal as finished joining based on the information of connection completion from the new participating terminal. Note that, in the already existing terminals, the participation in the same group is completed based on the authentication key in the call reception operation described before.

When displaying an image captured by the camera of one's own terminal on the display screen, the size of the screen is made a constant size without depending upon the audio. Note that the color and wideness of the outer frame of the screen are set so that it is clearly seen that the image is the image of one's own terminal. Further, in computation of the size of the other screens, the outer frame of the screen is handled in the same way as the walls.

Note that, in FIG. 77, at step ST71 on a terminal 10-1 side, the audio is transmitted to a user UB. The audio is not sent from UB.

At step ST72, the audio is transmitted to the user UB. In this case, the audio is sent from UB.

At step ST73, the frame colors of screens belonging to the same group are made the same. In this case, audio is transmitted to the users UB and UC.

At step ST81 on a terminal 10-2 side, when a call is received, the related image is read out from the telephone book, and a screen is generated. The screen blinks or the size of the frame vibrates to large or small. For the screen frame, use is made of a color different from the color of the group in the conversation.

At step ST82, the frame color of the screens of the other parties in the conversation not transmitting audio is made light, and a gain of luminance is made strong for the image in the screen. In this case, audio is transmitted to only a user UA.

At step ST83, the frame color of the screens of the other parties in the conversation not transmitting audio is made light, and a gain of luminance is made strong for the image in the screen. In this case as well, audio is transmitted to only the user UA.

At step ST84, frame colors of screens of the same group are made the same. In this case, the audio is transmitted to the users UB and UC.

FIG. 78 is a diagram showing an example of the communication processing for controlling the encoding ratio of the transmitted image based on the screen size information on the receiving side the previous time.

By controlling the encoding ratio of the transmitted image based on the screen size information on the receiving side the previous time, the sum of the amounts of coding received at the reception terminals is prevented from becoming remarkably large.

Sizes are classified into two or more sizes in accordance with the screen sizes on the receiving side. The encoding is carried out matching with the largest size among the sizes. For a smaller size, the encoded data is transmitted after thinning.

For example, for the largest size among the sizes, all of the I picture (intra-frame encoding), P picture (inter-frame forward direction predictive encoding), and B picture (inter-frame bidirectional predictive encoding) are transmitted.

Contrary to this, by thinning the B picture for one size smaller than this and thinning the B picture and P picture for a further smaller size, the amount of transmitted codes is reduced. Further, for the size of the image to be encoded, by not matching with the maximum size of the screen on the receiving side, but by up sampling the maximum size, the size is suppressed to one that can be visually interpolated by the screen having the maximum size (for example, by suppressing the up sampling to not more than 2 times the surface area ratio, it is possible to reduce aliasing by up sampling).

In actuality, when sending a face image, by encoding only the area of the face in the entire captured image, it becomes possible to raise the encoding efficiency by reducing the unrequired area in the transmission such as the background.

In other words, in the image to be encoded, the face becomes large, and the background having large change becomes small, whereby high frequency components increasing the amount of coding are reduced, and as a result, it becomes possible to reduce the amount of coding.

As a result, it is possible to generate encoded data to be transmitted to individual terminals without increasing the load of the encoding on the transmitting side and, at the same time, it becomes possible to suppress the increase of the capacity of encoded data received at individual terminals and reduce the increase of the load upon the network.

FIG. 78(1) shows a state where the user of the user terminal UA is solely talking, and screen sizes of the user terminal UA in the user terminals UB and UC are large to the same extent.

For this reason, the user terminal UA transmits the encoded image matching with this size.

Contrary to this, in contrast to the fact that the screen of the user terminal UB has a medium size in the user terminal UA, it is very small in the user terminal UC. For this reason, the encoded data is transmitted as the image data for the user terminal UA and the image data for the user terminal UC. The image data for the user terminal UA is larger, therefore the encoding is carried out matching with this. With respect to the user terminal UC, the encoded data of only the I picture (or further the I picture is thinned as well) is transmitted.

In the case of FIG. 78(3), when it is judged that no discomfort (due to noise) visually occurs even in reproduction by up sampling the screen size of the user terminal UA in the user terminals UB and UC, the encoded data is transmitted matching with the smaller size.

In the same way, at the screen size of the user terminal UC in the user terminals UA and UB as well, when it is judged that no discomfort (due to noise) visually occurs even in reproduction by up sampling, the encoded data is transmitted matching with the smaller size in the same way as above.

When sizes of reproduction screens are within a range where a difference can be absorbed by up sampling (ex. within 2 times surface area ratio), these sizes are defined as the same size, and the encoding processing is carried out matching with the smaller screen size.

Corresponding to the encoding scheme along with the change of the screen size, the screen size is changed in units of I pictures (intra-frame encoding).

Further, when there is a change of screen size in the P pictures (inter-frame forward directional predictive encoding), the prediction image is up sampled or down sampled matching with the size changed image, and the inter-frame predictive processing is carried out between these. On the receiving side, in the same way, the prediction image is up sampled or down sampled and decoded.

As explained above, according to the present seventh embodiment, the encoder 40F serving as the transmitting side has the function of generating the corresponding instruction information, screen information, and volume information when there is a screen at the instructed position on the display screen and transmitting the same to the other parties in the communications, while the decoder 50F has the function of displaying a multi-screen image and has the function of calculating display magnifications of screens based on the line segments connecting screen centers, thicknesses of standard shapes, and magnitudes of audio and controlling the movement and new generation of screens based on these display magnifications to thereby optimally form a plurality of screens on the display screen, adding, as communication information, another session from the same terminal as the lower information of the same terminal, judging, as the display area size for displaying the image, the display area concerned with the information positioned the lowest as the display area to be noted, and controlling the same to the corresponding display area, therefore sizes of screens can be adaptively changed in accordance with the magnitudes of volumes and the number of screens.

Further, there are the advantages that the movement of the screens becomes continuous and it becomes possible to arrange screens with optimum sizes even when they have different shapes.

Further, when the sender transmits an image file that he wants to show, it becomes possible to immediately show that image (screen size) large on the receiving side without adding any new operation by the sender and without the sender saying anything.

Further, by transmitting the information of the reproduction start time together with the file, it becomes possible to reproduce the same on the transmitting side and receiving side at the same timing.

In the case of two persons to three persons, authentication keys are issued from the terminal connected to the two to, and immediate connection is enabled based on this.

Eighth Embodiment

Figure 79:
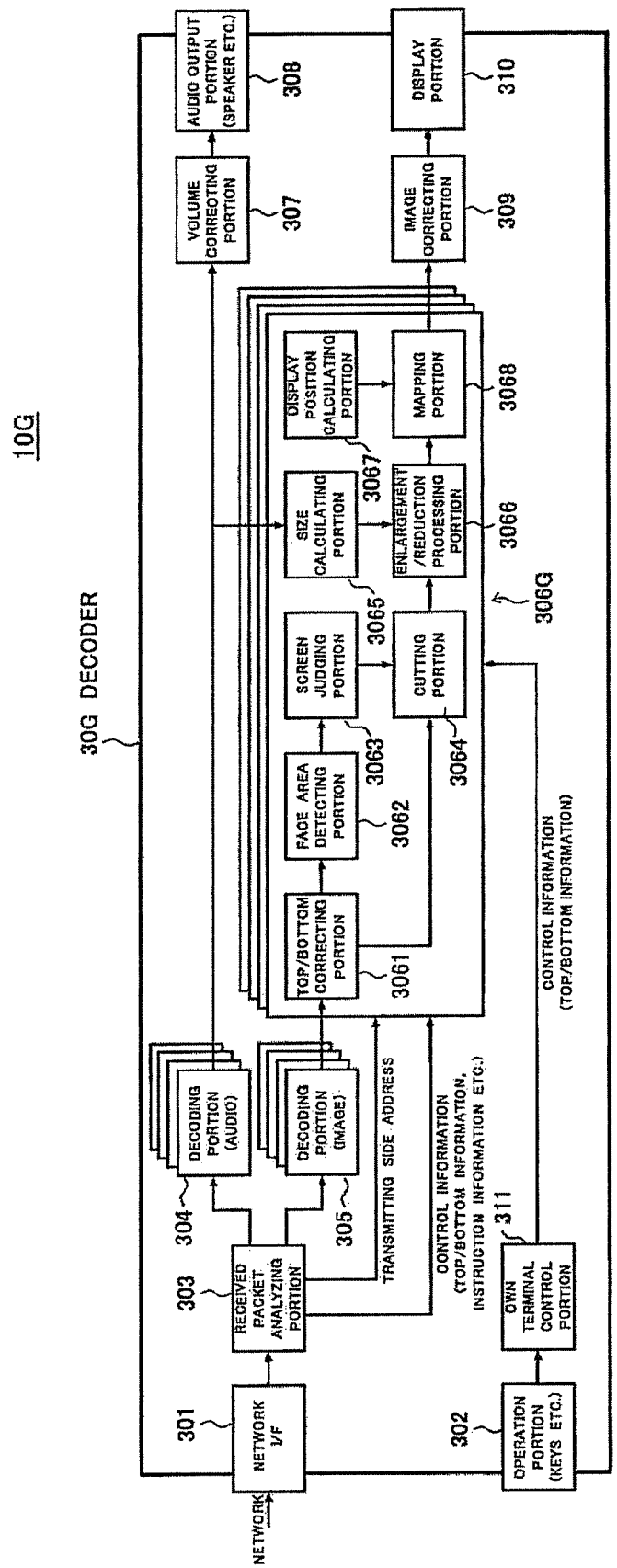
FIG. 79 is a diagram showing an example of the configuration of a decoder in a mobile communication terminal according to an eighth embodiment of the present invention.

FIG. 79 is a diagram showing an example of the configuration of a decoder in a mobile communication terminal according to an eighth embodiment of the present invention.

The encoder in a mobile communication terminal 10G according to the present eighth embodiment has the same configuration as the configuration of FIG. 2 explained in the first embodiment, therefore an illustration thereof is omitted here. Further, the basic block configuration of the decoder 30G is the same as the configuration of FIG. 3 explained in the first embodiment, but the processing of a display image control portion 306G is different.

In the embodiments explained before, face portions of participants in the conference are cut into oval shapes to form screens, and screens are displayed on one display screen. Then, by changing the display area of each screen in accordance with the magnitude of audio generated by each participant in the conference, the display of a speaker is made large and, at the same time, images of the other participants in the conference are suitably arranged.

On the other hand, mobile phones and other mobile communication terminals are becoming increasingly sophisticated in functions. In recent years, a function by which a plurality of persons can talk while looking at the others' faces as in the above television (video) conference system has been developed. In a mobile communication terminal, the display screen and operation portion are small sized as well. Therefore, the degree of importance of automatically controlling sizes and arrays of screens rather than by manual operation is higher in comparison with other systems improving the display screen and operation portion.

The speaker is not always limited to one person. For example, in a case of a conference for presenting planning and research results, the presenter becomes the main speaker, and the other participants in the conference mainly become listeners, but the listeners sometimes give verbal encouragement, ask questions, or make other statements. In such case, if it is deemed that the speaker changes and the sizes of the screens are changed or the sizes of the screens of the presenter and listeners blink whenever a listener gives verbal encouragement, the result is visually irritating and the ability of the users to concentrate on the conference is obstructed, so this not preferred.

Further, in a case where the luminance is controlled irrespective of the sizes of the screens, the current consumption greatly increases in a large screen. This exerts an influence upon the lifetime of a battery of a mobile communication terminal driven by a battery etc. The inconvenience that for example the possible conversation time becomes short is liable to arise.

That is, in a mobile communication terminal driven by a battery or the like, consideration is necessary for suppressing the influence upon the lifetime of the battery (possible conversation time etc.) such as suppressing the current consumption in the display device to a constant value or less.

The decoder 30G of FIG. 79, basically, in the same way as the configuration of FIG. 3, has a network interface (I/F) 301 able to perform wireless communications with the network and receiving packets including the audio data, image (video) data, control information, and instruction information transmitted from the transmitting side, an operation portion 302 enabling key input etc., a received packet analyzing portion 303 for analyzing packets received at the network interface 301 and extracting the audio data, image data, transmitting side address, and control information (top/bottom information and instruction information), an audio decoding portion 304 for decoding the audio data extracted by the received packet analyzing portion 303, a video decoding portion 305 for decoding the video data extracted by the received packet analyzing portion 303, a display image control portion 306G for controlling the size and display mode of a screen to be displayed (display window) based on the video data decoded by the video decoding portion 305, the transmitting side address, control information, and luminance information and/or audio data decoded by the audio decoding portion 304, a volume correcting portion 307 for correcting the volume of the audio decoded by the audio decoding portion 304, a speaker or other audio output portion 308 for generating sound with a volume corrected by the volume correcting portion 307, an image correcting portion 309 for correcting the image controlled in size and display mode by the display image control portion 306G, an LCD or other display portion (image output portion) 310 for displaying an image via the video correcting portion 309, and an own terminal control portion 311 for giving control information (top/bottom information) to the display image control portion 306G based on the input information from the operation portion 302.

Below, the more concrete configuration and functions of the display image control portion 306G characterizing the present eighth embodiment and concrete examples of the display modes of the screens will be explained in sequence.

The decoder 30G of the present eighth embodiment has, in addition to the functions of the decoders explained above, a function of setting an upper limit value of the luminance of each region based on the size of the region occupied by each image on the display portion 310 and controlling the luminance of each region within a range not exceeding this upper limit value.

The display image control portion 306G of FIG. 79 has a top/bottom correcting portion 3061 for correcting the top/bottom of the received image so as to coincide with the top/bottom of the display screen (terminal screen) of the display portion 310 based on the top/bottom information linked with the received image, a face area detecting portion 3062 for detecting and extracting the area of the face from the received image, a screen judging portion 3063 for judging the screen to be used based on the face area detected at the face area detecting portion 3062, a cutting portion 3064 for cutting a corresponding area from the received image based on the judgment of the screen judging portion 3063, a size and luminance calculating portion 3065G for calculating the display size of a screens and the luminance when making the display portion 310 display a screen in accordance with the volume of the reception audio sent from the same transmitting side as that of the received image, an enlargement/reduction processing portion 3066 for enlarging/reducing images cut by the cutting portion 3064 based on calculation results of the size and luminance calculating portion 3065G, a display position calculating portion 3067 for calculating display positions, and a mapping portion 3068 for mapping images obtained at the enlargement/reduction processing portion 3066 at positions on the display portion 310 obtained at the display position calculating portion 3067.

When a face area is detected at the face area detecting portion 3062, the screen judging portion 3063 selects an oval shape including this face area and minimizing the portions other than the face area as the screen shape. Further, when a face area is not detected at the face area detecting portion 3062, the screen judging portion 3063 judges the image as scenery and selects a rectangle.

The size and luminance calculating portion 3065G calculates the size and luminance of the screens based on the volume of the audio data and volumes of audio data received in the past.

Below, the calculation of the luminance of screens characterizing the present eighth embodiment will be explained.

Figure 80:
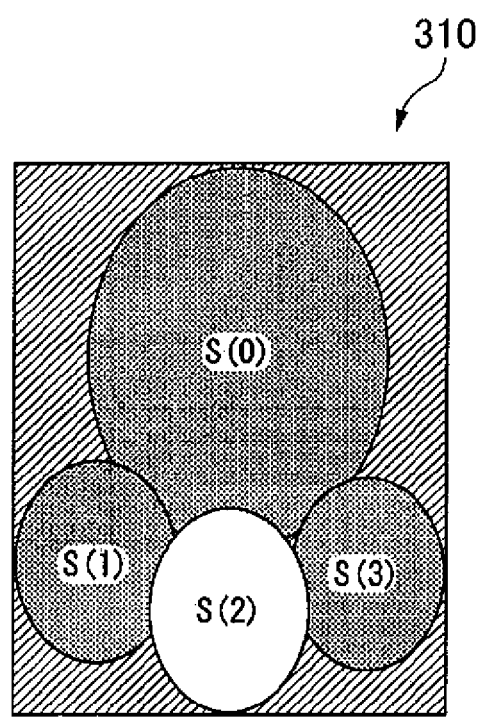
FIG. 80 is a front view of a display screen in the eighth embodiment.

FIG. 80 is a front view of a display screen of the display portion 310 during a television conference. Here, for easy understanding of the explanation, the case where one participant is the main speaker and the others mainly became listeners as in the presentation of planning and research results was taken as an example.

On the display screen, four screens of S(0) to S(3) are displayed. The size relationships of these screens S(j) are fixed for a visually easy understanding of the relationships of participants in the conference. Namely, a large screen S(0) is a screen on which the presenter of planning and research results is displayed as the main speaker, and the three small screens S(1) to S(3) are screens on which the three listeners are displayed.

To the screen S(j), three types of values such as the surface area R(j), the luminance L(j) on the screen 1, and the volume V(j) are linked. When the attention worthiness to be acquired by each screen S(j) is defined as A(j), control is performed so that the ratio of attention worthiness A(j) becomes equal to the ratio of volumes V(j) since desirably the screen S(j) on which the speaking person is displayed attracts attention. This is represented by Equations (a).

$$A(1):A(2):\ldots:A(n-1):A(n)=V(1):V(2):\ldots:V(n-1):V(n) \tag{a}$$

Further, it is considered that the larger the surface area R(j) and the higher the luminance L(j), the higher the attention worthiness A(j). Therefore, it is set to a product of the surface area R(j) and luminance L(j). This is represented by Equation (b).

$$A(j)=R(j) \times L(j) \tag{b}$$

Then, Equation (c) is obtained from Equation (a) and Equation (b).

$$R(0) \times L(0):R(1) \times L(1) \ldots R(n-1) \times L(n-1):R(n) \times L(n)= V(0):V(1):\ldots:V(n-1):V(n) \tag{c}$$

Here, when setting $V(j)/R(j)=p_j$ in order to find the ratio of luminances L(j) from Equation (c), Equation (d) is obtained.

$$L(0):L(1):\ldots:L(n-1):L(n)=p_0 p_1:\ldots:p_{n-1}:p_n \tag{d}$$

Here, on the display portion 310, an initial value $L_{ini}$ of the luminance is defined. Among the above luminances L(j), when the smallest one is represented as $L_{min}=\alpha \times_{min}$ ($\alpha$ is a constant), and the ratio of the luminance Lain and another luminance L(j) is represented as $p_{min}:p_j$, the other luminance L(j) is represented by Equation (e).

$$L(j)=(p_j/p_{min}) \times \alpha \times L_{ini} \tag{e}$$

Here, the organic EL element configuring each pixel of the display portion 310 is generally set in luminance by the current value. Namely, the luminance L(j) is proportional to the current value I(j) per unit surface area. When the current value per unit surface area where the luminance is $L_{ini}$ is defined as $I_{ini}$, Equation (f) is obtained from Equation (e).

$$I(j)=(p_j/p_{min}) \times \alpha \times I_{ini} \tag{f}$$

Then, due to this, a sum W of values of currents consumed by the image output portion 210 is represented by Equation (g).

[Equation 24]

$$W = \sum_{k=0}^{n} (R(k) \times I(k)) \\
= \sum_{k=0}^{n} \left(R(k) \times \frac{p_k}{p_{min}} \times \alpha \times I_{ini}\right) \\
= \alpha \times I_{ini} \times \sum_{k=1}^{n} \left(R(k) \times \frac{p_k}{p_{min}}\right) \tag{g}$$

Here, on the display portion 310, the allowable maximum current value $W_{max}$ is defined. Accordingly, since $W \leq W_{max}$, the constant $\alpha$ is represented by Equation (h).

[Equation 25]

$$\alpha = \frac{W_{max}}{I_{ini} \times \sum_{k=0}^{n} \left(R(k) \times \frac{p_k}{p_{min}}\right)} \tag{h}$$

By setting the luminance of each screen S(j) by using this $\alpha$, it becomes possible to suppress the value W of current consumed by the display portion 310 to the allowable maximum current value $W_{max}$ or less while setting the luminance in accordance with the attention worthiness A(j) which must be obtained by each screen S(j).

Note that, a condition such as $\alpha \leq 1$ may be added as well so that the minimum luminance $L_{min}$ does not exceed $L_{ini}$. When applying the above equation to the example shown in FIG. 80, first, in this example, the ratio of surface areas R(j)) of screens S(j) is given by the following equation.

$$R(0):R(1):R(2):R(3)=2:1:1:1$$

Then, assuming that the person displayed on the screen S(0) and the person displayed on the screen S(2) are speaking, and the ratio of volumes V(j) of the screens S(j) is as follows.

$$V(0):V(1):V(2):V(3)=2:1:2:1$$

Then, the following relationship is obtained from Equation (c).

$$2L(0):L(1):L(2):L(3)=2:1:2:1$$

The following relationships are obtained from the above equation.

$2L(0):L(1)=2:1$ $2L(0):L(2)=2:2$ $2L(0):L(3)=2:1$

Namely, they become as follows.

$L(0):L(1)=1:1$ $L(0):L(2)=1:2$ $L(0):L(3)=1:1$

That is, relationships become as follows.

$L(0):L(1):L(2):L(3)=1:1:2:1$

From the above equation, when the luminance of the screen S(j) minimizing the luminance is defined as a X $L_{ini}$ ($\alpha \leq 1$), the next relationships are obtained.

$L(0)=L(1)=L(3)=\alpha \times L_{ini}$ $L(2)=2\alpha \times L_{ini}$

From above equations, when the current value per unit surface area when the luminance is $L_{ini}$ is defined as $I_{ini}$, the next relationships are obtained.

$I(0)=I(1)=I(3)=\alpha \times I_{ini}$ $I(2)=2\alpha \times I_{ini}$

From the above equations and Equation (g), the sum of the values of the currents consumed by the image output portion 210 is given by the following equation.

$$W = R(0) \times I(0) + R(1) \times I(1) + R(2) \times I(2) + R(3) \times I(3)$$
$$= \alpha \times I_{ini}(R(0) + R(1) + 2R(2) + R(3))$$

Since $W \leq W_{max}$, $\alpha \leq W/(I_{ini}(R(0)+R(1)+2R(2)+R(3)))$, and then $\alpha \leq 1$ α can be determined from the above equations, and the luminance to be set in each screen S(j) can be determined.

The size and luminance calculating portion 3065G uses, as the volume V(j) in the above equations, ones obtained by processing the volume of the audio data input from the audio decoding portion 304 for the luminance calculation as shown in FIG. 81A, FIG. 81B, FIG. 82A, and FIG. 82B.

FIG. 81A, FIG. 81B, FIG. 82A, and FIG. 82B are graphs representing changes of volumes along with time. In these graphs, the volumes (input volumes) of the audio data input from the audio decoding portion 304 are indicated by solid lines, and the volumes (processed volumes) $V_{display}$ processed for the luminance calculation based on these volumes are indicated by broken lines.

The reason for the use of the processed volume $V_{display}$ for the luminance calculation is that, when the luminance is calculated according to the input volume $V_{receive}$, the luminance is not stabilized, but there arises a problem of flickering. In giving verbal encouragement or other short audio, a time from the rise of luminance to the fall is short, therefore there arises a problem that the time during which the luminance becomes high is short, so it is hard to recognize on which screen S(j) the person who is displayed on that screen spoke.

Therefore, as the processed volume $V_{display}$, one obtained by averaging input volumes $V_{receive}$ is used during speaking, while one obtained by slowly attenuating the volume from the processed volume $V_{display}$ during speaking is used after the end of speaking. Further, the attenuation after the end of the speaking is made milder as the speaking duration becomes shorter.

Figure 81A:
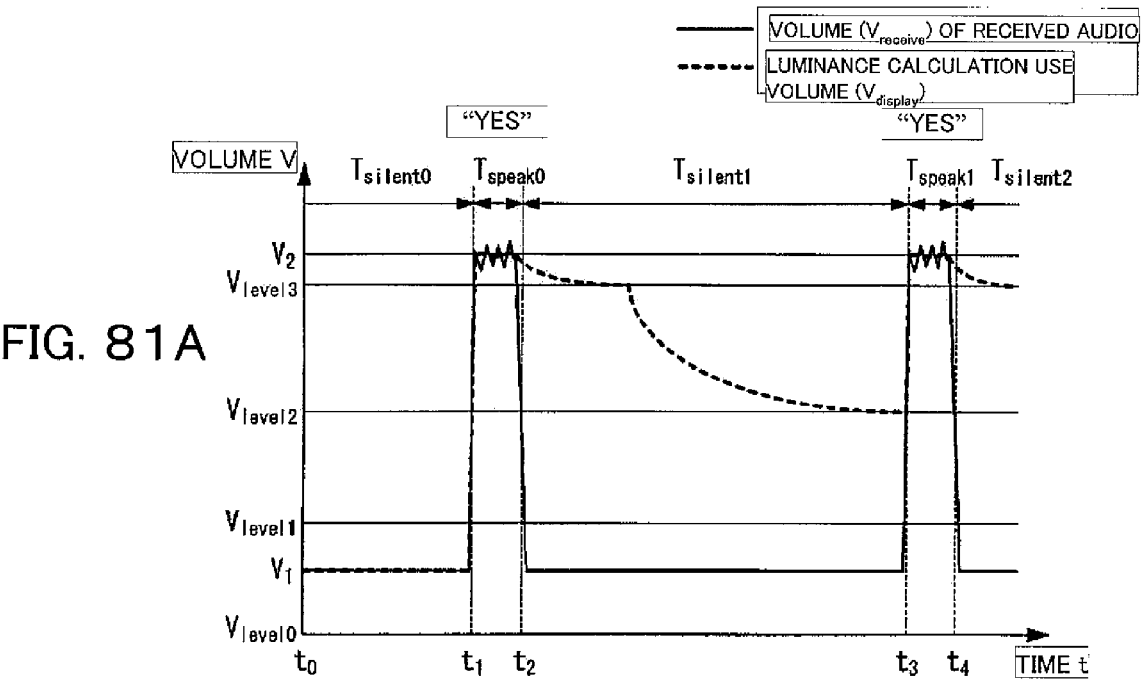
FIG. 81A and FIG. 81B are graphs representing changes of the volume in the eighth embodiment along with time.
Figure 81B:
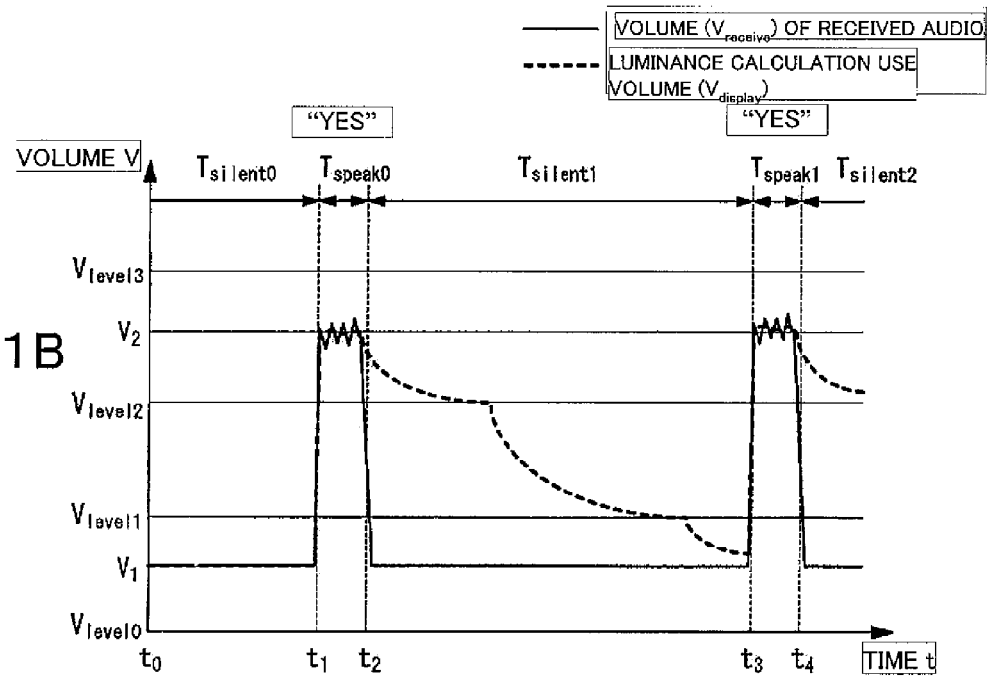
Figure 82A:
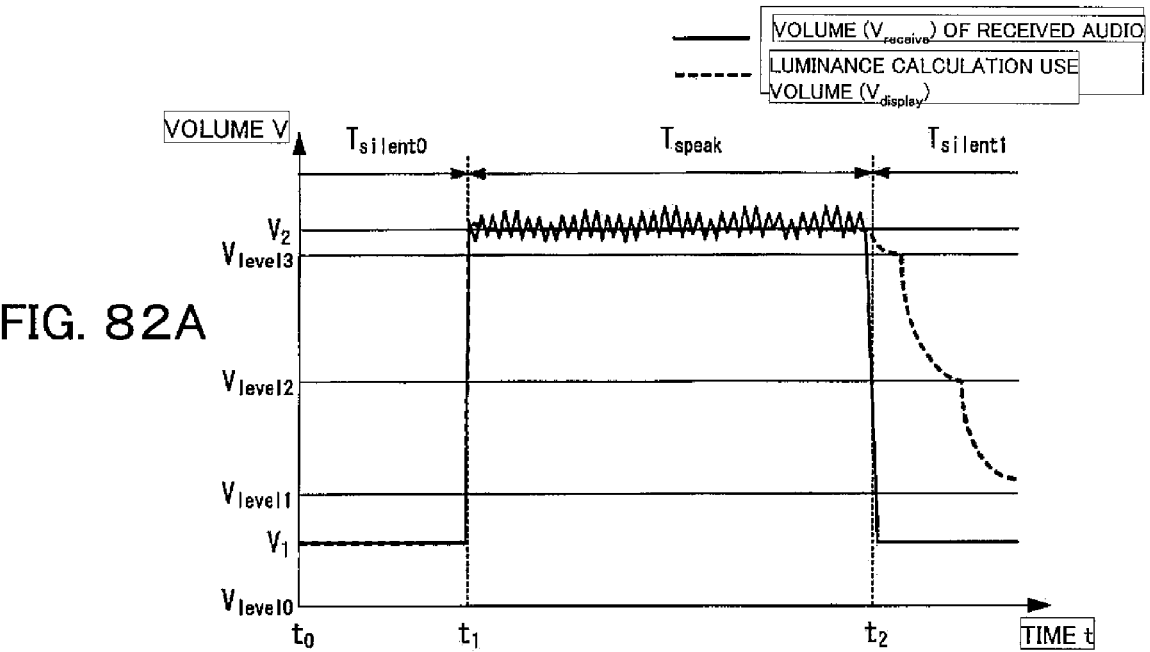
FIG. 82A and FIG. 82B are graphs representing changes of the volume in the eighth embodiment along with time.
Figure 82B:
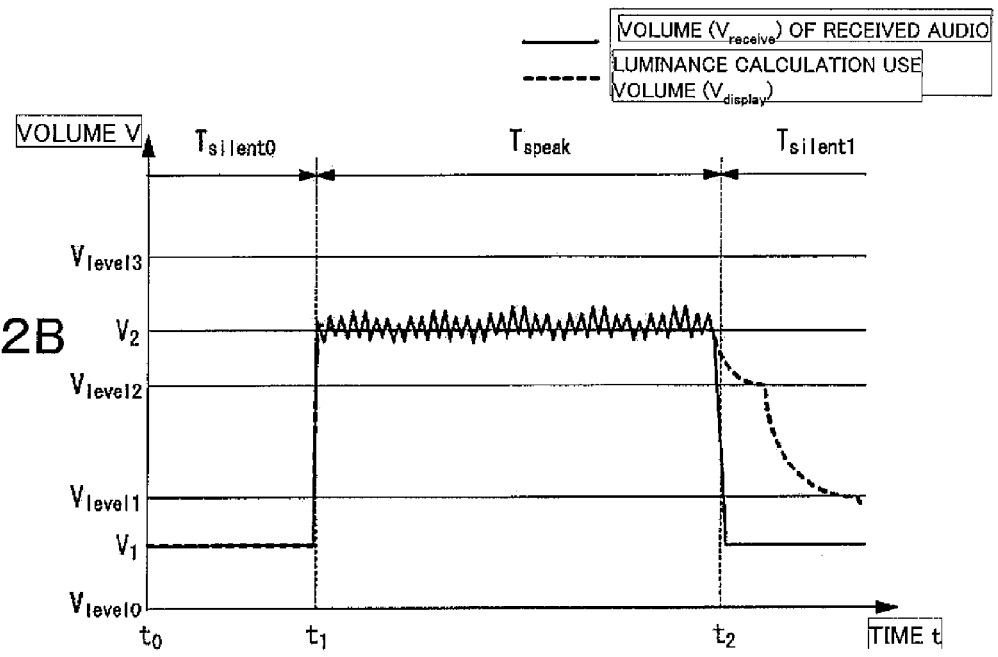

FIG. 81A and FIG. 81B show cases of short audio such as giving verbal encouragement, while FIG. 82A and FIG. 82B show cases of speaking having a length of a predetermined time or more.

In FIG. 51A, FIG. 81B, FIG. 82A, and FIG. 82B, $T_{speak}$ is a period of speech (speaking period), and $T_{silent}$ is a period of silence (silent period). Further, $V_{level}$ are threshold values of volumes set at predetermined intervals.

Further, FIG. 81A and FIG. 82A show the case where the volume during speaking is relatively high, and FIG. 81B and FIG. 82B represent a case where the volume during speaking is relatively low.

Figure 83:
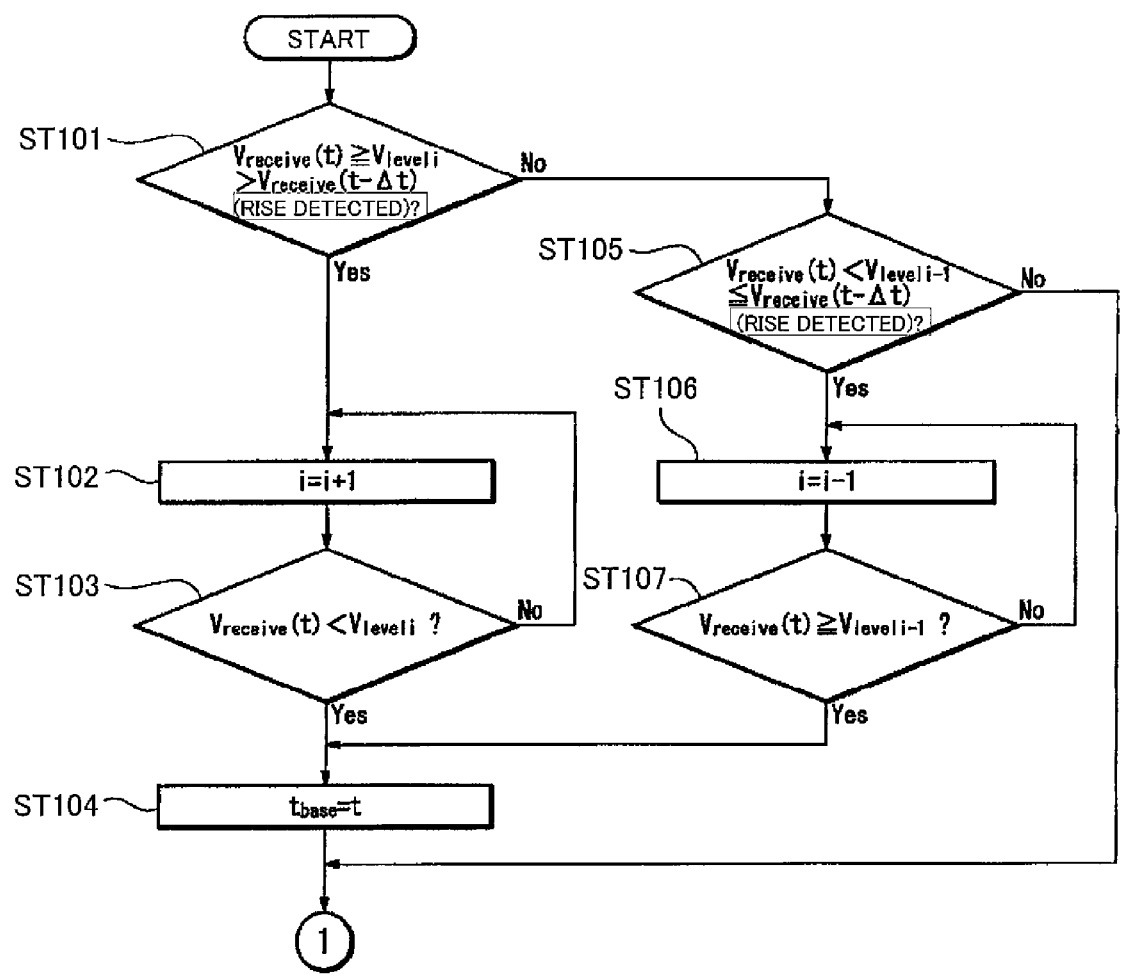
FIG. 83 is a flow chart showing processes of obtaining luminance control use volume in accordance with speech duration in the eighth embodiment.
Figure 84:
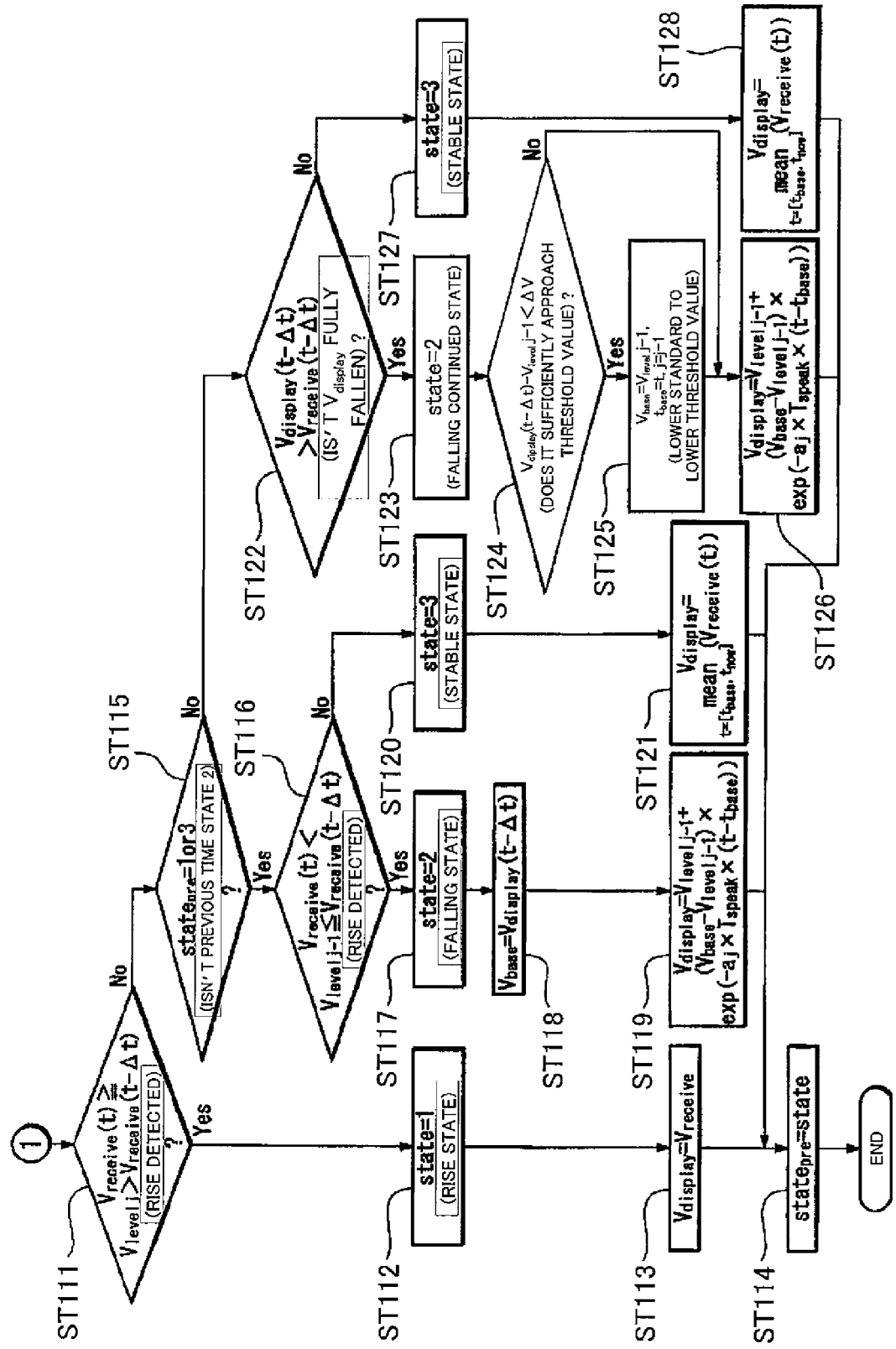
FIG. 84 is a flow chart showing processes of obtaining luminance control use volume in accordance with speech duration in the eighth embodiment.

Next, the technique for calculation of the processed volume $V_{display}$ in accordance with the speech duration will be explained according to flow charts of FIG. 83 and FIG. 84. By the processing according to these charts, the states are assigned as the rising state (state 1), falling (continued) state (state 2), and stable state (state 3) based on changes of input volume $V_{receive}$ and processed volume $V_{display}$, and the processed volume $V_{display}$ is calculated according to the equation adapted to each state.

t is the present time, $V_{receive}(t)$ is the present input volume, $V_{receive}(t-\Delta t)$ is the input volume at a point of time earlier than the present time by exactly the time $\Delta t$, $V_{leveli}$ is the threshold value located above when seen from $V_{receive}(t-\Delta t)$, $V_{leveli-1}$ is the threshold value located below when seen from $V_{receive}(t-\Delta t)$, $t_{base}$ is the time at the detection of change (rising or falling), and $V_{base}$ is the volume of standard at the time of the calculation.

The processing carried out by the size and luminance operation 3065 will be shown below. This processing is repeated at intervals of the predetermined time.

First, during a period from the time (t-$\Delta t$) to the time t, when it is detected that the input volume $V_{receive}(t)$ rose crossing the threshold value $V_{leveli}$ (Yes of ST101), it is detected up to which threshold value did the input volume rise (ST102, ST103), and the time at the point of time when the volume fully rose is stored (ST104).

Further, during the period from the time (t-$\Delta t$) to the time t, when the input volume $V_{receive}(t)$ did not rise crossing the threshold value $V_{leveli}$ (No of ST101), it is detected that the input volume $V_{receive}(t)$ falled crossing the threshold value $V_{leveli}$ (Yes of ST105), then it is detected up to which threshold value did the input volume fall (ST106, ST107), and the time t at the point of time when the volume was fully fallen is stored as $t_{base}$ (ST104). Then, where the input volume $V_{receive}(t)$ has risen crossing the threshold value $V_{levelj}$ during the period from the time (t-$\Delta t$) to the time t (Yes of ST111), it is determined as the rising state (state 1) (ST112), and the processed volume $V_{display}$ is calculated in Equation (i) (ST113).

$$V_{display}=V_{receive} \quad (i)$$

Then, the state is stored in $state_{pre}$ (ST114), and the processing is ended.

Then, in a case where the input volume $V_{receive}(t)$ did not rise crossing the threshold value $V_{levelj}$ during the period from the time (t-$\Delta t$) to the time t (No of ST111) and the $state_{pre}$ as the state of the previous time was 1 or 3 (Yes of ST115), and a case where the input volume $V_{receive}(t)$ had fallen crossing the threshold value $V_{levelj-1}$ during the period from the time (t-Δt) to the time t (Yes of ST116), the state is judged as the falling state (state 2) (ST117), the processed volume $V_{display}$ at the past point of time by exactly Δt is entered for the calculation standard volume $V_{base}$ (ST118), and the processed volume $V_{display}$ is calculated in Equation (j) (ST119).

$$V_{display} = V_{levelj-1} + (V_{base} - V_{levelj-1}) \times \exp(-a_j \times T_{speak} \times (t - t_{base}))$$

Due to this, the processed volume $V_{display}$ attenuates more gently than the input volume $V_{receive}$. Then, state is stored in $state_{pre}$ (ST114), and the processing is ended.

At step ST116, when the input volume $V_{receive}(t)$ has not fallen crossing the threshold value $V_{levelj-1}$ during the period from the time (t-Δt) to the time t (No of ST116), it is judged as the stable state (state 3) (ST120, and the processed volume $V_{display}$ is calculated in Equation (k) (ST121).

[Equation 26]

$$V_{display} = \underset{t=[t_{base}, t_{now}]}{\text{mean}} (V_{receive}(t)) \quad \text{(k)}$$

Then, the state is stored in $state_{pre}$ (ST114), and the processing is ended.

At step ST115, in a case where there are two $state_{pre}$ as the previous time state (No of ST115) and a case where the processed volume $V_{display}$ earlier by exactly the time t has not attenuated up to the value equivalent to the input volume $V_{receive}$ (Yes of ST122), the state is judged as the falling continued state (state 2) (ST123). When the processed volume $V_{display}$(t-Δt) sufficiently approaches the threshold value $V_{levelj-1}$, that is, the difference between the processed volume $V_{display}$ (t-Δt) and $V_{levelj-1}$ becomes less than the predetermined value ΔV (Yes of ST124), the standard is lowered to the lower threshold value (ST125), and the processed volume $V_{display}$ is calculated by Equation (j) (ST126).

Then, the state is stored in $state_{pre}$ (ST114), and the processing is ended.

At step ST122, in the case where the processed volume $V_{display}$ earlier by exactly the time Δt has attenuated to the value equivalent to the input volume $V_{receive}$ (No of ST122), the state is judged as the stable state (state3) (ST127), and the processed volume $V_{display}$ is calculated in Equation (k) (ST128).

Then, the state is stored in $state_{pre}$ (ST114), and the processing is ended.

Note that, in the present eighth embodiment, the change of the volume is replaced by the change of the luminance, but in execution, the change of the volume can be assigned to not only the change of the luminance, but also the enlargement/reduction of the screen.

As explained above, according to the present eighth embodiment taking as an example a mobile communication terminal capable of performing a multi-screen (multi-window) display, by performing the luminance control in accordance with the size of the screen displaying each other party of communications, and the magnitude of audio linked with the screen, a suitable attention worthiness can be given with respect to each screen and, at the same time, a large increase of current consumption by applying an excessively high luminance to a large screen can be avoided.

Further, even in a case where the luminance of the screen is controlled, the current consumption can be suppressed to the constant value not exceeding the current consumption permitted to the display device or less (the allowable maximum current value, that is, the upper limit value), therefore an adverse influence exerted upon the performance of the apparatus (lifetime of the battery) for example possible conversation time of a mobile communication terminal driven by a battery can be avoided.

Further, by not specifying a speaker having the largest magnitude of voice, but controlling the luminance according to the ratio of the magnitudes of voices, even in a case where a plurality of speakers are speaking with magnitudes of voices of substantially the same degree, a display screen from which who is in discussion with who can be easily visually discerned can be exhibited, and frequent switching of screens raised in luminance making the display screen hard to see can be avoided.

Further, with respect to the change of the received volume, the luminance is quickly increased in the case where the received volume largely increases, that is, at the time of the start of speaking, while, when attenuating the luminance after the end of speaking, by taking the speaking period into account, the luminance is attenuated faster as the speaking period is longer and attenuated slower as the speaking period is shorter. Due to this, the luminance quickly rises with respect to new speech, while the luminance slowly attenuates with respect to verbal encouragement, quick answers, or other short audio, therefore it becomes possible to eliminate irritating changes in luminance of the screens where the luminance changes in a short period of time.

INDUSTRIAL CAPABILITY

According to the present invention, the sizes and positions of screens can be adaptively and optimally updated without any operation by the user, therefore the present invention can be applied to communications using images in mobile phones etc. having small display screen sizes.

The invention claimed is:

1. A communication terminal reproducing received image data and audio data of a plurality of participants, comprising:
   a control portion extracting a plurality of specific areas depicting the plurality of participants from the image data; and
   a display portion displaying an image,
   wherein the control portion enlarges one of the extracted specific areas and narrows one of the extracted specific areas, based on magnitudes of the audio data linked with the extracted specific areas,
   wherein the control portion is able to form a plurality of display areas for displaying images of the plurality of participants by the extraction of specific areas, and
   wherein the control portion further calculates display magnifications of the display areas based on line segments connecting centers of the display areas, thicknesses of standard shapes of the display areas, and magnitudes of the audio data linked with the display areas,
   controls movement and new generation of the display areas based on the corresponding display magnifications, and
   forms the plurality of display areas on the display screen of the display portion.

2. A communication terminal as set forth in claim 1, wherein the control portion controls an array of the image based on a degree of superimposition of a display range of the display portion and the image.

3. A communication terminal as set forth in claim 1, wherein,
   there is a plurality of displayed images, and
   the control portion controls an array of the images based on the degree of superimposition of the images on each other.

4. A communication terminal as set forth in claim 1, wherein the control portion, when extracting a specific area, selects a circle encompassing the specific area and minimizing the portions other than the specific area as a shape of the image display area including the image controlled in size and to be displayed.

5. A communication terminal as set forth in claim 1, wherein:
the display area has center point coordinates (P(i)) indicating a display position of the display area, a standard shape (Unit(i)) indicating a shape of the display area, a magnitude (V(i)) of the audio linked with the display area, and a display magnification (R(i)) when displaying the display area on the display screen, and
the control portion determines as the display magnification (R(i)) the smallest value among provisional display magnifications (R(i, j)) calculated based on line segments (L(I, j)) connected with center point coordinates (P(j)) of surrounding screens, thicknesses (Lm(i, j), Lm(j, i)) of standard shapes on the lines segments, and magnitudes of audio (V(i), V(j)).

6. A communication terminal as set forth in claim 1, wherein
the communication terminal reproduces received captured image data and audio data transmitted from transmitting side terminals,
the control portion is able to form a plurality of display areas for displaying images to be displayed by extraction of specific areas on the display portion, and
the control portion includes
an attention worthiness estimating portion estimating an attention worthiness of a received image,
a display magnification coefficient combining portion calculating a display magnification coefficient of a display area based on the estimated attention worthiness and a received volume, and
a display magnification calculating portion calculating a display magnification of a display area based on the calculated display magnification coefficient.

7. A communication terminal as set forth in claim 6, wherein the attention worthiness estimating portion estimates the attention worthiness of a received image based on a motion vector of the received image, increase of encoding, and frequency components.

8. A communication terminal as set forth in claim 6, wherein:
the control portion has a judging portion estimating a capturing operation on the transmitting side based on a motion vector of a received image and change of the encoding and,
when the judging portion judges that an operation occurred, the attention worthiness estimating portion estimates that the image received after the judged operation has a high attention worthiness.

9. A communication terminal as set forth in claim 6, wherein:
one of the terminal serving as the transmitting side and the terminal serving as a receiving side has
a first extraction portion extracting a first specific area,
a second extraction portion extracting a second specific area, and
a behavior judging portion judging whether or not a previously set second specific area is moving, and,
the first extraction portion detects movement of the second specific area on a video when extracting the first specific area on the video and the behavior judging portion raises the attention worthiness when detecting the previously set movement.

10. A communication terminal as set forth in claim 1, wherein
the control portion is able to form a plurality of display areas for displaying a plurality of images to be displayed by extraction of specific areas on the display portion and discriminates array positions of the display areas based on an order of judgment results of a volume order.

11. A communication terminal as set forth in claim 10, wherein:
the terminal further has a suitable array storage portion holding a suitable array pattern, and
the control portion compares a judged array with the array pattern held in the suitable array storage portion and judges if the array pattern is suitable.

12. A communication terminal as set forth in claim 11, wherein the control portion changes arrays of two or more display areas when rectification is required based on a judgment result of the comparison of the judged array with the array pattern.

13. A communication terminal as set forth in claim 12, wherein the control portion performs processing for updating an array of display areas at a next time (t+Δt) with respect to the array result (P' (t)) in the processing for changing the array.

14. A communication terminal as set forth in claim 11, wherein the control portion slows attenuation of a display magnification calculation use volume in a silent period after a speaking period when the speaking period is short and speeds the attenuation when the speaking period is long.

15. A communication terminal as set forth in claim 1, wherein
the communication terminal is able to transmit/receive image data and audio data and able to reproduce received image data and audio data, and
the control portion
is able to form a plurality of display areas for displaying images to be displayed by extraction of specific areas on the display portion,
adds to display on the display portion with the image displayed on the display portion, as communication information, another session from a same terminal as lower information of the same terminal, judges, as a display area size for displaying the image, a display area for information positioned the lowest as the display area to be noted, and controls it to a corresponding display area.

16. A communication terminal as set forth in claim 15, wherein the control portion makes the other display areas smaller.

17. A communication terminal as set forth in claim 15, wherein the control portion reads out an image corresponding to a number of an other party from a memory when there is a received call, newly generates it on the display area, and highlights the display area by making a color of an outer frame a color assigned for call reception, making the outer frame vibrate in size, or making the color fluctuate in darkness or flash.

18. A communication system able to transmit/receive image data and audio data of a plurality of participants, and performing communications among a plurality of communication terminals able to reproduce received image data and audio data, wherein
the plurality of the communication terminals have
a display portion displaying an image and a control portion which is able to form a plurality of display areas for displaying images of the plurality of participants by extraction of specific areas on the display portion and controls sizes of the images to be displayed based on received volumes of the audio data linked with the extracted specific areas, and the control portion adds to display on the display portion with the image displayed on the display portion, as communication information, another session from the same terminal as lower information of the same terminal, judges, as a display area size for displaying the image, a display area for information positioned the lowest as the display area to be noted, and controls it to the corresponding display area, wherein the control portion calculates display magnifications of the display areas based on line segments connecting centers of the display areas, thicknesses of standard shapes of the display areas, and magnitudes of the audio data linked with the display areas, controls movement and new generation of the display areas based on the corresponding display magnifications, and forms the plurality of display areas on a display screen of the display portion.

19. A communication system as set forth in claim 18, wherein, for file display and reproduction, when a transmitting side requests synchronous reproduction, it transfers the same file and transmits information of the reproduction start time and the transmitting side and a receiving side reproduce the file according to the reproduction start time.

20. A communication system as set forth in claim 18, wherein:
the system has
a conversation function and
an image capturing function, and
at a time of a conversation, the system displays a presence/absence of streaming transmission of a captured image based on an operation of the image capturing function, when allowed, transmits a reproduction request of streaming to a party being talked to in a current conversation, and, when a receiving side allows reproduction, starts streaming distribution based on a reproduction permission, and the control portion on the receiving side generates a new screen and reproduces a reception streaming.

21. A communication system as set forth in claim 18, wherein:
the system has
a conversation function and
an image capturing function, and
at a time of a conversation, the system displays a presence/absence of streaming transmission of a still image when the image capturing function captures a still image, when allowed, transmits a reproduction request of the image to a party being talked to in a current conversation, and, when a receiving side allows reproduction, sends the image based on a reproduction permission, and the control portion on the receiving side generates a new display area and reproduces the received image.

22. A communication system as set forth in claim 18, wherein when a transmitting side closes a reproduction display area, it sends that fact to a receiving side, closes the display area reproducing information corresponding to the closed display area, and deletes the corresponding information.

23. A display method of a communication terminal reproducing received image data and audio data of a plurality of participants, comprising a step of extracting, by a control portion, a plurality of specific areas from the image data depicting the plurality of participants, a step of enlarging one of the extracted specific areas and narrowing one of the extracted specific areas, based on magnitudes of the audio data linked with the extracted specific areas, a step of displaying an image forming a plurality of display areas for displaying images of the plurality of participants by the extraction of specific areas, a step of calculating display magnifications of the display areas based on line segments connecting centers of the display areas, thicknesses of standard shapes of the display areas, and magnitudes of the audio data linked with the display areas, and a step of controlling movement and new generation of the display areas based on the corresponding display magnifications, and forming the plurality of display areas on a display screen of a display portion.

24. A display method of a communication terminal reproducing received captured image data and audio data transmitted from a plurality of transmitting side terminals, comprising a step of extracting, by a control portion, a plurality of specific areas from image data depicting the plurality of terminals, a step of estimating an attention worthiness of a received image based on panning or rotation of the corresponding displayed image, a step of displaying an image forming a plurality of display areas for displaying images of the plurality of terminals by the extraction of specific areas, a step of calculating display magnification coefficients of the display areas based on the estimated attention worthiness and received volumes linked with the extracted specific areas, a step of calculating display magnifications of the display areas based on the calculated display magnification coefficients and line segments connecting centers of the display areas, thicknesses of standard shapes of the display areas, and magnitudes of the audio data linked with the display areas, a step of controlling movement and new generation of the display areas based on the corresponding display magnifications, and forming the plurality of display areas on a display screen of a display portion, and a step of displaying the display areas including the images to be displayed according to the display magnifications.

25. A display method of a communication terminal reproducing received image data and audio data of a plurality of participants, comprising a step of forming, by a control portion, a plurality of display areas for displaying images to be displayed by extraction of specific areas depicting the plurality of participants, a step of controlling sizes of the images to be displayed based on received volumes of the audio data linked with the extracted specific areas, a step of judging a volume order of display areas, a step of discriminating array positions of the display areas based on the order of the judgment result, a step of calculating display magnifications of the display areas based on the calculated display magnification coefficients and line segments connecting centers of the display areas, thicknesses of standard shapes of the display areas, and magnitudes of the audio data linked with the display areas, a step of controlling movement and new generation of the display areas based on the corresponding display magnifications, and forming the plurality of display areas on a display screen of a display portion, and a step of displaying the plurality of display areas including the images to be displayed at positions in accordance with the discrimination results.

26. A display method of a communication terminal capable of transmitting and/or receiving image data and audio data and capable of reproducing received image data and audio data of a plurality of participants, comprising a step of forming, by a control portion, a plurality of display areas for displaying images to be displayed on a display portion by extraction of specific areas depicting the plurality of participants, and a step of controlling sizes of the images to be displayed based on received volumes linked with the extracted specific areas, wherein, a step of adding to display on the display portion with an image displayed on the display portion, as communication information, a different session from the same terminal is added as lower information of the same terminal, and as a display area size for displaying the image, a display area for information positioned the lowest is judged as the display area to be noted and controlled to the corresponding display area, a step of calculating display magnifications of the display areas based on the calculated display magnification coefficients and line segments connecting centers of the display areas, thicknesses of standard shapes of the display areas, and magnitudes of the audio data linked with the display areas, and a step of controlling movement and new generation of the display areas based on the corresponding display magnifications, and forming the plurality of display areas on a display screen of the display portion.

* * * * *